US012744589B2

(12) United States Patent
Yao et al.

(10) Patent No.: US 12,744,589 B2
(45) Date of Patent: Sep. 22, 2026

(54) TIME OFFSET MAINTENANCE FOR NONTERRESTRIAL NETWORK (NTN)

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haijing Hu, Los Gatos, CA (US); Haitong Sun, Cupertino, CA (US); Hong He, San Jose, CA (US); Huaning Niu, San Jose, CA (US); Jie Cui, San Jose, CA (US); Oghenekome Oteri, San Diego, CA (US); Sarma V. Vangala, Campbell, CA (US); Sigen Ye, San Diego, CA (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 18/249,810

(22) PCT Filed: Oct. 23, 2020

(86) PCT No.: PCT/CN2020/123295
§ 371 (c)(1),
(2) Date: Apr. 20, 2023

(87) PCT Pub. No.: WO2022/082744
PCT Pub. Date: Apr. 28, 2022

(65) Prior Publication Data
US 2024/0313855 A1 Sep. 19, 2024

(51) Int. Cl.
*H04W 74/00* (2009.01)
*H04B 7/185* (2006.01)
(Continued)

(52) U.S. Cl.
CPC .... *H04B 7/18532* (2013.01); *H04W 56/0025* (2013.01); *H04W 74/006* (2013.01); *H04W 74/0833* (2013.01); *H04W 74/0838* (2024.01)

(58) Field of Classification Search
None
See application file for complete search history.

(56) References Cited

U.S. PATENT DOCUMENTS 10,638,442 B2 * 4/2020 Kim .................. H04W 72/0453
2013/0070726 A1 * 3/2013 Zhang .............. H04W 56/0045
370/331
(Continued)

FOREIGN PATENT DOCUMENTS

CN 111316735 A 6/2020
CN 111727658 A 9/2020
(Continued)

OTHER PUBLICATIONS

Office Action dated Oct. 1, 2024 in connection with Application Serial No. 2020801065488.
(Continued)

*Primary Examiner* — Brandon M Renner
(74) *Attorney, Agent, or Firm* — Eschweiler & Potashnik, LLC; Ningjiao Zhang

(57) ABSTRACT

A user equipment (UE) associated with a non-terrestrial network (NTN) is disclosed. The UE comprises a processor configured to determine a first time offset, based on processing a timing offset indication signal comprising the first time offset or an associated parameter, received from a base station. In some embodiments, the first time offset is indicative of a time delay in downlink (DL) to uplink (UL) interaction between the UE and the base station. The processor is further configured to determine a second time offset, based on processing a subsequent timing offset indication signal comprising the second time offset or an asso-
(Continued)

ciated parameter, received from the base station at a subsequent time instance. In some embodiments, the processor is further configured to update the first time offset with the second time offset.

15 Claims, 18 Drawing Sheets

(51) Int. Cl.
*H04W 56/00* (2009.01)
*H04W 74/0833* (2024.01)
*H04W 74/0838* (2024.01)

(56) References Cited

U.S. PATENT DOCUMENTS

| | | | | |
|---|---|---|---|---|
| 2016/0044666 | A1* | 2/2016 | Shin | H04W 72/20 370/336 |
| 2017/0302359 | A1* | 10/2017 | Guo | H04W 92/12 |
| 2019/0082408 | A1* | 3/2019 | Kim | H04W 72/0453 |
| 2020/0120458 | A1* | 4/2020 | Aldana | H04W 28/22 |
| 2020/0252959 | A1* | 8/2020 | Sun | H04W 74/0808 |
| 2020/0351855 | A1* | 11/2020 | Kung | H04L 1/1896 |
| 2022/0174635 | A1* | 6/2022 | Ryu | H04B 7/0626 |
| 2022/0287048 | A1* | 9/2022 | Lin | H04L 27/2655 |
| 2022/0376836 | A1* | 11/2022 | Cheng | H04L 1/1812 |
| 2023/0049008 | A1* | 2/2023 | Nishio | H04W 56/0045 |
| 2023/0199688 | A1* | 6/2023 | Wang | H04W 56/0045 370/503 |

FOREIGN PATENT DOCUMENTS

| | | | | |
|---|---|---|---|---|
| CN | 113347697 A | * | 9/2021 | H04W 74/0833 |
| CN | 114586292 B | * | 12/2023 | H04B 7/1853 |
| WO | 2019195457 A1 | | 10/2019 | |
| WO | 2020071698 A1 | | 4/2020 | |
| WO | 2020182006 A1 | | 9/2020 | |
| WO | WO-2021198723 A1 | * | 10/2021 | H04B 7/18519 |

OTHER PUBLICATIONS

International Preliminary Report on Patentability dated Apr. 13, 2023 in connection with PCT Application No. PCT/CN2020/123295.
PCT Search Report and Written Opinion dated Jul. 6, 2021 in connection with PCT Application No. PCT/CN2020/123295.
Panasonic R1-2006326: UL timing advance and frequency synchronization for NTN 3GPP TSG RAN WG1 #102e E-meeting Aug. 28, 2020 (Aug. 28, 2020).
5G; NR; Physical layer procedures for data; (3GPP TS 38.214 version 16.2.0 Release 16); ETSI TS 138 214 V16.2.0 (Jul. 2020); http://www.etsi.org/standards-search.
5G; NR; Radio Resource Control (RRC); Protocol specification; (3GPP TS 38.331 version 16.1.0 Release 16); ETSI TS 138 331 V16.1.0 (Jul. 2020); http://www.etsi.org/standards-search.
5G; NR; Multiplexing and channel coding; (3GPP TS 38.212 version 16.2.0 Release 16); ETSI TS 138 212 V16.2.0 (Jul. 2020); http://www.etsi.org/standards-search.
5G; NR; Physical layer procedures for control; (3GPP TS 38.213 version 16.2.0 Release 16); ETSI TS 138 213 V16.2.0 (Jul. 2020); http://www.etsi.org/standards-search.
Oppo; NTN control procedure for physical layer; 3GPP TSG RAN WG1 #98bis; R1-1910386; Oct. 14, 2019.
Ericsson; Feature lead summary on timing relationship enhancements; 3GPP TSG-RAN WG1 Meeting #102-e; R1-200xxxx; Aug. 17, 2020.
Ericsson; FL summary#0 for physical layer control procedures for NTN; 3GPP TSG-RAN WG1 Meeting #98; R1-1909485; Aug. 26, 2019.
European Extended Search Report mailed Jun. 26, 2024 in connection with Application No. 20958326.9.

* cited by examiner

Figure 10:
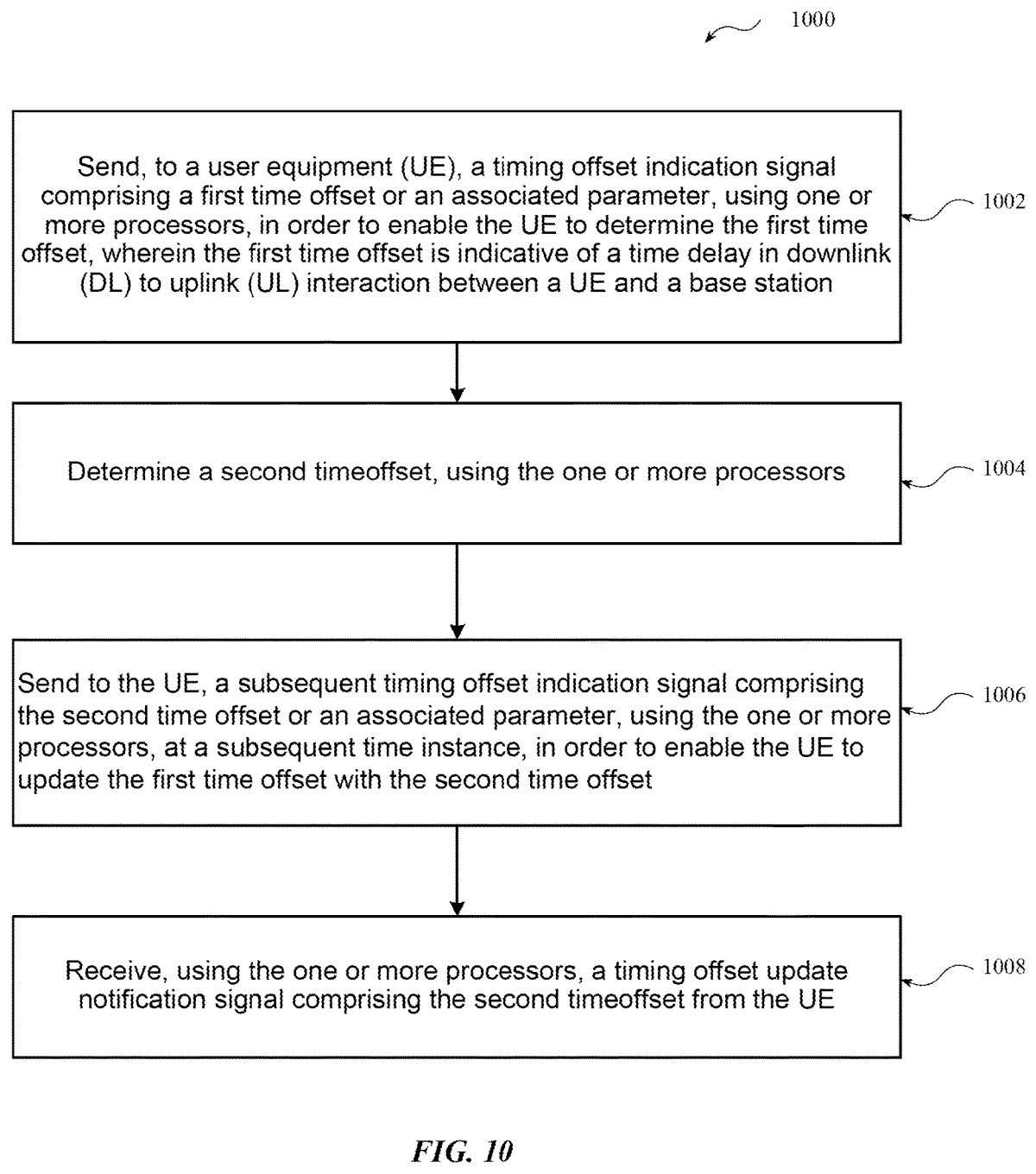

1000

Send, to a user equipment (UE), a timing offset indication signal comprising a first time offset or an associated parameter, using one or more processors, in order to enable the UE to determine the first time offset, wherein the first time offset is indicative of a time delay in downlink (DL) to uplink (UL) interaction between a UE and a base station

1002

Determine a second timeoffset, using the one or more processors

1004

Send to the UE, a subsequent timing offset indication signal comprising the second time offset or an associated parameter, using the one or more processors, at a subsequent time instance, in order to enable the UE to update the first time offset with the second time offset

1006

Receive, using the one or more processors, a timing offset update notification signal comprising the second timeoffset from the UE

Figure 12:
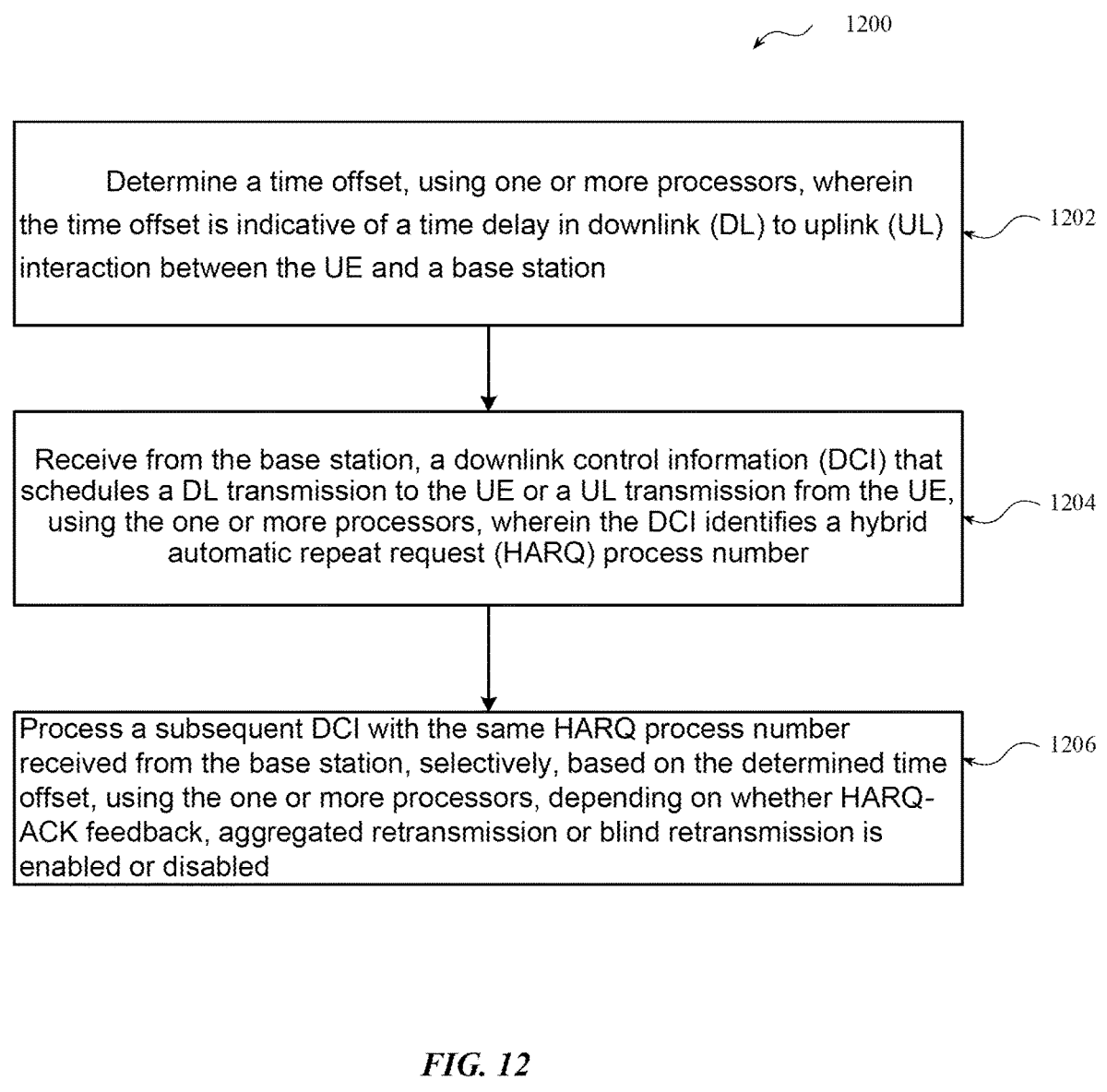

Determine a time offset, using one or more processors, wherein the time offset is indicative of a time delay in downlink (DL) to uplink (UL) interaction between the UE and a base station

1202

Receive from the base station, a downlink control information (DCI) that schedules a DL transmission to the UE or a UL transmission from the UE, using the one or more processors, wherein the DCI identifies a hybrid automatic repeat request (HARQ) process number

1204

Process a subsequent DCI with the same HARQ process number received from the base station, selectively, based on the determined time offset, using the one or more processors, depending on whether HARQ-ACK feedback, aggregated retransmission or blind retransmission is enabled or disabled

TIME OFFSET MAINTENANCE FOR NONTERRESTRIAL NETWORK (NTN)

REFERENCE TO RELATED APPLICATIONS

This application is a National Phase entry application of International Patent Application No. PCT/CN2020/123295 filed Oct. 23, 2020, entitled "TIME OFFSET MAINTENANCE FOR NONTERRESTRIAL NETWORK (NTN)," the entire disclosures of which is incorporated herein by reference.

FIELD

The present disclosure relates to non-terrestrial networks (NTNs) and in particular, to the maintenance of a time offset in NTNs.

BACKGROUND

As the number of mobile devices connected to wireless networks and the demand for mobile data traffic continue to increase, changes are made to system requirements and architectures to meet current and anticipated burgeoning demand. For example, wireless communication networks such as the 5G new radio (NR) systems may need to be deployed using satellites as parts of a non-terrestrial network (NTN). In one deployment scenario of an NTN, a satellite referred to as a transparent satellite may act as a relay station to link user devices with a ground-based base station and the 5G core network by implementing a transparent payload. In another deployment scenario, a satellite referred to as a regenerative satellite may have onboard processing capability to perform the functions of a base station by implementing a regenerative payload between the user devices and the ground-based 5G core network. Due to the wide coverage area of the satellites and the long distances between the satellites and the user devices on the ground, the difference in propagation delays between two user devices within the beam footprint is greater than that encountered in strictly terrestrial networks. For example, for an NTN deploying satellites in a geosynchronous earth orbit (GEO), the maximum differential delay between points at a nadir and edge of the coverage may be 10.3 ms. For an NTN deploying satellites in a low earth orbit (LEO), the maximum differential delay may be 3.12 ms and 3.18 ms for 600 km and 1200 km altitude, respectively.

BRIEF DESCRIPTION OF THE DRAWINGS

Some examples of circuits, apparatuses and/or methods will be described in the following by way of example only. In this context, reference will be made to the accompanying Figures.

FIG. 10 illustrates a flowchart of a method for a base station associated with a wireless communication system for updating a time offset, according to one embodiment of the disclosure.

FIG. 12 illustrates a flowchart of a method for a UE associated with a wireless communication system that utilizes time offset in HARQ retransmissions, according to one embodiment of the disclosure.

DETAILED DESCRIPTION

Figure 1:
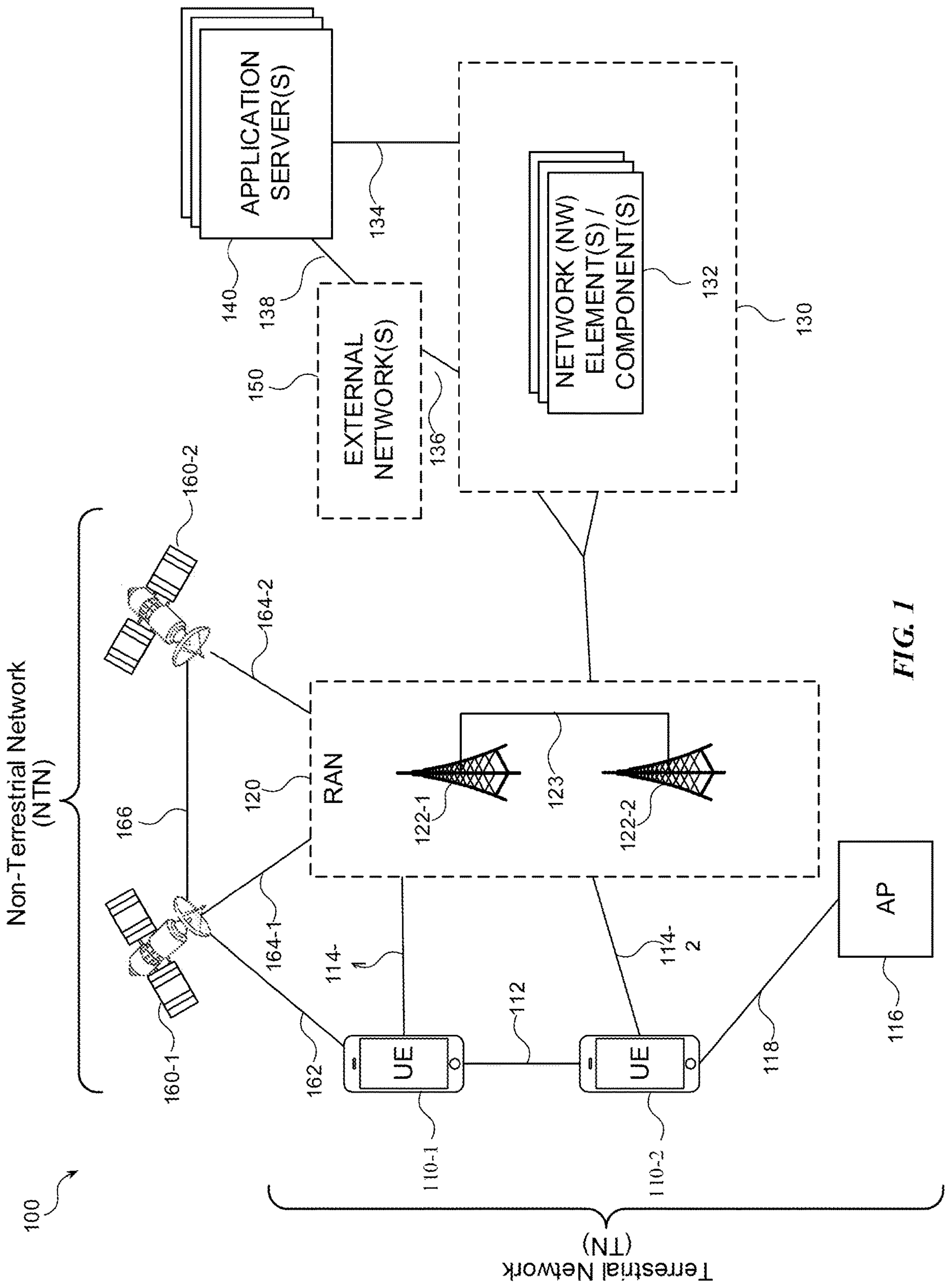
FIG. 1 is an example network according to one or more implementations described herein.

In one embodiment of the disclosure, a baseband (BB) processor for a user equipment (UE) is disclosed. The BB processor is configured to perform operations comprising determining a first time offset, based on processing a timing offset indication signal comprising the first time offset or an associated parameter, received from a base station. In some embodiments, the first time offset is indicative of a time delay in downlink (DL) to uplink (UL) interaction between the UE and the base station. In some embodiments, the first time offset is the same or larger than two times of a propagation delay between the UE and the base station. The operations further comprise determining a second time offset, based on processing a subsequent timing offset indication signal comprising the second time offset or an associated parameter, received from the base station at a subsequent time instance. In some embodiments, the second time offset is indicative of the time delay in DL to uplink UL interaction between the UE and the base station. In some embodiments, the second time offset is the same or larger than two times of the propagation delay between the UE and the base station. In addition, the operations comprise updating the first time offset with the second time offset.

In one embodiment of the disclosure, a baseband (BB) processor for a base station (BS) operating in a non-terrestrial network (NTN), wherein the base station comprises a satellite or having a satellite as a relay to a user equipment is disclosed. The BB processor is configured to perform operations comprising sending, to a user equipment (UE), a timing offset indication signal comprising a first time offset or an associated parameter, in order to enable the UE to determine the first time offset. In some embodiments, the first time offset is indicative of a time delay in downlink (DL) to uplink (UL) interaction between the UE and the base station. In some embodiments, the first time offset is the same or larger than two times of a propagation delay between the UE and the base station. The operations further comprise sending, to the UE, a subsequent timing offset indication signal comprising a second time offset or an associated parameter, at a subsequent time instance, in order to enable the UE to update the first time offset with the second time offset. In some embodiments, the second time offset is indicative of the time delay in DL to uplink UL interaction between the UE and the base station. In some embodiments, the second time offset is the same or larger than two times of the propagation delay between the UE and the base station.

In one embodiment of the disclosure, a baseband (BB) processor for a user equipment (UE) is disclosed. The BB processor is configured to perform operations comprising determining a time offset. In some embodiments, the time offset is indicative of a time delay in downlink (DL) to uplink (UL) interaction between the UE and a base station. In some embodiments, the time offset is the same or larger than two times of a propagation delay between the UE and the base station. The operations further comprise receiving a media access control (MAC) control element (CE) command from the base station and sending, to the base station, a hybrid automatic repeat request (HARQ) acknowledge (ACK) feedback in response to receiving the MAC CE command. In addition, the operations comprise determining a MAC CE activation time at which the MAC CE command is activated, based on the determined time offset, depending on whether the MAC CE command comprises a DL MAC CE command or a UL MAC CE command.

In one embodiment of the disclosure, a baseband (BB) processor for a user equipment (UE) is disclosed. The BB processor is configured to perform operations comprising determining a time offset. In some embodiments, the time offset is indicative of a time delay in downlink (DL) to uplink (UL) interaction between the UE and a base station. In some embodiments, the time offset is the same or larger than two times of a propagation delay between the UE and the base station. The operations further comprise receiving, from the base station, a downlink control information (DCI) that schedules a DL transmission to the UE or a UL transmission from the UE. In some embodiments, the DCI identifies a hybrid automatic repeat request (HARQ) process number. In addition, the operations comprise processing a subsequent DCI with the same HARQ process number received from the base station, selectively, based on the determined time offset, depending on whether HARQ feedback, aggregated retransmission or blind retransmission is enabled or disabled.

In one embodiment of the disclosure, a baseband (BB) processor for a user equipment (UE) is disclosed. Th BB processor is configured to perform operations comprising determining a time offset. In some embodiments, the time offset is indicative of a time delay in downlink (DL) to uplink (UL) interaction between the UE and a base station. In some embodiments, the time offset is the same or larger than two times of a propagation delay between the UE and the base station. The operations further comprise sending a beam failure recovery request (BFRQ) to the base station. In some embodiments, the BFRQ is indicative of a beam failure. In addition, the operations comprise monitoring to receive a beam failure recovery response (BFRR) from the base station in response to sending the BFRQ. In some embodiments, the BFRR is monitored within a BFRR time window after sending the BFRQ. In some embodiments, one or more parameters of the BFRR time window are determined based on the determined time offset.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Mobile communication networks may include one or more types and/or generations of wireless communication networks, such as 4th generation (4G) networks, 5th generation (5G) or new radio (NR) networks, etc. Such networks may include user equipment (UEs) and base stations that communicate with one another wirelessly. Such networks may also include, or be connected to, non-terrestrial networks (NTNs) so that terrestrial network devices (e.g., user equipment (UEs), base stations, etc.) may communicate with one another via non-terrestrial devices (e.g., low earth orbit (LEO) satellites, geostationary earth orbit (GEO) satellites, etc.).

In this capacity, a satellite may operate transparently by relaying communications between UEs and base stations without demodulation or remodulation. Alternatively, a satellite may operate regeneratively by using on-board processing capabilities to, for example, demodulate uplink (UL) signals and remodulate downlink (DL) signals between UEs and base stations. In some implementations, the satellite may be capable of operating as a base station or another type of network access (AP) of the wireless terrestrial network. As such, references herein to functions performed by a base station may also, or alternatively, be performed by a satellite in a given scenario.

Enabling UEs to connect to a wireless terrestrial network via satellites may enhance network connectivity and reliability by increasing the quantity of APs that UEs may use to communicate with the network. This may also increase the collective coverage area of the network as the transmission capabilities of a satellite (e.g., coverage area, footprint, etc.) may be greater than those of a terrestrial base station. This increase in network coverage may result in scenarios where UEs directly connected to a terrestrial base station (e.g., UEs within the coverage area of the base station) are geographically closer to the base station, and therefore may have different transmission timing constraints (e.g., lower propagation delays), than UEs connected to the base station via a satellite or UEs connected to a satellite operating as a base station. Additionally, UE transmission propagation delays may be affected, at least in part, by the satellite type since, for example, a maximum differential delay of a GEO satellite may be 10.3 micrometers (μm) whereas the max differential delay of a LEO may be 3.12 μm and 3.18 μm depending on the LEO altitude.

A propagation delay, as used herein, may be based on UL transmissions between a UE and a designated reference point (RP) (e.g., base station, satellite, etc.) that may include a network device where timing alignment of UL and DL frames may be observed. In scenarios involving a transparent satellite, the RP for determining propagation delay may be the base station. By contrast, in scenarios involving a regenerative satellite, the RP for determining propagation delay may be the satellite. In 5G New Radio (NR), there are several different timing relationships that are defined for a Terrestrial Network (TN). For example, $K_0$ is the time gap between the Downlink Control Information (DCI) and the Physical Downlink Shared Channel (PDSCH). In addition, $K_1$ is the time gap between PDSCH reception and Physical Uplink Control Channel (PUCCH) transmission and $K_2$ is the time gap between the DCI and the Physical Uplink Shared Channel (PUSCH). In NR Rel 16, for a Non-Terrestrial Network (NTN), these timing relationships may change because of the larger communications distances involved in NTN by having a wireless link traverse from a ground-based user equipment (UE) to a satellite and back down to a ground-based network (and vice versa).

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3nd generation (3G), 4nd generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks).

Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like.

As shown, UE 110 may also, or alternatively, connect to access point (AP) 116 via interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable the connections to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a “lower PHY” split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally or alternatively, one or more of RAN nodes 120-122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle radio resource control (RRC) and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system network 100 is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to an secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers (as) 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CM-CN 130 (e.g., universal mobile telecommunications system packet services (UMTS PS) domain, LTE PS data services, etc.). Application server 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2). Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
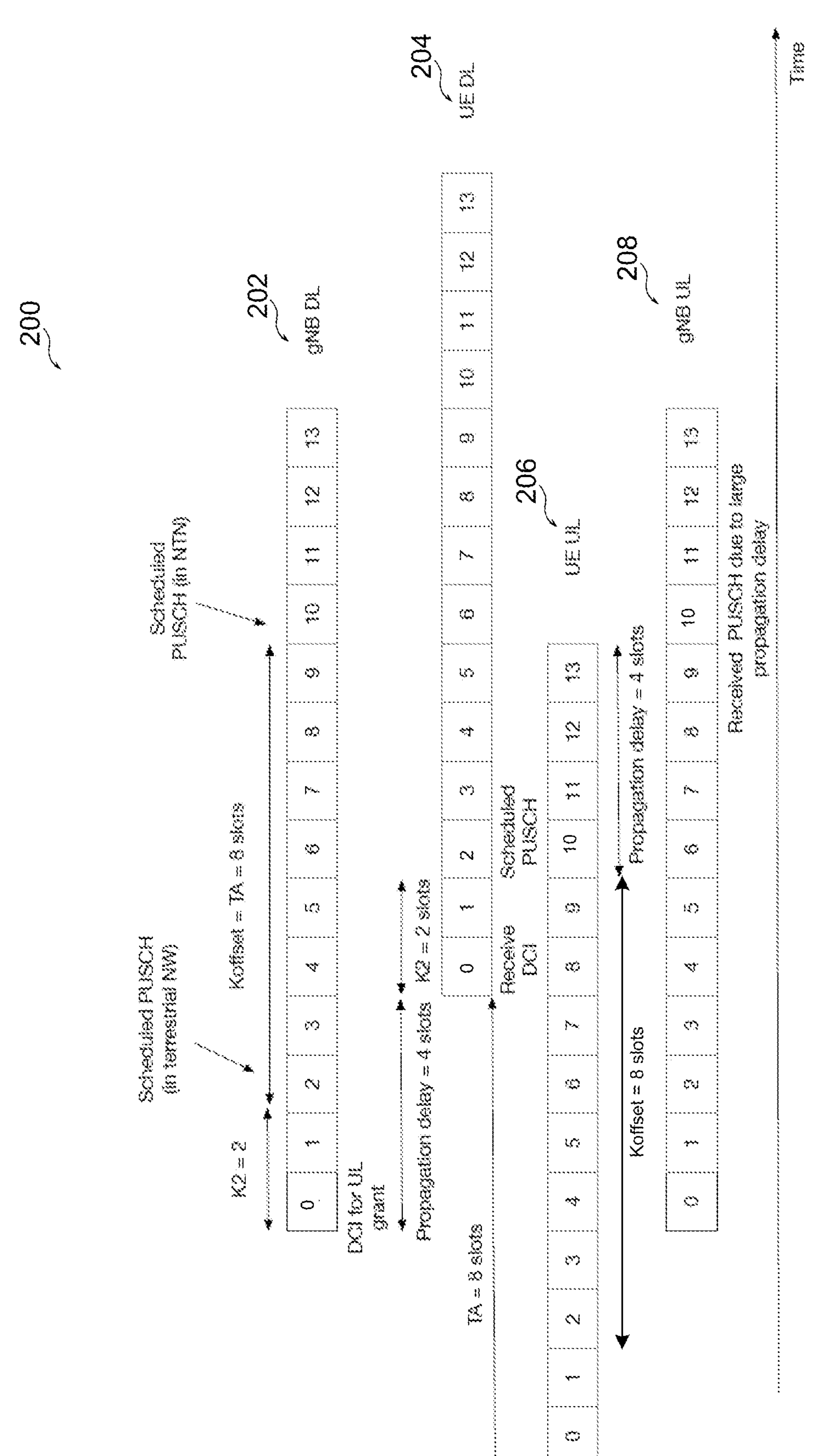
FIG. 2 illustrates non-terrestrial network (NTN) timing relationships, according to one embodiment of the disclosure.

FIG. 2 is an illustration of an example embodiment of NTN timing relationships 200. As can be seen, the downlink control information (DCI) for uplink grant is at slot 0 of gNB downlink (DL) frame 202 and K2 is set to 2 slots. If there was no large propagation delay, as in terrestrial networks (TNs), the scheduled PUSCH would be received at slot 2 of gNB DL frame 202 (based on K2). However, due to the DL propagation delay of 4 slots (can be different in different embodiments) in NTN, the DCI is received at UE DL frame 204 after 4 slots. A timing advance (TA) of 8 slots is applied to UE uplink (UL) frame 206. In some embodiments, the TA is used to determine when to send a UL frame/slot. The scheduled PUSCH is provided at slot 10 of UE UL frame 206 after applying a timeoffset Koffset of 8 slots, which due to a UL propagation delay of 4 slots, reaches the gNB UL frame 208 at slot 10, which is K2+timeoffset Koffset. The time offset Koffset is introduced in NR Rel-16 for NTN networks to account for the large propagation delay in NTN network. In some embodiments, the time offset Koffset is indicative of a time delay in downlink (DL) to uplink (UL) interaction between a UE and a base station. In some embodiments, the time delay in DL to UL interaction refers to a time delay for a wireless signal to traverse from a base station to a UE and then back to the base station, and/or a time delay for a wireless signal to traverse from a user equipment (UE) to a base station and then back to the UE. In some embodiments, the time offset Koffset is defined in slots. In some embodiments, the time offset Koffset is utilized to enhance existing timing of UE transmission types (e.g. DCI scheduled PUSCH as shown in FIG. 2, RAR scheduled PUSCH, PUCCH, MAC CE action timing, aperiodic SRS, as well as the CRI-RS reference resource).

In this embodiment, the time offset $K_{offset}$ is shown to be equal to 8 slots which is equal to two times propagation delay (i.e., round-trip propagation delay). In some embodiments, the propagation delay is a delay in propagation of a signal between the UE and the base station. In some embodiments, when there is a satellite that acts as a relay between the UE and the base station, the propagation delay is a sum of the delay in propagation between the UE and the satellite, and the delay in propagation between the satellite and the base station. However, in other embodiments, the time offset $K_{offset}$ may be different from the round-trip propagation delay, for example, greater than two times the propagation delay. In this embodiment, the time offset $K_{offset}$ enables the base station to determine a correct slot of the scheduled PUSCH reception. In particular, the slot for DCI scheduled PUSCH is K2+time offset $K_{offset}$. Further, the time offset $K_{offset}$ is utilized by the UE to determine a correct slot for the scheduled PUSCH transmission. However, in other embodiments, the time offset $K_{offset}$ may be used differently. In this particular embodiment, the Koffset is shown to be equal to timing advance (TA), which is typically double the propagation delay. However, in other embodiments, the Koffset may be larger than TA. In some embodiments, the TA and Koffset are used jointly by the UE. For example, while Koffset may be used to determine which UL slot for its uplink transmission, TA is used to determine when to send a UL frame/slot.

In some embodiments, the time offset $K_{offset}$ is determined at the base station based on the round-trip propagation delay between the UE and the base station, and one or more other factors. In some embodiments, the base station is further configured to provide time offset $K_{offset}$ to a UE. Currently, the base station is configured to determine a single value of the time offset (e.g., an initial time offset) and provide the initial time offset to the UE. However, moving satellite changes propagation delays between the satellite and the UE/base station. In order to account for the changing propagation delays, the time offset $K_{offset}$ needs to be updated. Disclosed herein are systems, circuitries, and techniques for allowing the base station and the UE to update the time offset $K_{offset}$. In addition, systems, circuitries, and techniques for utilizing the time offset $K_{offset}$ in various scenarios are also disclosed herein.

Figure 3:
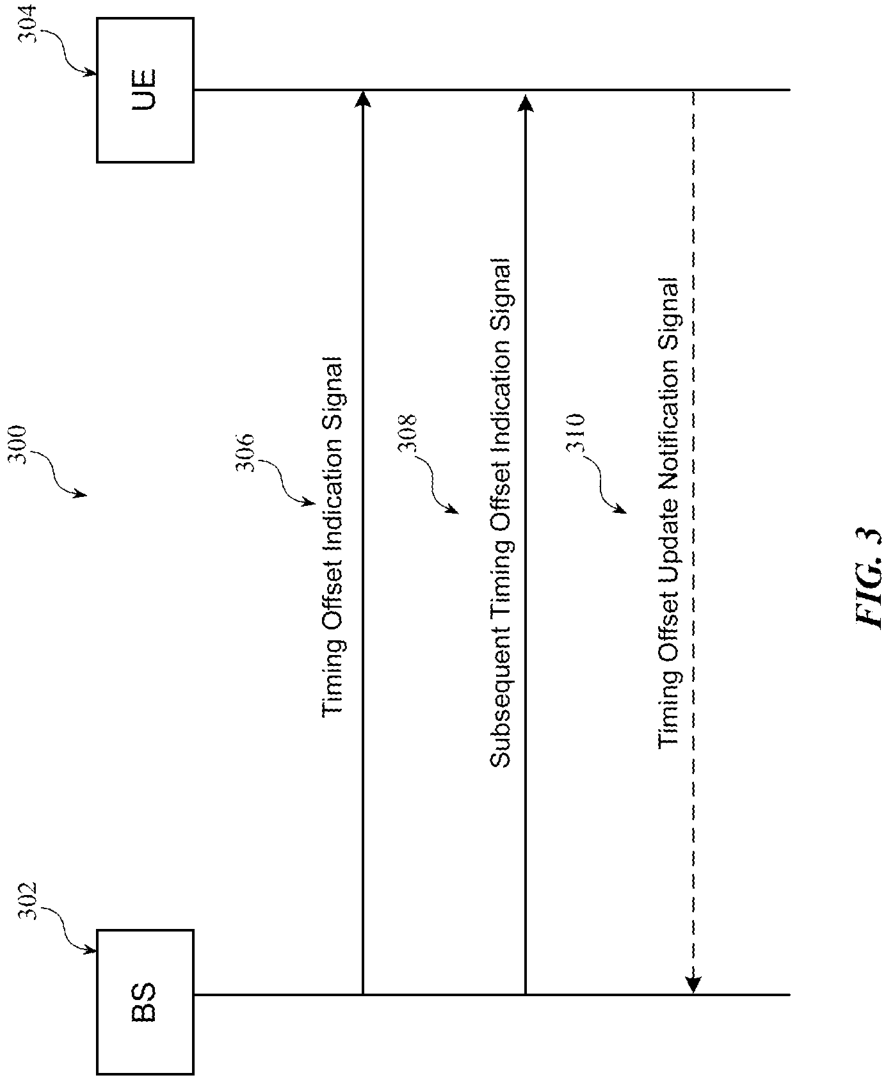
FIG. 3 illustrates a simplified block diagram of a wireless communication system that facilitates to update a time offset, according to one embodiment of the disclosure.

FIG. 3 illustrates a simplified block diagram of a wireless communication system 300, according to one embodiment of the disclosure. In some embodiments, the wireless communication system 300 comprises a non-terrestrial network (NTN) communication system. In some embodiments, the wireless communication system 300 facilitates to update a time offset $K_{offset}$, further details of which are provided below. The wireless communication system 300 comprises a base station (BS) 302 and a user equipment (UE) 304. In some embodiments, the wireless communication system 300 further includes a satellite as shown in FIG. 1 or the BS 302 may be part of a satellite and is not shown here for ease of depiction. In some embodiments, base station 302 is equivalent to an eNodeB in LTE systems, gNodeB in 5G new radio (NR) systems etc. In some embodiments, the UE 304 may comprise a mobile phone, tablet computer, an internet of things (IoT) device, a vehicle-to-everything (V2X) UE, etc. The base station 302 and the UE 304 are configured to communicate with one another over a communication medium (e.g., air).

In some embodiments, the BS 302 is configured to send a timing offset indication signal 306 to the UE 304. In some embodiments, the timing offset indication signal 306 comprises a first time offset Koffset1 or an associated parameter. In some embodiments, the timing offset indication signal 306 enables the UE 304 to determine the first time offset Koffset1. In some embodiments, the associated parameter included within the timing offset indication signal 306 comprises a parameter that is indicative of the first time offset Koffset1 or a parameter that facilitates the UE 304 to determine the first time offset Koffset1. In some embodiments, the first time offset Koffset1 is indicative of a time delay in downlink (DL) to uplink (UL) interaction between UE 304 and the base station 302. In some embodiments, the first time offset Koffset1 is the same or larger than two times of a propagation delay between the UE 304 and the base station 302. In some embodiments, the first time offset Koffset1 is similar to the time offset $K_{offset}$ described above. The UE 304 is configured to process the timing offset indication signal 306 and determine the first timing offset Koffset1 based thereon. In some embodiments, the BS 302 is configured to determine the first time offset Koffset1, prior to sending the timing offset indication signal 306 to the UE 304. Alternately, in other embodiments, the BS 302 may not be configured to determine the first time offset Koffset1, prior to sending the timing offset indication signal 306 to the UE 304. In such embodiments, the UE 304 may be configured to determine the first time offset Koffset1 based on the associated parameter within the timing offset indication signal 306, and indicate the determined first time offset Koffset1 back to the BS 302.

In some embodiments, the first time offset Koffset1 comprises an initial time offset that is to be utilized by the UE 304 during an initial access procedure (in order to gain access to the BS 302), for example, a random access channel (RACH) procedure. In some embodiments, the initial time offset comprises a first value of the time offset $K_{offset}$ that is utilized by the UE 304. In some embodiments, the initial time offset may comprise a cell-specific time offset or a beam-specific time offset. In some embodiments, the initial time offset may be broadcasted from the BS 302 to the UE 304 via system information signals, for example, system information blocks (SIB). In such embodiments, therefore, the timing offset indication signal 306 comprises a system information signal like SIB1. However, in other embodiments, the initial time offset may be provided to the UE 304 via other signals, for example, UE-specific signals. In some embodiments, the initial time offset is signaled together with a common timing advance (TA). In some embodiments, the initial time offset is utilized by the UE 304 on Msg 3 and/or ACK for Msg 4 in a 4-step RACH procedure. Further, in some embodiments, the initial time offset is utilized by the UE 304 on ACK for MsgB (SuccessRAR) and/or Msg3 for MsgB (FallbackRAR).

In some embodiments, moving satellite changes propagation delays between satellite and the UE 304/BS 302. Therefore, to account for the changes in propagation delays, in some embodiments, the first time offset Koffset1 needs to be updated. In some embodiments, the BS 302 is triggered to update the first time offset Koffset1, based on the changes in propagation delays. Alternately, in some embodiments, the BS 302 is triggered to update the first time offset Koffset1, upon beam switching between satellites. Additionally, in other embodiments, other factors could also trigger the BS 302 to update the first time offset Koffset1. Once the BS 302 is triggered to update the first time offset Koffset1, the BS 302 is configured to determine a second time offset Koffset2 to update/replace the first time offset K1. In some embodiments, the BS 302 is further configured to send a subsequent timing offset indication signal 308 comprising the second time offset or an associated parameter, in order to enable the UE 304 to determine the second time offset Koffset2. In some embodiments, the second time offset is indicative of the time delay in DL to uplink UL interaction between the UE 304 and the base station 302. In some embodiments, the second time offset is the same or larger than two times of the propagation delay between the UE 304 and the base station 302. In some embodiments, the associated parameter included within the subsequent timing offset indication signal 308 comprises a parameter that is indicative of the second time offset or a parameter that facilitates the UE 304 to determine the second time offset. Alternately, in some embodiments, once the BS 302 is triggered to update the first time offset Koffset1, the BS 302 may provide the subsequent timing offset indication signal 308 to the UE 302-304 without determining the second time offset Koffset2. In such embodiments, the subsequent timing offset indication signal 308 may only include the associated parameter. In such embodiments, the second time offset Koffset2 is determined at the UE 302-304 based on processing the subsequent timing offset indication signal 308 and may be indicated to the BS 302 from the UE 302 304 by sending a timing offset update notification signal 310 (e.g., higher level signaling) comprising the second time offset.

In some embodiments, the UE 304 is configured to determine the second time offset Koffset2 based on processing the subsequent timing offset indication signal 308. Upon determining the second time offset Koffset2, the UE 304 is further configured to update/replace the first time offset Koffset1 with the second time offset Koffset2. In some embodiments, the second time offset Koffset2 is also similar to the time offset $K_{offset}$ explained above. In some embodiments, the second time offset Koffset2 may be beam-specific, UE group specific or UE specific. In some embodiments, the second time offset Koffset2 is to be utilized by the BS 302/UE 304 after the initial access procedure (for example, RACH procedure). In some embodiments, the UE 304 is triggered to determine the second time offset Koffset2 in order to update the first time offset Koffset1, upon receiving the subsequent timing offset indication signal 308. Alternately, in other embodiments, the UE 304 is triggered to determine the second time offset Koffset2 in order to update the first time offset Koffset1, when a predefined threshold is exceeded at the UE 304 based on one or more parameters indicated in the subsequent timing offset indication signal 308, further details are given in embodiments below.

In one embodiment, the subsequent timing offset signal 308 comprises a random access response (RAR) message comprising the second time offset. In some embodiments, the second time offset Koffset2 is signaled in the RAR message together with a timing advance (TA) command. In another embodiment, the subsequent timing offset signal 308 comprises a common radio resource control (RRC) message or a dedicated RRC message comprising the second time offset. In such embodiments, the UE 304 is triggered to determine the second time offset Koffset2 in order to update the first time offset Koffset1 upon receiving the common RRC message or the dedicated RRC message from the BS 302. In some embodiments, the common RRC message is suitable for beam-specific $K_{offset}$ and the dedicated RRC message is suitable for UE-specific $K_{offset}$. In yet another embodiment, the subsequent timing offset signal 308 comprises a group common downlink control information (DCI) comprising the second time offset. Further, in some embodiments, the subsequent timing offset signal 308 comprises a dedicated DCI comprising the second time offset or a parameter indicative of the second time offset.

In some embodiments, the dedicated DCI may include a time offset field (e.g., Koffset field) that comprises the second time offset Koffset2. Alternately, in other embodiments, the Koffset field may include an entry index (i.e., the parameter indicative of the second time offset Koffset2) to a preconfigured table of Koffset. Further, in some embodiments, the Koffset field may include a relative Koffset (i.e., the parameter indicative of the second time offset Koffset2). In such embodiments, the UE 304 is configured to determine the second time offset Koffset2 by adding the relative Koffset to the first time offset, as given in equation (1) below.

$$\text{Koffset\_new} = \text{Koffset\_old} + \text{relative } Koffset \tag{1}$$

Where Koffset_new is the second time offset and the Koffset_old is the first time offset.

In the embodiments where the subsequent timing offset indication signal 308 comprises the group common DCI or the dedicated DCI, the UE 304 is triggered to determine the second time offset Koffset2 in order to update the first time offset Koffset1 upon receiving the group common DCI or the dedicated DCI. In some embodiments, the group common DCI is suitable for UE group specific $K_{offset}$ and the dedicated DCI is suitable for UE-specific $K_{offset}$. Further, in another embodiment, the subsequent timing offset signal 308 comprises a dedicated time offset media access control (MAC) control element (CE), for example, a Koffset MAC CE, comprising the second time offset or a timing advance (TA) command MAC CE comprising the second time offset or a timing drift rate MAC CE comprising the second time offset. In such embodiments, the UE 304 is triggered to determine the second time offset Koffset2 in order to update the first time offset Koffset1 upon receiving the dedicated time offset MAC CE comprising the second time offset or the TA command MAC CE comprising the second time offset or the timing drift rate MAC CE comprising the second time offset.

Furthermore, in another embodiment, the subsequent timing offset signal 308 comprises a (TA) command MAC CE without the second time offset Koffset2. In such embodiments, the second time offset Koffset2 is derived from a TA command included within the TA command MAC CE. In particular, at first, a new TA value, TA_new is determined based on the TA command in the TA MAC CE as given below:

$$TA\_new = TA\_old + TA\_command \quad (2)$$

Where TA_old is an old value of TA and the TA_command is the TA command included in the TA command MAC CE. Then, the second time offset Koffset2 is determined based on TA_new. In some embodiments, the second time offset Koffset2 is a function of TA_new. In some embodiments, the relation between TA_new and the second time offset Koffset2 is predefined. In such embodiments, the UE 304 is triggered to determine the second time offset Koffset2 in order to update the first time offset Koffset1 upon receiving the TA command MAC CE without the second time offset Koffset2.

In another embodiment, the subsequent timing offset signal 308 comprises random access response message. However, in this embodiment, the RAR message does not include the second time offset Koffset2 as explained above. Rather, in such embodiments, the second time offset Koffset2 is derived at the UE 302-304 based on a TA command included in the RAR message. In particular, at first, a new value of TA, TA_new is derived based on the TA command in RAR and a common TA as given below:

$$TA\_new = TA \text{ command in } RAR + \text{common } TA \quad (2)$$

In some embodiments, the common TA may be provided to the UE 304 via higher level signaling from the BS 302. Upon determining the TA_new, the second time offset Koffset2 is determined based on the TA_new. In some embodiments, the second time offset Koffset2 is a function of TA_new. For example, a0<=TA_new<a1, then Koffset_new=b0; a1<=TA_new<a2, then Koffset_new=b1; etc., where Koffset_new is the second time offset Koffset2. In some embodiments, in addition to TA_new, the second time offset Koffset2 may also depend on UL or DL numerology (e.g., subcarrier spacing (SCS)). For example, SCS=15 kHz, a0<=TA_new<a1, then Koffset_new=b0; a1<=TA_new<a2, then Koffset_new=b1, etc. Similarly, SCS=30 kHz, a0'<=TA new<a1', then Koffset new=b0'; a1'<=TA new<a2', then Koffset new=b1', etc.

Alternately, in some embodiments, the subsequent timing offset signal 308 comprises a timing drift rate indication signal comprising a timing drift rate R_drift. In some embodiments, the timing drift rate R_drift may comprise a dedicated R_drift or a common R_drift. In some embodiments, the R_drift is indicative of changes/drift of the satellite position and also addresses the moving satellite Doppler shift. In such embodiments, the second time offset Koffset2 is derived at the UE 304 based on the R_drift indicated in the timing drift rate indication signal. In particular, the second time offset Koffset2 is derived at the UE 304 based on an autonomously maintained TA that varies as a function of the timing drift rate R_drift. Upon receiving the timing drift rate indication signal, at first, a new value of the autonomously maintained TA, TA_new is determined based on an earlier/old value of the autonomously maintained TA, TA_old and the R_drift as given below:

$$TA\_new = TA\_old + R\_drift * Delta\_t \quad (3)$$

Where Delta_t is the time gap between UE's reception of two timing drift rates or TA command MAC CE. Then the second time offset Koffset2 is derived based on the TA_new. In some embodiments, the second time offset Koffset2 is a function of TA_new. In some embodiments, the relation between TA_new and the second time offset Koffset2 is predefined.

In such embodiments, the UE 304 is triggered to determine the second time offset Koffset2 in order to update the first time offset Koffset1, only when the TA_new exceeds a predefined threshold. Therefore, in embodiments where the TA_new exceeds the predefined threshold, UE 304 determines the second time offset Koffset2 based on TA_new and autonomously updates the first time offset Koffset1 with the second time offset Koffset2. Alternately, in embodiments where the TA_new does not exceed the predefined threshold, UE 304 does not determine the second time offset Koffset2. In some embodiments, the BS 302 knows the value of the second time offset derived at the UE 304 based on the knowledge of the UE's autonomously maintained TA. Alternately, in other embodiments, the UE 304 may trigger higher level signaling (e.g., the timing offset update notification signal 310) to notify the BS 302 of the determined second time offset Koffset2.

Referring back to FIG. 3, in some embodiments, the BS 302 may be further configured to determine a third time offset Koffset3 to update/replace the second time offset Koffset2 at a subsequent time instance. More particularly, the BS 302 may be configured to update the time offset in subsequent iterations, based on the changing propagation delays or other related factors. In such embodiments, the BS 302 may be configured to provide a further timing offset indication signal (not shown) to the UE 304, in order to update the second time offset Koffset2 with the third time offset Koffset3. To account for this possibility, even though the first time offset Koffset1 is explained above a being the initial time offset utilized during the initial access procedure, in other embodiments, the first time offset Koffset1 may comprise a time offset that is obtained by updating/replacing the initial time offset in one or more subsequent iterations. In other words, the first time offset Koffset1 may be similar to the second time offset Koffset2 obtained based on updating the initial time offset in one or more iterations. In such embodiments, therefore, the timing offset indication signal 306 may comprise any of the signals as explained above with respect to the subsequent timing offset indication signal 308. Therefore, although not shown, in such embodiments, the BS 302 may be configured to provide one or more timing offset indication signals to the UE 304, prior to providing the timing offset indication signal 306, in order to enable the UE 304 to determine the initial time offset and the one/or more previous iterations of the time offset.

Figure 4A:
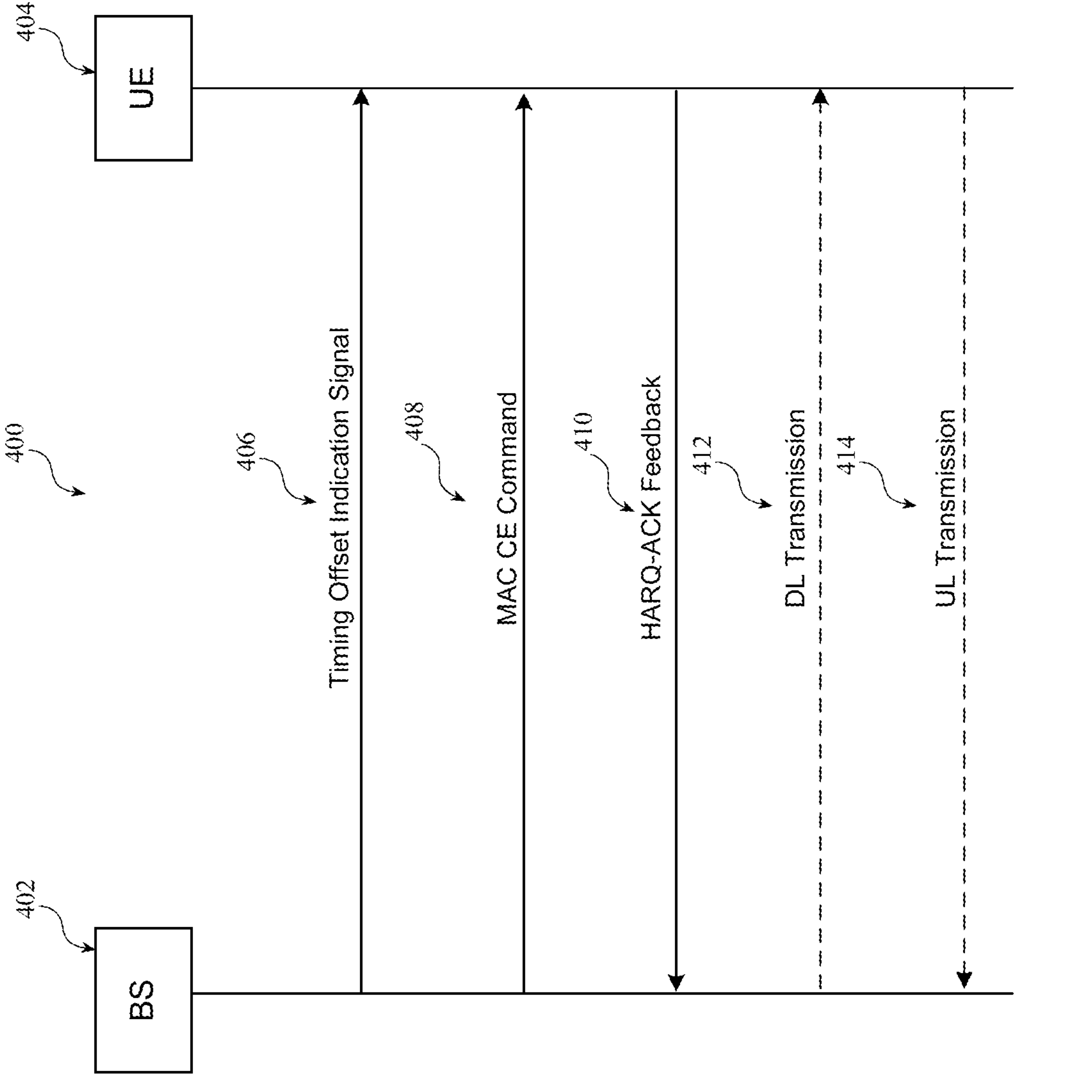
FIG. 4*a* illustrates a simplified block diagram of a wireless communication system that facilitates determining a media access control (MAC) control element (CE) activation timing based on a time offset, according to one embodiment of the disclosure.

FIG. 4*a* illustrates a simplified block diagram of a wireless communication system 400, according to one embodiment of the disclosure. In some embodiments, the wireless communication system 400 comprises a non-terrestrial network (NTN) communication system. In some embodiments, the wireless communication system 400 facilitates determining a media access control (MAC) control element (CE)

activation timing based on a time offset, further details of which are provided below. The wireless communication system 400 comprises a base station (BS) 402 and a user equipment (UE) 404. In some embodiments, the wireless communication system 400 further includes a satellite as shown in FIG. 1 or the BS 402 may be part of a satellite, and is not shown here for ease of depiction. In some embodiments, base station 402 is equivalent to an eNodeB in LTE systems, gNodeB in 5G new radio (NR) systems etc. In some embodiments, the UE 404 may comprise a mobile phone, tablet computer, an internet of things (IoT) device, a vehicle-to-everything (V2X) UE, etc. The base station 402 and the UE 404 are configured to communicate with one another over a communication medium (e.g., air).

In some embodiments, the BS 402 is configured to send a timing offset indication signal 406 to the UE 404. In some embodiments, the timing offset indication signal 406 enables the UE 404 to determine a time offset Koffset. In some embodiments, the timing offset indication signal 406 comprises the time offset Koffset or an associated parameter. In some embodiments, the associated parameter included within the timing offset indication signal 406 comprises a parameter that is indicative of the time offset or a parameter that facilitates the UE 404 to determine the time offset Koffset. In some embodiments, the BS 402 is configured to determine the time offset Koffset, prior to sending the timing offset indication signal 406 to the UE 404. Alternately, in other embodiments, the BS 402 may send the timing offset indication signal 406, without determining the time offset Koffset. In such embodiments, the timing offset indication signal 406 comprises only the associated parameter. In some embodiments, the time offset Koffset is indicative of a time delay in downlink (DL) to uplink (UL) interaction between UE 404 and the base station 402. In some embodiments, the time offset Koffset is the same or larger than two times of a propagation delay between the UE 404 and the base station 402. In some embodiments, the time offset Koffset is similar to the time offset $K_{offset}$ described above with respect to FIG. 2 and FIG. 3. The UE 404 is configured to process the timing offset indication signal 406 and determine the timing offset Koffset based thereon.

In some embodiments, the BS 402 is further configured to send a media access control (MAC) control element (CE) command 408 to the UE 404. In some embodiments, the MAC CE command 408 is included as part of a physical downlink shared channel (PDSCH). In some embodiments, the MAC CE command 408 may comprise a downlink (DL) MAC CE. In some embodiments, the DL MAC CE is configured to configure the UE 404 to receive a DL transmission 412 from the BS 402. Alternately, in other embodiments, the MAC CE command 408 may comprise an uplink (UL) MAC CE. In some embodiments, the UL MAC CE is configured to configure the UE 404 to send a UL transmission 414 to the BS 402. The UE 404 is configured to receive and process the MAC CE command 408. The UE 404 is further configured to generate and send a hybrid automatic repeat request (HARQ) acknowledge (ACK) feedback 410, in response to receiving the MAC CE command 408.

Additionally, the UE 404 is configured to determine a MAC CE activation time at which the MAC CE command is activated, based on the determined time offset, depending on whether the MAC CE command 408 comprises a DL MAC CE command or a UL MAC CE command. When the MAC CE command 408 comprises the DL MAC CE command, the MAC CE activation time of the DL MAC CE command is referred to as a DL MAC CE activation time. In some embodiments, the DL MAC CE activation time that is determined at the UE 404 comprises a time of receipt of the DL transmission 412 (that is configured by the DL MAC CE command 408) from the BS 402. When the MAC CE command 408 comprises the UL MAC CE command, the MAC CE activation time of the UL MAC CE command is referred to as a UL MAC CE activation time. In some embodiments, the UL MAC CE activation time that is determined at the UE 404 comprises a time for sending the UL transmission 414 (that is configured by the UL MAC CE command 408) to the BS 402.

Figure 4B:
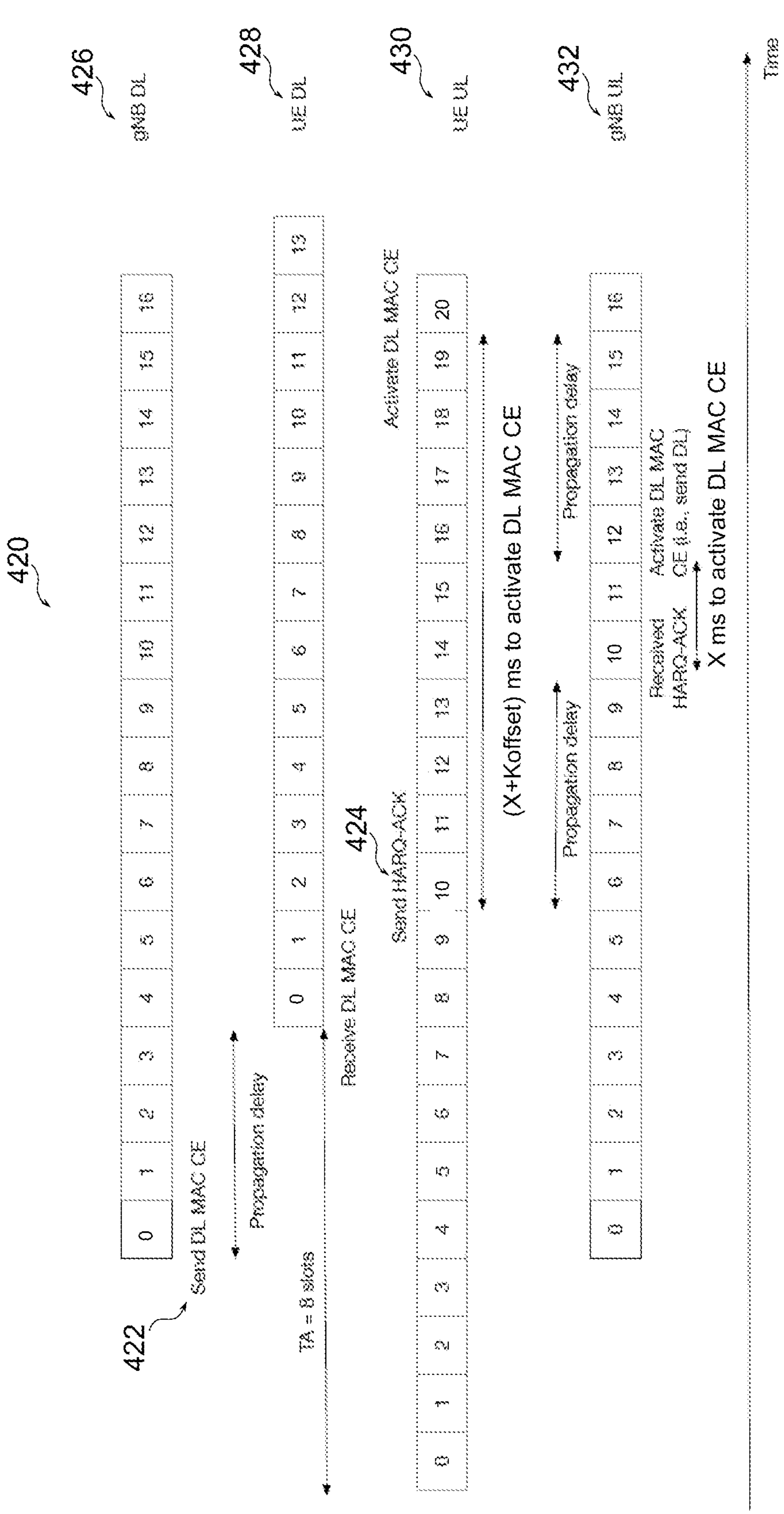
FIG. 4*b* depicts an example illustration of a DL MAC CE activation timing relationship in an NTN communication system, according to one embodiment of the disclosure.

When the MAC CE command 408 comprises the DL MAC CE command, the DL MAC CE activation time is determined to be at a time instance corresponding to (X+time offset) after sending the HARQ-ACK feedback 410. In some embodiments, X is a predefined number and may be less than or equal to 3 ms. In some embodiments, X and the time offset are measured in slots. Alternately, in other embodiments, embodiments, X and the time offset are measured in milliseconds (ms). In some embodiments, the time offset is to compensate the propagation delay between the UE 404 and the base station 402. In other embodiments, the time offset is to compensate the propagation delay between the UE 404 and a reference point. In some embodiments, the reference point is defined as the point where the timing alignment of uplink and downlink frames can be observed. The reference point may be set at satellite, at base station, or anywhere in the service link (i.e. UE to satellite link), or anywhere in the feeder link (i.e., satellite to base station link). Upon determining the DL MAC CE activation time, the UE 404 is further configured to activate the DL MAC CE command at the determined DL MAC CE activation time. In some embodiments, activating the DL MAC CE command comprises receiving the DL transmission 412 as configured by the DL MAC CE command 408. FIG. 4*b* depicts an example illustration of a DL MAC CE activation timing relationship 420 in an NTN communication system, according to one embodiment of the disclosure. A DL MAC CE 422 (similar to the MAC CE command 408 in FIG. 4*a*) is send from a BS (e.g., the BS 402 in FIG. 4*a*) to a UE (e.g., the UE 404 in FIG. 4*a*) using a slot 0 of a gNB DL frame 426.

The DL MAC CE 422 is received at the UE DL frame 428 after a propagation delay of 4 slots. A HARQ-ACK feedback 424 (similar to the HARQ-ACK feedback 410 in FIG. 4*a*) is sent to the BS at slot 10 of the UE UL frame 430, by considering a timing advance (TA) of 8 slots. Upon sending the HARQ-ACK feedback 424, a DL MAC CE activation time is determined at slot 20 of the UE UL frame 430, which is after (X+Koffset) slots after sending the HARQ-ACK feedback 424. In some embodiments, the DL MAC CE activation time is determined to be after (X+Koffset) slots from sending the HARQ-ACK feedback 424, to account for the propagation delay in receiving the HARQ-ACK feedback 424 at the BS (i.e., at the gNB UL frame 432) and to account the propagation delay in sending the DL transmission from the BS to the UE. Upon determining the DL MAC CE activation time, a DL transmission (e.g., the DL transmission 412 in FIG. 4*a*) is received at the UE at slot 20.

Figure 4C:
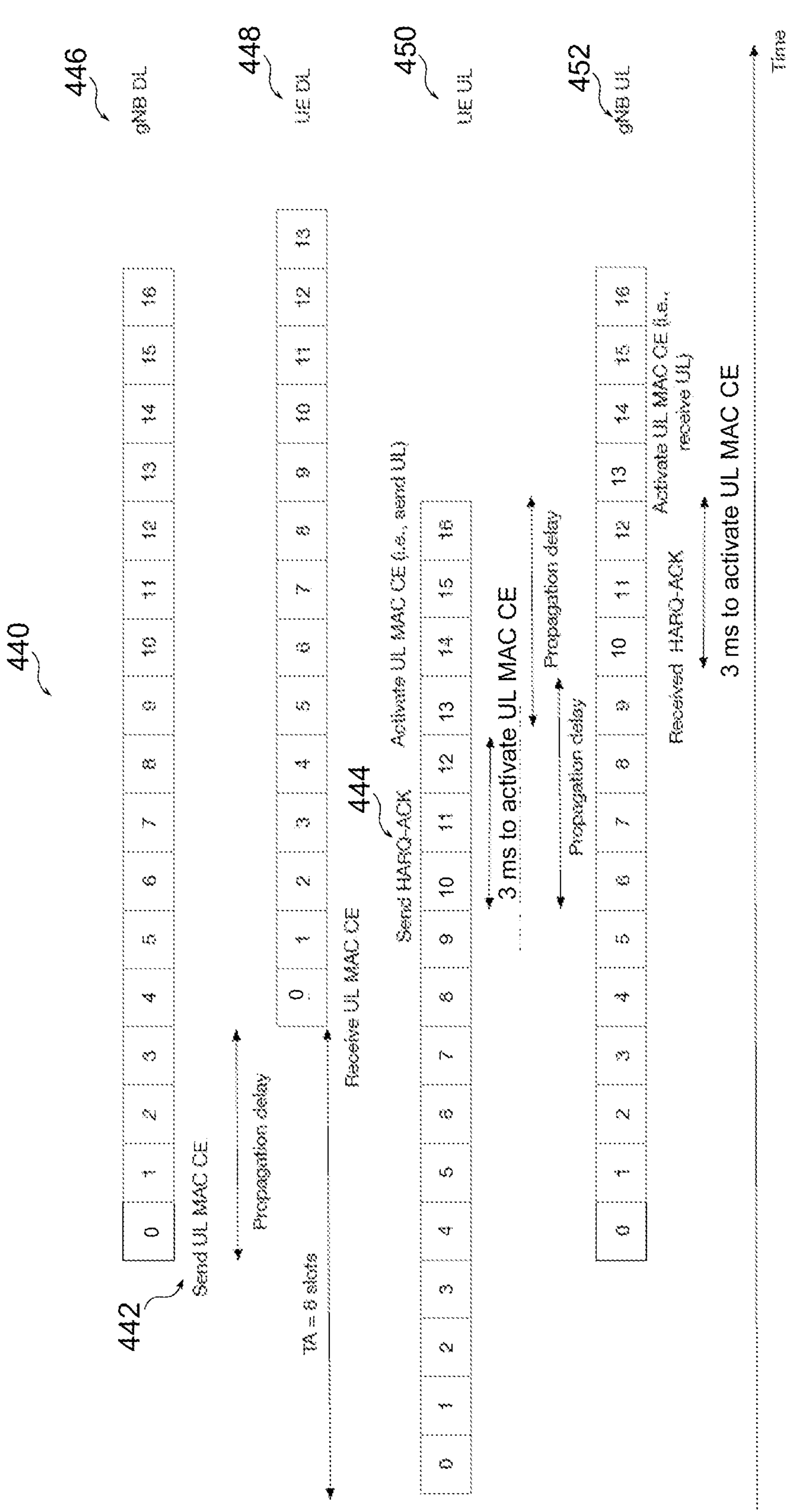
FIG. 4*c* depicts an example illustration of a UL MAC CE activation timing relationship in an NTN communication system, according to one embodiment of the disclosure.

Referring back to FIG. 4*a*, when the MAC CE command 408 comprises the UL MAC CE command, the UL MAC CE activation time is determined to be at a time instance corresponding to K milliseconds (ms) after sending the HARQ-ACK feedback 410. In some embodiments, K is a predefined number. In some embodiments, K is equal to 3. In other words, in some embodiments, the UL MAC CE activation time is determined to be at a time instance corresponding to 3 ms after sending the HARQ-ACK feedback 410. Upon determining the UL MAC CE activation time, the UE 404 is further configured to activate the UL MAC CE command at the determined UL MAC CE activation time. In some embodiments, activating the UL MAC CE command comprises sending the UL transmission 414 as configured by the UL MAC CE command 408. FIG. 4*c* depicts an example illustration of a UL MAC CE activation timing relationship 440 in an NTN communication system, according to one embodiment of the disclosure.

A UL MAC CE 442 (similar to the MAC CE command 408 in FIG. 4*a*) is sent from a BS (e.g., the BS 402 in FIG. 4*a*) to a UE (e.g., the UE 404 in FIG. 4*a*) using a slot 0 of a gNB DL frame 446. The UL MAC CE 442 is received at the UE DL frame 448 after a propagation delay of 4 slots. A HARQ-ACK feedback 444 (similar to the HARQ-ACK feedback 410 in FIG. 4*a*) is sent to the BS at slot 10 of the UE UL frame 450, by applying a timing advance (TA) of 8 slots. Upon sending the HARQ-ACK feedback 444, a UL MAC CE activation time is determined at slot 13 of the UE UL frame 430, which is after 3 ms after sending the HARQ-ACK feedback 444. Upon determining the UL MAC CE activation time, a UL transmission (e.g., the UL transmission 414 in FIG. 4*a*) is sent from the UE at the determined UL MAC CE activation time.

Figure 5:
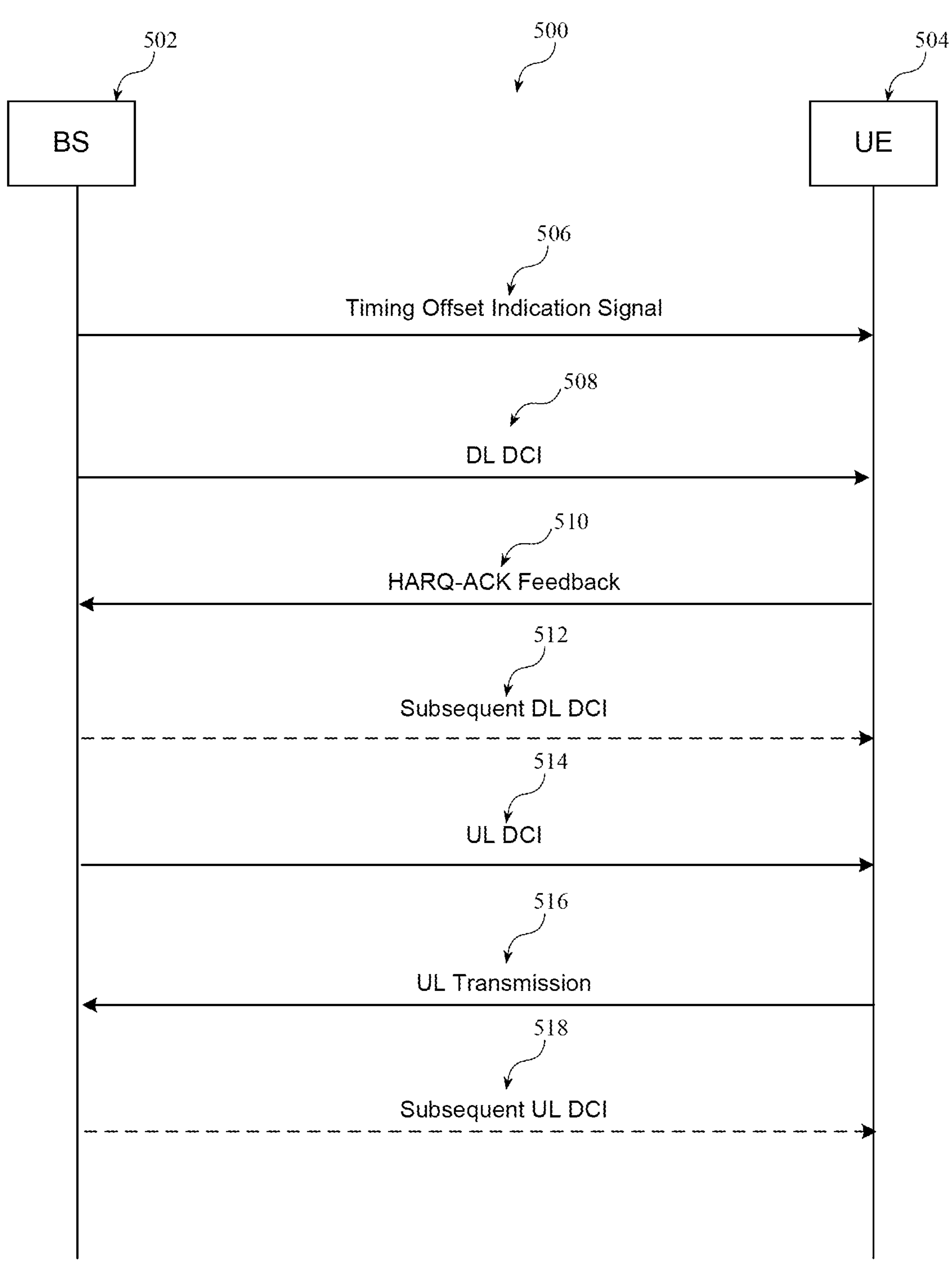
FIG. 5 illustrates a simplified block diagram of a wireless communication system that utilizes time offset in HARQ retransmissions, according to one embodiment of the disclosure.

FIG. 5 illustrates a simplified block diagram of a wireless communication system 500, according to one embodiment of the disclosure. In some embodiments, the wireless communication system 500 comprises a non-terrestrial network (NTN) communication system. In some embodiments, the wireless communication system 500 utilizes time offset in HARQ retransmissions, further details of which are provided below. The wireless communication system 500 comprises a base station (BS) 502 and a user equipment (UE) 504. In some embodiments, the wireless communication system 500 further includes a satellite as shown in FIG. 1 or the BS 502 may be part of a satellite, and is not shown here for ease of depiction. In some embodiments, base station 502 is equivalent to an eNodeB in LTE systems, gNodeB in 5G new radio (NR) systems etc. In some embodiments, the UE 504 may comprise a mobile phone, tablet computer, an internet of things (IoT) device, a vehicle-to-everything (V2X) UE, etc. The base station 502 and the UE 504 are configured to communicate with one another over a communication medium (e.g., air).

In some embodiments, the BS 502 is configured to send a timing offset indication signal 506 to the UE 504. In some embodiments, the timing offset indication signal 506 enables the UE 504 to determine a time offset Koffset. In some embodiments, the timing offset indication signal 506 comprises the time offset Koffset or an associated parameter. In some embodiments, the associated parameter included within the timing offset indication signal 506 comprises a parameter that is indicative of the time offset or a parameter that facilitates the UE 504 to determine the time offset Koffset. In some embodiments, the BS 502 is configured to determine the time offset Koffset, prior to sending the timing offset indication signal 506 to the UE 504. Alternately, in other embodiments, the BS 502 may send the timing offset indication signal 506, without determining the time offset Koffset. In such embodiments, the timing offset indication signal 506 comprises only the associated parameter. In some embodiments, the time offset Koffset is indicative of a time delay in downlink (DL) to uplink (UL) interaction between UE 504 and the base station 502. In some embodiments, the time offset Koffset is the same or larger than two times of a propagation delay between the UE 504 and the base station 502. In some embodiments, the time offset Koffset is similar to the time offset $K_{offset}$ described above with respect to FIG. 2 and FIG. 3. The UE 504 is configured to process the timing offset indication signal 506 and determine the timing offset Koffset based thereon.

In some embodiments, the BS 502 is further configured to send a DL downlink control information (DCI) 508 to the UE 504. In some embodiments, the DL DCI 508 schedules a DL transmission (not shown) from the BS 502 to the UE 504. In some embodiments, the DL DCI 508 identifies a first hybrid automatic repeat request (HARQ) process number. Although not shown, in some embodiments, the DL transmission may be sent as part of/or together with the DL DCI 508. Upon receiving the DL DCI 508, the UE 504 is further configured to send a HARQ ACK feedback 510, in response to receiving the DL DCI 508 or the associated DL transmission. In some embodiments, the HARQ-ACK feedback 510 is sent by the UE 504, in order to acknowledge (ACK) or not acknowledge (NACK) the receipt of the DL DCI 508 or the associated DL transmission.

In some embodiments, the UE 504 and the BS 502 are configured with hybrid automatic repeat request (HARQ) acknowledge (ACK) feedback or HARQ retransmissions (e.g., by the DL DCI 508). Therefore, the BS 502 is further configured to send a subsequent DL DCI 512 with the same first HARQ process number as the DL DCI 508 to the UE 504, when the HARQ-ACK feedback 510 from the UE 504 comprises a NACK or when the HARQ-ACK feedback 510 from the UE is not received at the BS 502 within a predefined time interval from sending the DL DCI 508. In some embodiments, the UE 504 is further configured to receive the subsequent DL DCI 512. In some embodiments, aggregated retransmissions or blind retransmissions of the DL DCI 508 is disabled. In order to disable aggregated retransmissions of the DL DCI 508, an aggregation factor within the DL DCI 508 or a corresponding physical downlink shared channel (PDSCH) configuration is not configured or configured as 1. Alternately or additionally, a time domain resource allocation (TDRA) field within the DL DCI 508 does not indicate aggregated retransmissions. In order to disable blind retransmissions of the DL DCI, the DL DCI 508 indicates no future blind transmissions. In the embodiments where the aggregated/blind transmissions are disabled, both the DL DCI 508 and the HARQ-ACK feedback 510 comprises a single transmission. In such embodiments, therefore, the subsequent DL DCI 512 comprises a DL DCI that is received at the UE 504 after sending the single transmission of the HARQ-ACK feedback 510 to the BS 502.

Alternately, in other embodiments, aggregated retransmissions or blind retransmissions of the DL DCI is enabled. In order to enable the aggregated retransmissions of the DL DCI, the aggregation factor within the DL DCI 508 or the corresponding physical downlink shared channel (PDSCH) configuration is configured with a specific number of retransmissions. Alternately or additionally, the time domain resource allocation (TDRA) field within the DL DCI 508 indicates aggregated retransmissions. In order to enable blind retransmissions of the DL DCI, the DL DCI 508 indicates future blind transmissions. In the embodiments where the aggregated/blind transmissions are enabled, although not shown, the DL DCI 508 comprises a plurality of aggregated/blind retransmissions of the DL DCI and the HARQ-ACK feedback 510 comprises a respective plurality of HARQ-ACK feedbacks. In particular, in such embodiments, the plurality of aggregated/blind retransmissions of the DL DCI are sent (e.g., at predefined time intervals) from the BS 502 to the UE 504, without waiting for a corresponding HARQ-ACK feedback from the UE 504. In some embodiments, a number of transmissions within the plurality of aggregated/blind transmissions is predefined (e.g., within the DL DCI 508). In such embodiments, therefore, the subsequent DL DCI 512 comprises a DL DCI that is received at the UE 504 after sending a last HARQ-ACK feedback of the plurality of HARQ-ACK feedbacks to the BS 502.

Upon receiving the subsequent DL DCI 512 indicating the same first HARQ process number as in DL DCI 508, the UE 504 is configured to selectively process the subsequent DL DCI 512, based on the time offset derived based on the timing offset indication signal 506. In particular, when the aggregated/blind retransmissions are disabled and HARQ-ACK feedback is enabled, the UE 504 is configured to process the subsequent DL DCI 512, when the subsequent DL DCI 512 is received at a time period/instance after a time equivalent to the time offset from sending the single transmission of the HARQ-ACK feedback 510. Further, the UE 504 is configured not to process (ignore processing) the subsequent DL DCI 512, when the subsequent DL DCI 512 is received at a time period/instance within the time equivalent to the time offset from sending the single transmission of the HARQ-ACK feedback 510. In such embodiments, the UE 504 may further be configured to send an error signal (not shown) that indicates that the subsequent DL DCI 512 is not processed.

In embodiments where the aggregated/blind retransmissions are enabled and HARQ-ACK feedback is enabled, the UE 504 is configured to process the subsequent DL DCI 512, when the subsequent DL DCI 512 is received at a time period/instance after a time equivalent to the time offset from sending a last HARQ-ACK feedback of the plurality of HARQ-ACK feedbacks 510. Further, the UE 504 is configured not to process (ignore processing) the subsequent DL DCI 512, when the subsequent DL DCI 512 is received at a time period/instance within the time equivalent to the time offset from sending the last HARQ-ACK feedback of the plurality of HARQ-ACK feedbacks 510. In such embodiments, the UE 504 may further be configured to send an error signal (not shown) that indicates that the subsequent DL DCI 512 is not processed. In some embodiments, processing the subsequent DL DCI 512 based on the time offset is based on the fact that at least a time equivalent to the time offset is required between sending the HARQ-ACK feedback 510 (or the last HARQ-ACK feedback of the plurality of HARQ-ACK feedbacks 510) from the UE 504 and receiving the subsequent DL DCI 512 at the UE 504.

Referring back to FIG. 5, in some embodiments, the BS 502 is further configured to send a UL downlink control information (DCI) 514 to the UE 504. In some embodiments, the UL DCI 514 is configured to schedule a UL transmission 516 from the UE 504 to the BS 502. In some embodiments, the UL DCI 514 identifies a second hybrid automatic repeat request (HARQ) process number. In this embodiment, the UL DCI 514 is shown to be sent after sending the DL DCI 508. However, in other embodiments, the UL DCI 514 may be sent without sending the DL DCI 508. In other words, in some embodiments, the UL DCI 514 may be sent independent of sending the DL DCI 508. The UE 504 is configured to receive and process the UL DCI 514. Upon processing the UL DCI 514, the UE 504 is further configured to send the UL transmission 516 to the BS 502. In some embodiments, the UE 504 and the BS 502 are configured with HARQ retransmissions (e.g., by the UL DCI 514). Therefore, the BS 502 is further configured to send a subsequent UL DCI 518 with the same second HARQ process number as the UL DCI 514 to the UE 504, when the UL transmission 516 from the UE 504 is not received at the BS 502 within a predefined time interval from sending the UL DCI 514.

In some embodiments, the UE 504 is further configured to receive the subsequent UL DCI 518. In some embodiments, aggregated retransmissions or blind retransmissions of the UL DCI 514 is disabled. In order to disable aggregated retransmissions of the UL DCI 514, an aggregation factor within the UL DCI 514 or a corresponding physical uplink shared channel (PUSCH) configuration is not configured or configured as 1. Alternately or additionally, a time domain resource allocation (TDRA) field within the UL DCI 514 does not indicate aggregated retransmissions. In order to disable blind retransmissions of the UL DCI 514, the UL DCI 514 indicates no future blind transmissions. In the embodiments where the aggregated/blind transmissions are disabled, both the UL DCI 514 and the UL transmission 516 comprises a single transmission. In such embodiments, therefore, the subsequent UL DCI 518 comprises a UL DCI that is received at the UE 504 after sending the single transmission of the UL transmission 516 to the BS 502.

Alternately, in other embodiments, aggregated retransmissions or blind retransmissions of the UL DCI 514 are enabled. In order to enable the aggregated retransmissions of the UL DCI 514, the aggregation factor within the UL DCI 514 or the corresponding physical uplink shared channel (PUSCH) configuration is configured with a specific number of retransmissions. Alternately or additionally, the time domain resource allocation (TDRA) field within the UL DCI 514 indicates aggregated retransmissions. In order to enable blind retransmissions of the UL DCI 514, the UL DCI 514 indicates future blind transmissions. In the embodiments where the aggregated/blind transmissions are enabled, although not shown, the UL DCI 514 comprises a plurality of aggregated/blind retransmissions of the UL DCI and the UL transmission 516 comprises a respective plurality of UL transmissions. In particular, in such embodiments, the plurality of aggregated/blind retransmissions of the UL DCI are send (e.g., at predefined time intervals) from the BS 502 to the UE 504, without waiting for a corresponding UL transmission from the UE 504. In such embodiments, therefore, the subsequent UL DCI 518 comprises a UL DCI that is received at the UE 504 after sending a last UL transmission of the plurality of UL transmissions to the BS 502.

Upon receiving the subsequent UL DCI 518 indicating the same HARQ process number as in UL DCI 514, the UE 504 is configured to selectively process the subsequent UL DCI 518, based on the time offset derived based on the timing offset indication signal 506. In particular, when the aggregated/blind retransmissions are disabled, the UE 504 is configured to process the subsequent UL DCI 518, when the subsequent UL DCI 518 is received at a time period/instance after a time equivalent to the time offset from sending the single transmission of the UL transmission 516. Further, the UE 504 is configured not to process (ignore processing) the subsequent UL DCI 518, when the subsequent UL DCI 518 is received at a time period/instance within the time equivalent to the time offset from sending the single transmission of the UL transmission 516. In such embodiments, the UE 504 may further be configured to send an error signal (not shown) that indicates that the subsequent UL DCI 518 is not processed.

In embodiments where the aggregated/blind retransmissions are enabled, the UE 504 is configured to process the subsequent UL DCI 518, when the subsequent DL DCI 518 is received at a time period/instance after a time equivalent to the time offset from sending a last UL transmission of the plurality of UL transmissions 516. Further, the UE 504 is configured not to process (ignore processing) the subsequent UL DCI 518, when the subsequent UL DCI 518 is received at a time period/instance within the time equivalent to the time offset from sending the last UL transmission of the plurality of UL transmissions 516. In such embodiments, the UE 504 may further be configured to send an error signal (not shown) that indicates that the subsequent UL DCI 518 is not processed. In some embodiments, processing the subsequent UL DCI 512 based on the time offset is based on the fact that at least a time equivalent to the time offset is required between sending the UL transmission 516 (or the last UL transmission of the plurality of UL transmissions 516) from the UE 504 and receiving the subsequent UL DCI 518 at the UE 504.

Figure 6:
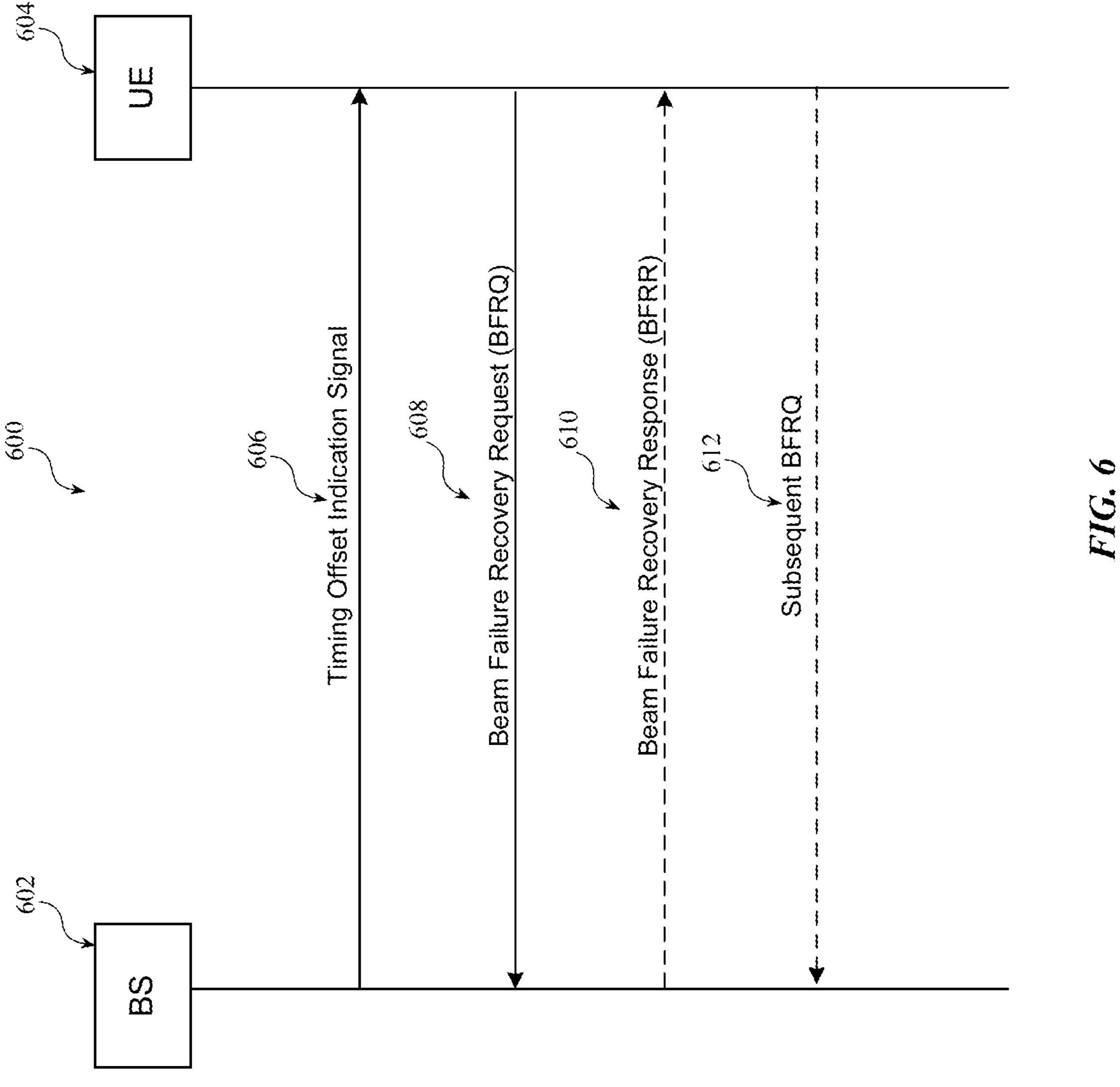
FIG. 6 illustrates a simplified block diagram of a wireless communication system that utilizes time offset in determining a time window for receiving a beam failure recovery response (BFRR), according to one embodiment of the disclosure.

FIG. 6 illustrates a simplified block diagram of a wireless communication system 600, according to one embodiment of the disclosure. In some embodiments, the wireless communication system 600 comprises a non-terrestrial network (NTN) communication system. In some embodiments, the wireless communication system 600 utilizes time offset in determining a time window for receiving a beam failure recovery response (BFRR), further details of which are provided below. The wireless communication system 600 comprises a base station (BS) 602 and a user equipment (UE) 604. In some embodiments, the wireless communication system 600 further includes a satellite as shown in FIG. 1 or the BS 602 may be part of a satellite, and is not shown here for ease of depiction. In some embodiments, base station 602 is equivalent to an eNodeB in LTE systems, gNodeB in 5G new radio (NR) systems etc. In some embodiments, the UE 604 may comprise a mobile phone, tablet computer, an internet of things (IoT) device, a vehicle-to-everything (V2X) UE, etc. The base station 602 and the UE 604 are configured to communicate with one another over a communication medium (e.g., air).

In some embodiments, the BS 602 is configured to send a timing offset indication signal 606 to the UE 604. In some embodiments, the timing offset indication signal 606 enables the UE 604 to determine a time offset Koffset. In some embodiments, the timing offset indication signal 606 comprises the time offset Koffset or an associated parameter. In some embodiments, the associated parameter included within the timing offset indication signal 606 comprises a parameter that is indicative of the time offset or a parameter that facilitates the UE 604 to determine the time offset Koffset. In some embodiments, the BS 602 is configured to determine the time offset Koffset, prior to sending the timing offset indication signal 606 to the UE 504. Alternately, in other embodiments, the BS 602 may send the timing offset indication signal 606, without determining the time offset Koffset. In such embodiments, the timing offset indication signal 606 comprises only the associated parameter. In some embodiments, the time offset Koffset is indicative of a time delay in downlink (DL) to uplink (UL) interaction between UE 604 and the base station 602. In some embodiments, the time offset Koffset is the same or larger than two times of a propagation delay between the UE 604 and the base station 602. In some embodiments, the time offset Koffset is similar to the time offset $K_{offset}$ described above with respect to FIG. 2 and FIG. 3. The UE 604 is configured to process the timing offset indication signal 606 and determine the timing offset Koffset based thereon.

In some embodiments, the UE 604 is further configured to send a beam failure recovery request (BFRQ) 608 to the BS 602. In some embodiments, the BFRQ 608 is indicative of a beam failure. In some embodiments, the BFRQ 608 includes a new beam index indicative of a new beam. The BS 602 is configured to receive and process the BFRQ 608. When the BFRQ 608 is successfully processed at the BS 602, the BS 602 is configured to send beam failure recovery response (BFRR) 610 to the UE 604. In some embodiments, the BFRR 610 acknowledges the receipt of the BFRQ 608. The UE 604 is further configured to receive and process the BFRR 610. In some embodiments, the UE 604 is configured to monitor to receive the BFRR 610, prior to receiving and processing the BFRR 610. In some embodiments, the UE 604 is configured to monitor the BFRR 610 within a BFRR time window after sending the BFRQ 608. In some embodiments, the BFRR time window comprises a time period during which the BFRR 610 is monitored. In some embodiments, one or more parameters of the BFRR time window are determined based on the time offset that is derived based on the timing offset indication signal 606, in order to account for the large propagation delay between sending the BFRQ 608 and receiving the BFRR 610 in NTN communication systems.

In some embodiments, the BFRR time window comprises a time period corresponding to (N+time offset) slots from sending the BFRQ 608 to the BS 602. In some embodiments, N is a predefined number. In some embodiments, N is equal to 4. Alternately, in other embodiments, the BFRR time window starting time is shifted at least by a time corresponding to the time offset from sending the BFRQ-610 608. In other words, the BFRR time window starts after a time corresponding to the time offset from sending the BFRQ 608. For example, in some embodiments, for primary cell (Pcell) beam failure recovery, the BFRR time window starts after a time corresponding to (Y+time offset) slots after sending a contention free physical random access channel (PRACH) comprising the BFRQ 608 to the BS 602. In some embodiments, Y is a predefined number. In some embodiments, Y is equal to 4. Further, in some embodiments, for secondary cell (Scell) beam failure recovery, the BFRR time window starts after a time corresponding to Koffset (or time offset) slots after sending a scheduling request (SR)/media access control (MAC) control element (CE) comprising the BFRQ 608 to the BS 602.

In some embodiments, aggregated retransmission or blind retransmission of the BFRQ 608 (e.g., contention free preamble transmission) may be supported. In such embodiments, the BFRQ 608 comprises a plurality of transmissions of the BFRQ (in accordance with a predefined retransmission number). In such embodiments, the BFRR 610 is monitored within the BFRR time window after a first or a last retransmission of the plurality of retransmissions of the BFRQ. Referring back to FIG. 6, in some embodiments, the UE 604 is further configured to send a subsequent BFRQ 612 to the BS 602, when the BFRR 610 is not received from the BS 602 within the BFRR time window. In some embodiments, sending a subsequent BFRQ 612 is equivalent to resending the BFRQ 608.

Figure 7:
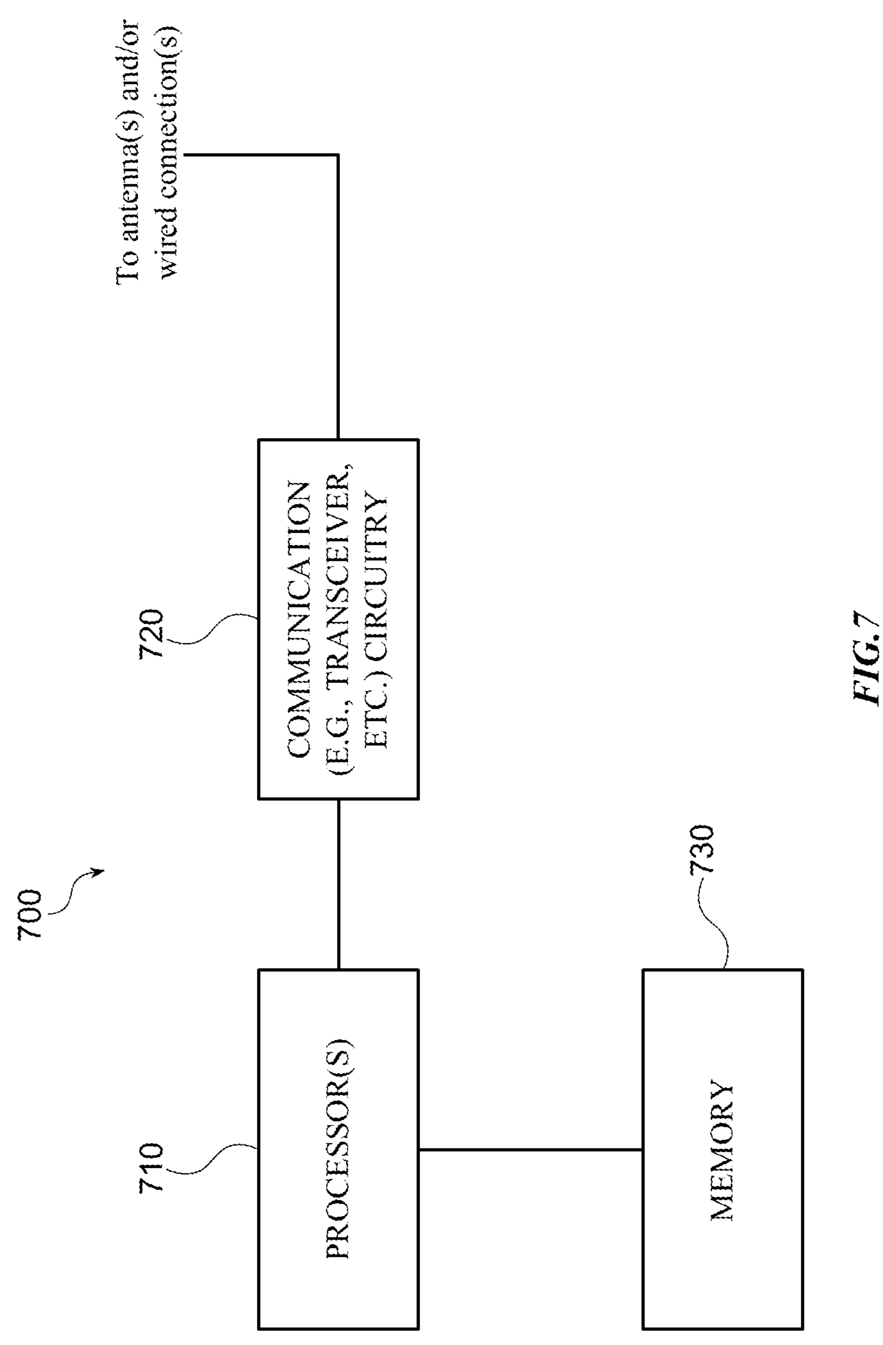
FIG. 7 illustrates a block diagram of an apparatus employable at a Base Station (BS), eNodeB, gNodeB or other network device, according to various aspects described herein.

Referring to FIG. 7, illustrated is a block diagram of an apparatus 700 employable at a Base Station (BS), eNodeB, gNodeB or other network device, according to various aspects described herein. In some embodiments, the apparatus 700 may be included within the base station 302, 402, 502 and 602 in the above embodiments. However, in other embodiments, the apparatus 700 could be included within any base station associated with a wireless communication system. The apparatus 700 can include one or more processors (e.g., one or more baseband processors such as one or more of the baseband processors discussed in connection with FIG. 15 and/or FIG. 16) comprising processor(s) 710 and associated interface(s) (e.g., one or more interface(s) discussed in connection with FIG. 16), transceiver circuitry 720 (e.g., which can comprise circuitry for one or more wired connections and/or part or all of RF circuitry 1506, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 730 (which can comprise any of a variety of storage mediums and can store instructions and/or data associated with one or more of processor(s) 710 or transceiver circuitry 720).

In particular, the term memory is intended to include an installation medium, e. g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 700 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 710, transceiver circuitry 720, and the memory 730 can be included in a single device, while in other aspects, they can be included in different devices, such as part of a distributed architecture. In some embodiments, the one or more processors 710, the transceiver circuitry 720 and the memory circuit 730 may be implemented as part of a modem system on a single integrated circuit (IC). Alternately, in other embodiments, the one or more processors 710, the transceiver circuitry 720 and the memory circuit 730 may be implemented on different ICs.

Figure 8:
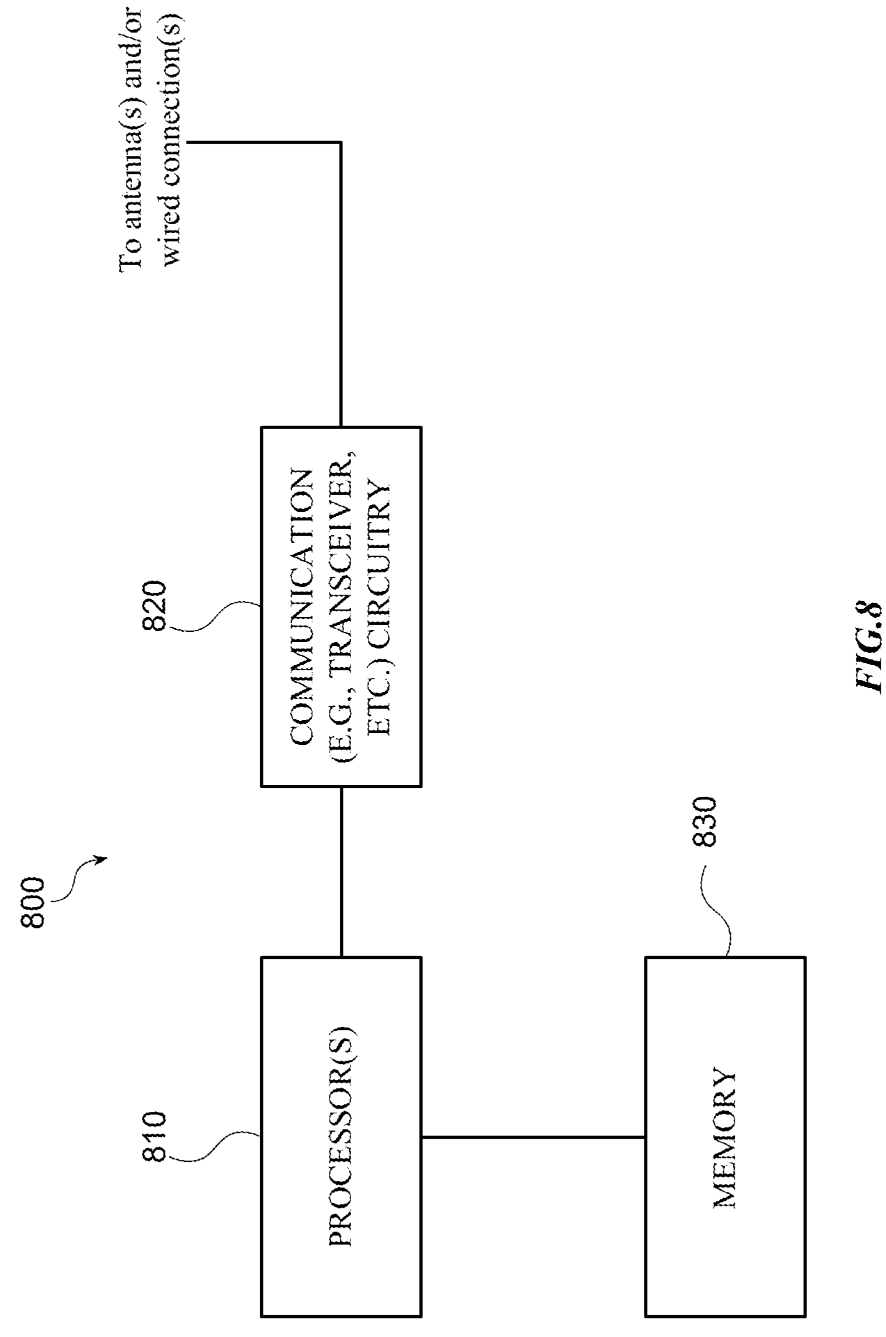
FIG. 8 illustrates a block diagram of an apparatus employable at a user equipment (UE) or other network device (e.g., IoT device), according to various aspects described herein.

Referring to FIG. 8, illustrated is a block diagram of an apparatus 800 employable at a user equipment (UE) or other network device (e.g., IoT device), according to various aspects described herein. In some embodiments, the apparatus 800 may be included within the UE 304, 404, 504 and 605 in the above embodiments. However, in other embodiments, the apparatus 800 could be included within any UE associated with a wireless communication system. Apparatus 800 can include one or more processors 810 (e.g., one or more baseband processors such as one or more of the baseband processors discussed in connection with FIG. 15 and/or FIG. 16) comprising processing circuitry and associated interface(s) (e.g., one or more interface(s) discussed in connection with FIG. 16), transceiver circuitry 820 (e.g., comprising part or all of RF circuitry 1506, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 830 (which can comprise any of a variety of storage mediums and can store instructions and/or data associated with one or more of processor(s) 810 or transceiver circuitry 820). In particular, the term memory is intended to include an installation medium, e. g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In various aspects, apparatus 800 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 810) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 810) can comprise one or more of: identifying physical resources associated with the signal/message, detecting the signal/message, resource element group deinterleaving, demodulation, descrambling, and/or decoding. In some embodiments, the one or more processors 810, the transceiver circuitry 820 and the memory circuit 830 may be implemented as part of a modem system on a single integrated circuit (IC). Alternately, in other embodiments, the one or more processors 810, the transceiver circuitry 820 and the memory circuit 830 may be implemented on different ICs.

Figure 9:
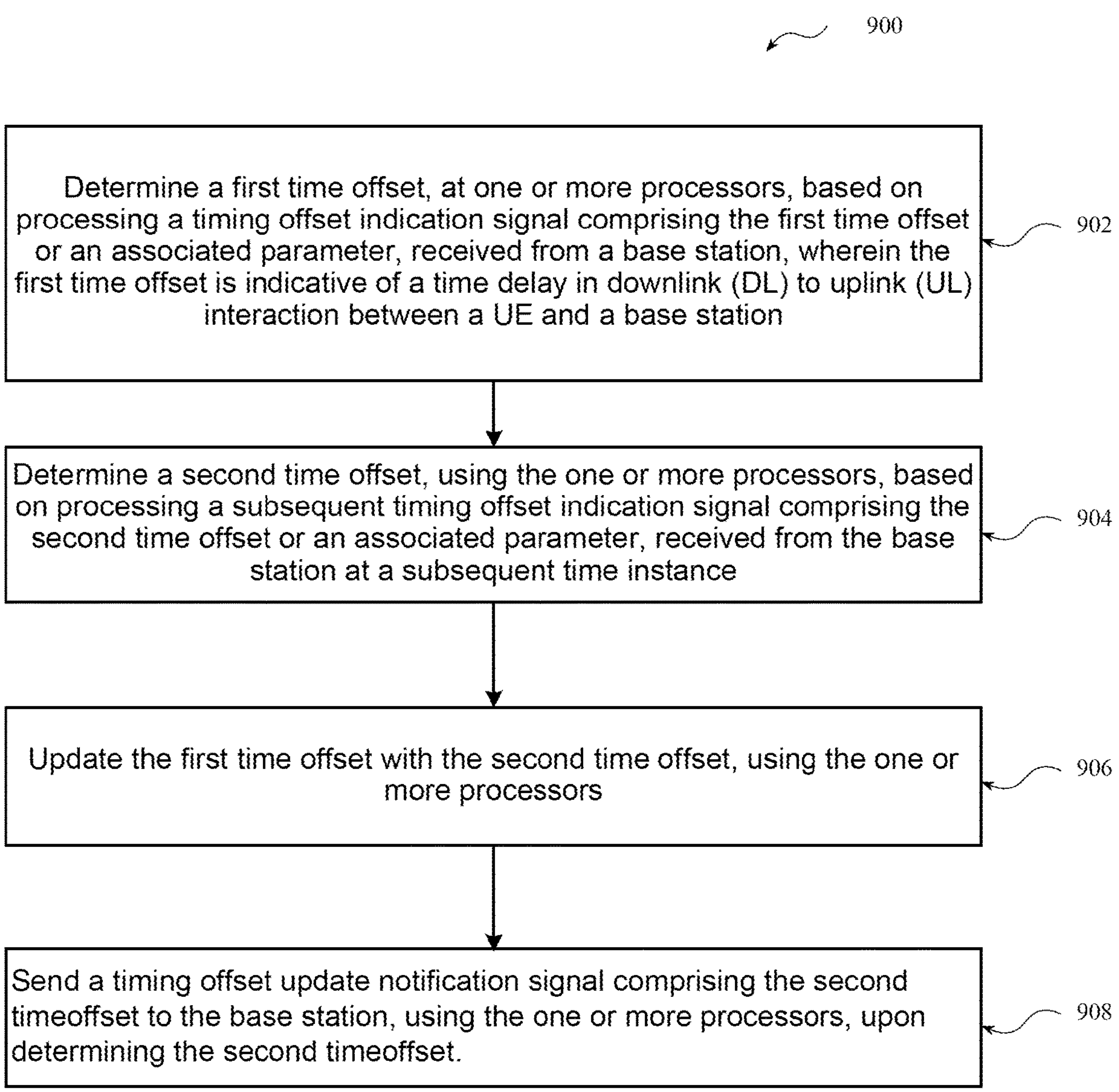
FIG. 9 illustrates a flowchart of a method for a UE associated with a wireless communication system for updating a time offset, according to one embodiment of the disclosure.

FIG. 9 illustrates a flowchart of a method 900 for a UE associated with a wireless communication system (e.g., a non-terrestrial network (NTN) communication system) for updating a time offset, according to one embodiment of the disclosure. The method 900 is explained herein with reference to the apparatus 800 in FIG. 8. In some embodiments, the apparatus 800 could be included within the UE 304 in FIG. 3. Therefore, the method 900 is further explained with reference to the wireless communication system 300 in FIG. 3. At 902, a first time offset (e.g., Koffset1) is determined at the one or more processors 810. In some embodiments, the first time offset is determined based on processing a timing offset indication signal (e.g., the timing offset indication signal 306 in FIG. 3) comprising the first time offset or an associated parameter, received from a base station (e.g., the base station 302 in FIG. 3). In some embodiments, the first time offset is indicative of a time delay in downlink (DL) to uplink (UL) interaction between the UE and the base station. In some embodiments, the first time offset is the same or larger than two times of a propagation delay between the UE and the base station.

At 904, a second time offset (e.g., Koffset2) is determined using the one or more processors 810. In some embodiments, the second time offset is determined based on processing a subsequent timing offset indication signal (e.g., the subsequent timing offset indication signal (e.g., the subsequent timing offset indication signal 308 in FIG. 3) comprising the second time offset or an associated parameter, received from the base station at a subsequent time instance. In some embodiments, the subsequent timing offset indication signal may comprise any of the signals as explained above with respect to FIG. 3. At 906, the first time offset is updated with the second time offset, using the one or more processors 810. At 908, a timing offset update notification signal (e.g., the timing offset update notification signal 310 in FIG. 3) comprising the second time offset is optionally send to the base station, using the one or more processors 810, as explained above with respect to FIG. 3.

FIG. 10 illustrates a flowchart of a method 1000 for a base station associated with a wireless communication system (e.g., a non-terrestrial network (NTN) communication system) for updating a time offset, according to one embodiment of the disclosure. The method 1000 is explained herein with reference to the apparatus 700 in FIG. 7. In some embodiments, the apparatus 700 could be included within the BS 302 in FIG. 3. Therefore, the method 1000 is further explained with reference to the wireless communication system 300 in FIG. 3. At 1002, a timing offset indication signal (e.g., the timing offset indication signal 306 in FIG. 3) comprising a first time offset or an associated parameter, is sent to a UE (e.g., the UE 304 in FIG. 3) using the one or more processors 710, in order to enable the UE to determine the first time offset. In some embodiments, the first time offset is indicative of a time delay in downlink (DL) to uplink (UL) interaction between the UE and the base station. In some embodiments, the first time offset is the same or larger than two times of a propagation delay between the UE and the base station.

At 1004, a second time offset is determined using the one or more processors 710. At 1006, a subsequent timing offset indication signal (e.g., the subsequent timing offset indication signal 308 in FIG. 3) comprising the second time offset or an associated parameter is send to the UE using the one or more processors 710, at a subsequent time instance, in order to enable the UE to update the first time offset with the second time offset. At 1008, a timing offset update notification signal (e.g., the timing offset update notification signal 310 in FIG. 3) comprising the second time offset is received from the UE, using the one or more processors 710. In some embodiments, the BS does not determine the second time offset at 1004, prior to sending the subsequent timing offset indication signal at 1006. In such embodiments, the BS is configured to determine the second time offset, upon processing the timing offset update notification signal received from the UE at 1008.

Figure 11:
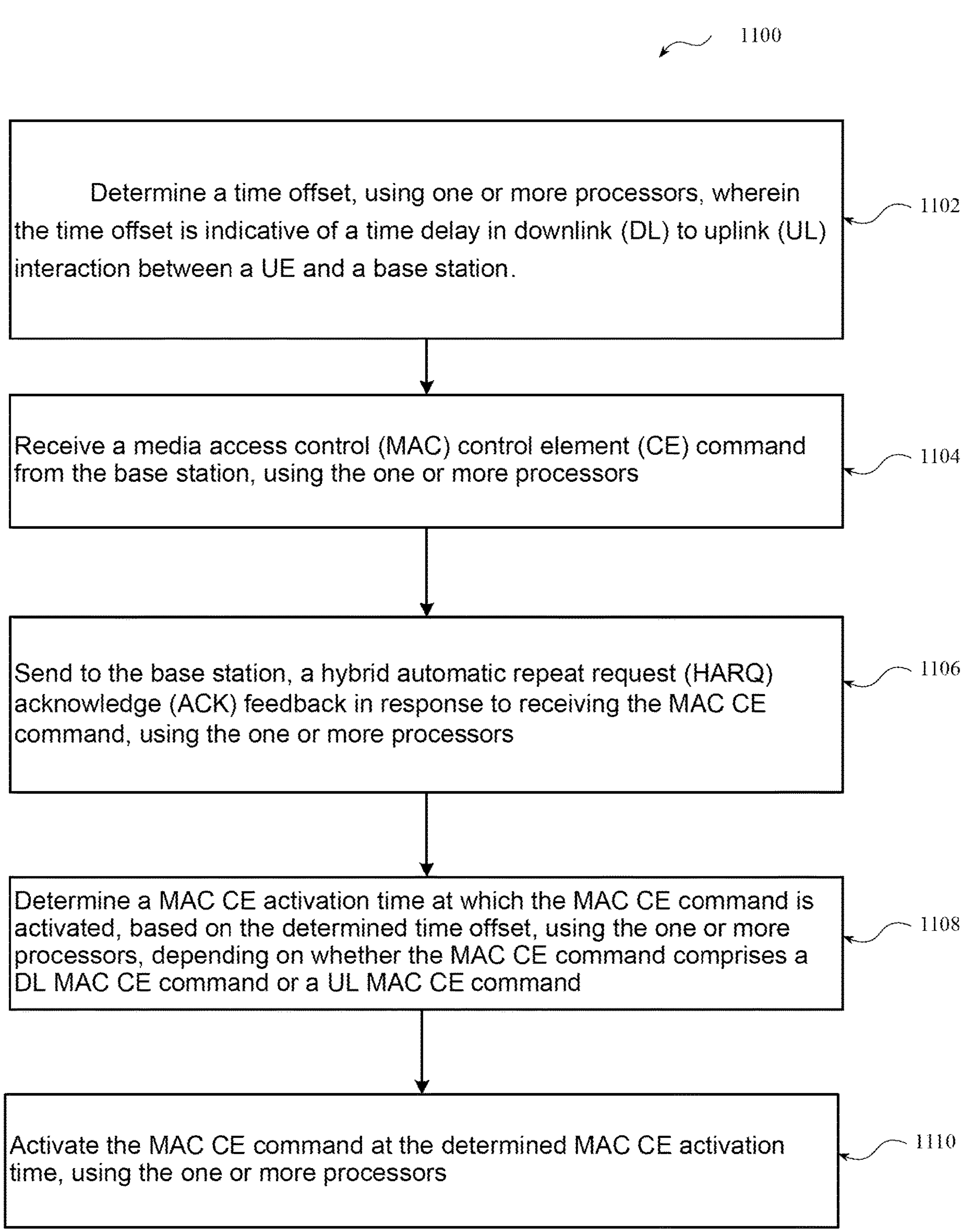
FIG. 11 illustrates a flowchart of a method for a UE associated with a wireless communication system for determining a media access control (MAC) control element (CE) activation timing based on a time offset, according to one embodiment of the disclosure.

FIG. 11 illustrates a flowchart of a method 1100 for a UE associated with a wireless communication system (e.g., a non-terrestrial network (NTN) communication system) for determining a media access control (MAC) control element (CE) activation timing based on a time offset, according to one embodiment of the disclosure. The method 1100 is explained herein with reference to the apparatus 800 in FIG. 8. In some embodiments, the apparatus 800 could be included within the UE 404 in FIG. 4*a*. Therefore, the method 1100 is further explained with reference to the wireless communication system 400 in FIG. 4*a*. At 1102, a time offset (e.g., Koffset) is determined using one or more processors 810. In some embodiments, the time offset is indicative of a time delay in downlink (DL) to uplink (UL) interaction between the UE and a base station (e.g., the BS 402 in FIG. 4*a*). In some embodiments, the time offset is the same or larger than two times of a propagation delay between the UE and the base station. At 1104, a media access control (MAC) control element (CE) command (e.g., the MAC CE command 408 in FIG. 4*a*) is received from the base station, using the one or more processors 810. In some embodiments, the MAC CE command may comprise a DL MAC CE. Alternately, in other embodiments, the MAC CE command may comprise a UL MAC CE.

At 1106, a hybrid automatic repeat request (HARQ) acknowledge (ACK) feedback (e.g., the HARQ-ACK feedback 410 in FIG. 4*a*) is sent to the base station, in response to receiving the MAC CE command, using the one or more processors 810. At 1108, a MAC CE activation time at which the MAC CE command is activated is determined based on the determined time offset, using the one or more processors 810, depending on whether the MAC CE command comprises the DL MAC CE command or the UL MAC CE command. In some embodiments, when the MAC CE command comprises the DL MAC CE, the DL MAC CE activation time (i.e., the time for receiving the DL transmission 412 in FIG. 4*a*) is determined to be at a time instance corresponding to (X+time offset) after sending the HARQ-ACK feedback, where X is a predefined number. Alternately, in other embodiments, when the MAC CE command comprises the UL MAC CE, the UL MAC CE activation time (i.e., the time for sending the UL transmission 414 in FIG. 4*a*) is determined to be at a time instance corresponding to K milliseconds (ms) after sending the HARQ-ACK feedback, where K is a predefined number. In some embodiments, K is equal to 3. At 1110, the MAC CE command is activated at the determined MAC CE activation time, using the one or more processors 810.

FIG. 12 illustrates a flowchart of a method 1200 for a UE associated with a wireless communication system (e.g., a non-terrestrial network (NTN) communication system) that utilizes time offset in HARQ retransmissions, according to one embodiment of the disclosure. The method 1200 is explained herein with reference to the apparatus 800 in FIG. 8. In some embodiments, the apparatus 800 could be included within the UE 504 in FIG. 5. Therefore, the method 1200 is further explained with reference to the wireless communication system 500 in FIG. 5. At 1202, a time offset (e.g., Koffset) is determined using one or more processors 810. In some embodiments, the time offset is indicative of a time delay in downlink (DL) to uplink (UL) interaction between the UE and a base station (e.g., the BS 502 in FIG. 5). In some embodiments, the time offset is the same or larger than two times of a propagation delay between the UE and the base station. At 1204, a downlink control information (DCI) (e.g., the DL DCI 508 or the UL DCI 514 in FIG. 5) that schedules a DL transmission to the UE or a UL transmission from the UE is received from the base station, using the one or more processors 810. In some embodiments, the DCI identifies a hybrid automatic repeat request (HARQ) process number.

At 1206, a subsequent DCI (e.g., the subsequent DL DCI 512 or the subsequent UL DCI 518 in FIG. 5) with the same HARQ process number received from the base station, is selectively processed using the one or more processors 810, based on the determined time offset. For example, when the DCI comprises the DL DCI (e.g., the DL DCI 508 in FIG. 5), the subsequent DCI comprises the subsequent DL DCI (e.g., the subsequent DL DCI 512 in FIG. 5). In such embodiments, when aggregated/blind retransmissions are disabled, the subsequent DL DCI is processed when the subsequent DL DCI is received at a time period/instance after a time equivalent to the time offset from sending of a HARQ-ACK feedback (e.g., the HARQ-ACK feedback 510 in FIG. 5) which is sent in response to receiving the DL DCI. Further, the subsequent DL DCI is not processed, when aggregated/blind transmissions are disabled and the subsequent DL DCI is received at a time period/instance within the time equivalent to the time offset from sending of the HARQ-ACK feedback. When aggregated/blind retransmissions are disabled, the DL DCI and the HARQ-ACK feedback comprises a single transmission. In the embodiments, where aggregated/blind transmissions are enabled, the DL DCI comprises a plurality of aggregated/blind retransmissions of the DL DCI and the HARQ-ACK feedback comprises a respective plurality of HARQ-ACK feedbacks. In such embodiments, the subsequent DL DCI is processed when the subsequent DL DCI is received at a time period/instance after a time equivalent to the time offset from sending a last HARQ-ACK feedback of the plurality of HARQ-ACK feedbacks. Further, the subsequent DL DCI is not processed, when aggregated/blind transmissions are enabled and the subsequent DL DCI is received at a time period/instance within the time equivalent to the time offset from sending the last HARQ-ACK feedback of the plurality of HARQ-ACK feedbacks.

Similarly, when the DCI comprises the UL DCI (e.g., the UL DCI 514 in FIG. 5), the subsequent DCI comprises the subsequent UL DCI (e.g., the subsequent UL DCI 518 in FIG. 5). In such embodiments, when aggregated/blind retransmissions are disabled, the subsequent UL DCI is processed when the subsequent UL DCI is received at a time period/instance after a time equivalent to the time offset from sending of a UL transmission (e.g., the UL transmission 516 in FIG. 5) which is sent in response to receiving the UL DCI. Further, the subsequent UL DCI is not processed, when aggregated/blind transmissions are disabled and the subsequent UL DCI is received at a time period/instance within the time equivalent to the time offset from sending of the UL transmission. When aggregated/blind transmissions are disabled, the UL DCI and the UL transmission comprises a single transmission. In the embodiments where aggregated retransmission or blind retransmission is enabled, the UL DCI comprises a plurality of aggregated/blind retransmissions of the UL DCI and the UL transmission comprises a respective plurality of UL transmissions, as explained above with respect to FIG. 5. In such embodiments, the subsequent UL DCI is processed when the subsequent UL DCI is received at a time period/instance after a time equivalent to the time offset from sending of a last UL transmission of the plurality of UL transmissions. Further, the subsequent UL DCI is not processed, when aggregated/blind transmissions are enabled and the subsequent UL DCI is received at a time period/instance within the time equivalent to the time offset from sending the last UL transmission of the plurality of UL transmissions.

Figure 13:
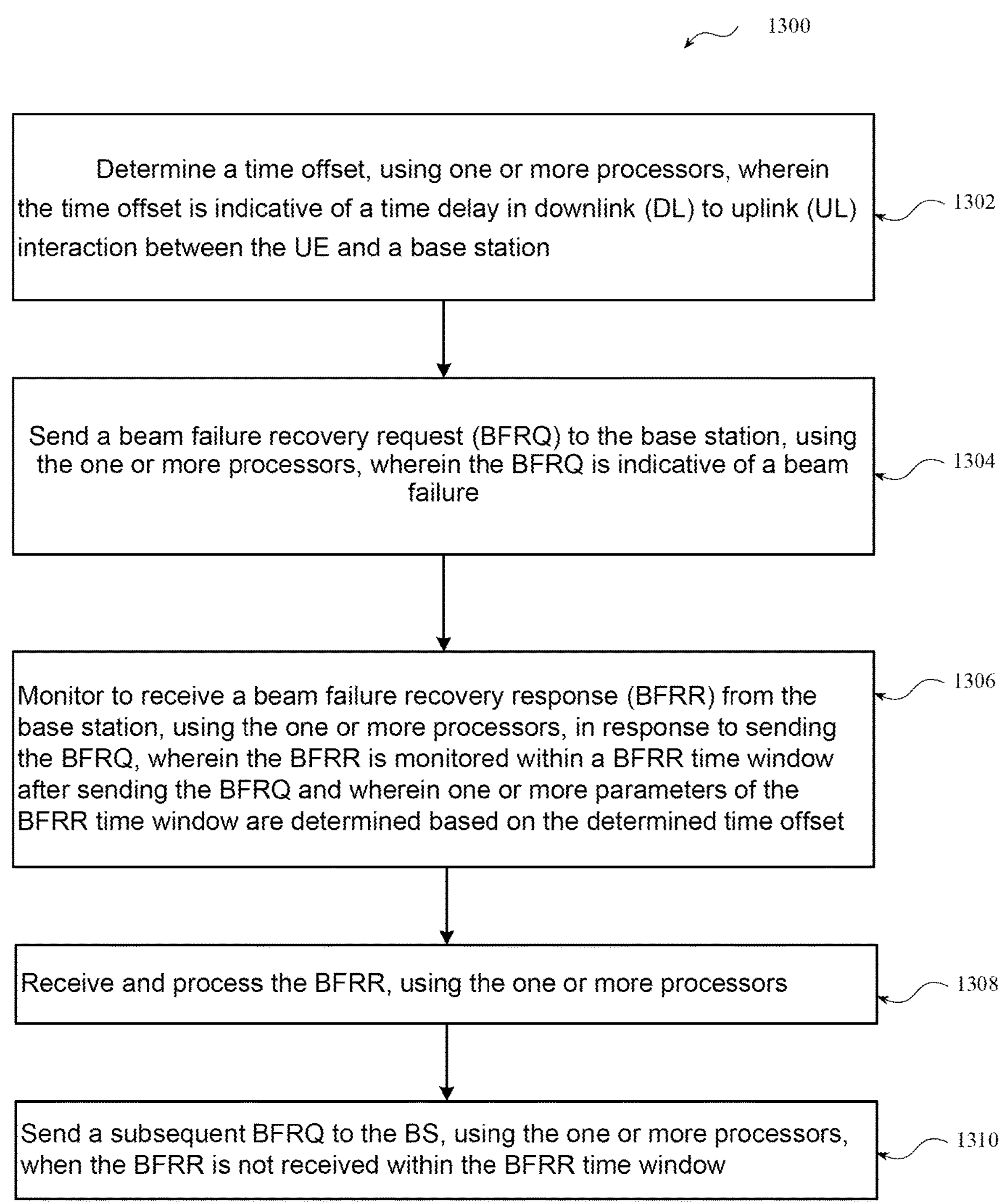
FIG. 13 illustrates a flowchart of a method for a UE associated with a wireless communication system that utilizes time offset in determining a time window for receiving a beam failure recovery response (BFRR), according to one embodiment of the disclosure.

FIG. 13 illustrates a flowchart of a method 1300 for a UE associated with a wireless communication system (e.g., a non-terrestrial network (NTN) communication system) that utilizes time offset in determining a time window for receiving a beam failure recovery response (BFRR), according to one embodiment of the disclosure. The method 1300 is explained herein with reference to the apparatus 800 in FIG. 8. In some embodiments, the apparatus 800 could be included within the UE 604 in FIG. 6. Therefore, the method 1300 is further explained with reference to the wireless communication system 600 in FIG. 6.

At 1302, a time offset (e.g., Koffset) is determined using one or more processors 810. In some embodiments, the time offset is indicative of a time delay in downlink (DL) to uplink (UL) interaction between the UE and a base station (e.g., the BS 602 in FIG. 6). In some embodiments, the time offset is the same or larger than two times of a propagation delay between the UE and the base station. At 1304, a beam failure recovery request (BFRQ) (e.g., the BFRQ 608 in FIG. 6) is sent to the base station, using the one or more processors 810. In some embodiments, the BFRQ is indicative of a beam failure. At 1306, a receipt of a beam failure recovery response (BFRR) (e.g., the BFRR 610 in FIG. 6) from the base station, is monitored using the one or more processors 810, in response to sending the BFRQ. In some embodiments, the BFRR is monitored within a BFRR time window after sending the BFRQ. In some embodiments, one or more parameters of the BFRR time window are determined based on the determined time offset, as explained above with respect to FIG. 6. At 1308, the BFRR is received and processed using the one or more processors 810. At 1310, a subsequent BFRQ (e.g., the subsequent BFRQ 612 in FIG. 6) is send to the BS, when the BFRR is not received within the BFRR time window.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 14:
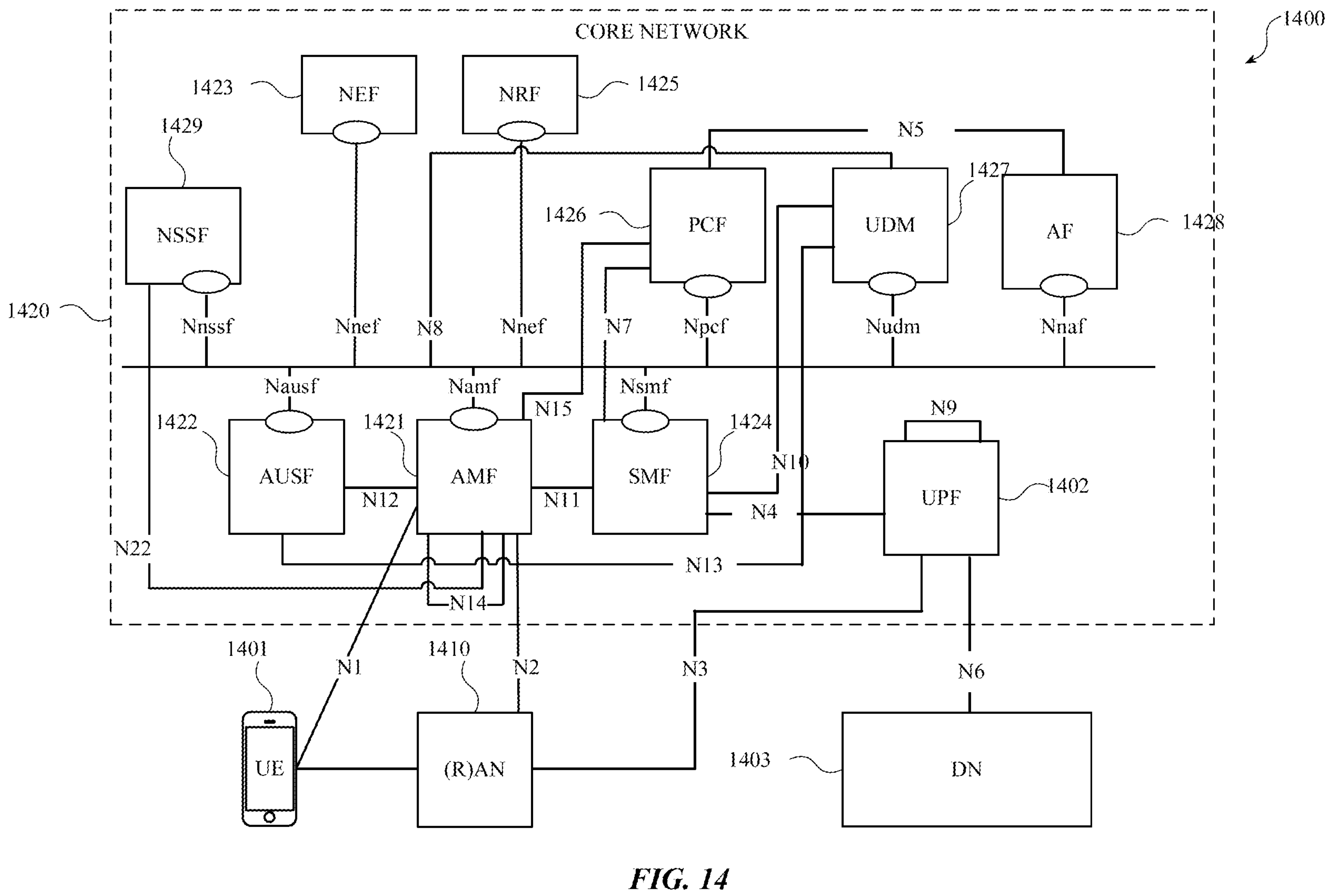
FIG. 14 illustrates an architecture of a system including a Core Network (CN), for example a Fifth Generation (5G) CN (5GC), in accordance with various embodiments.

Embodiments described herein can be implemented into a system using any suitably configured hardware and/or software. FIG. 14 illustrates an architecture of a system 1400 including a Core Network (CN) 1420, for example a Fifth Generation (5G) CN (5GC), in accordance with various embodiments. The system 1400 is shown to include a UE 1401, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 1420. The 5GC 1420 can comprise one or more of the following functions and network components: an Authentication Server Function (AUSF) 1422; an Access and Mobility Management Function (AMF) 1421; a Session Management Function (SMF) 1424; a Network Exposure Function (NEF) 1423; a Policy Control Function (PCF) 1426; a Network Repository Function (NRF) 1425; a Unified Data Management (UDM) 1427; an Application Function (AF) 1428; a User Plane (UP) Function (UPF) 1402; and a Network Slice Selection Function (NSSF) 1429.

The UPF 1402 can act as an anchor point for intra-RAT and inter-RAT mobility, an external Protocol Data Unit (PDU) session point of interconnect to DN 1403, and a branching point to support multi-homed PDU session. The UPF 1402 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 1402 can include an uplink classifier to support routing traffic flows to a data network. The DN 1403 can represent various network operator services, Internet access, or third-party services. DN 1403 can include, or be similar to, an application server. The UPF 1402 can interact with the SMF 1424 via an N4 reference point between the SMF 1424 and the UPF 1402.

The AUSF 1422 can store data for authentication of UE 1401 and handle authentication-related functionality. The AUSF 1422 can facilitate a common authentication framework for various access types. The AUSF 1422 can communicate with the AMF 1421 via an N12 reference point between the AMF 1421 and the AUSF 1422; and can communicate with the UDM 1427 via an N13 reference point between the UDM 1427 and the AUSF 1422. Additionally, the AUSF 1422 can exhibit an Nausf service-based interface.

The AMF 1421 can be responsible for registration management (e.g., for registering UE 1401, etc.), connection management, reachability management, mobility management, and lawful interception of AMF-related events, and access authentication and authorization. The AMF 1421 can be a termination point for the an N11 reference point between the AMF 1421 and the SMF 1424. The AMF 1421 can provide transport for SM messages between the UE 1401 and the SMF 1424, and act as a transparent proxy for routing SM messages. AMF 1421 can also provide transport for SMS messages between UE 1401 and a Short Message Service (SMS) Function (SMSF) (not shown in FIG. 14). AMF 1421 can act as SEcurity Anchor Function (SEAF), which can include interaction with the AUSF 1422 and the UE 1401 and/or receipt of an intermediate key that was established as a result of the UE 1401 authentication process. Where Universal Subscriber Identity Module (USIM) based authentication is used, the AMF 1421 can retrieve the security material from the AUSF 1422. AMF 1421 can also include a Single-Connection Mode (SCM) function, which receives a key from the SEA that it uses to derive access-network specific keys. Furthermore, AMF 1421 can be a termination point of a RAN Control Plane (CP) interface, which can include or be an N2 reference point between the (R)AN 1410 and the AMF 1421; and the AMF 1421 can be a termination point of Non Access Stratum (NAS) (N1) signaling, and perform NAS ciphering and integrity protection.

AMF 1421 can also support NAS signaling with a UE 1401 over an Non-3GPP (N3) Inter Working Function (IWF) interface. The N3IWF can be used to provide access to untrusted entities. N3IWF can be a termination point for the N2 interface between the (R)AN 1410 and the AMF 1421 for the control plane, and can be a termination point for the N3 reference point between the (R)AN 1410 and the UPF 1402 for the user plane. As such, the AMF 1421 can handle N2 signaling from the SMF 1424 and the AMF 1421 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 1401 and AMF 1421 via an N1 reference point between the UE 1401 and the AMF 1421, and relay uplink and downlink user-plane packets between the UE 1401 and UPF 1402. The N3IWF also provides mechanisms for IPsec tunnel establishment with the UE 1401. The AMF 1421 can exhibit an Namf service-based interface, and can be a termination point for an N14 reference point between two AMFs 1421 and an N17 reference point between the AMF 1421 and a 5G Equipment Identity Register (5G-EIR) (not shown in FIG. 14).

The UE 1401 can be registered with the AMF 1421 in order to receive network services. Registration Management (RM) is used to register or deregister the UE 1401 with the network (e.g., AMF 1421), and establish a UE context in the network (e.g., AMF 1421). The UE 1401 can operate in an RM-REGISTERED state or an RM-DEREGISTERED state. In the RM-DEREGISTERED state, the UE 1401 is not registered with the network, and the UE context in AMF 1421 holds no valid location or routing information for the UE 1401 so the UE 1401 is not reachable by the AMF 1421. In the RM-REGISTERED state, the UE 1401 is registered with the network, and the UE context in AMF 1421 can hold a valid location or routing information for the UE 1401 so the UE 1401 is reachable by the AMF 1421. In the RM-REGISTERED state, the UE 1401 can perform mobility Registration Update procedures, perform periodic Registration Update procedures triggered by expiration of the periodic update timer (e.g., to notify the network that the UE 1401 is still active), and perform a Registration Update procedure to update UE capability information or to re-negotiate protocol parameters with the network, among others.

The AMF 1421 can store one or more RM contexts for the UE 1401, where each RM context is associated with a specific access to the network. The RM context can be a data structure, database object, etc. that indicates or stores, inter alia, a registration state per access type and the periodic update timer. The AMF 1421 can also store a 5GC Mobility Management (MM) context that can be the same or similar to an (Enhanced Packet System (EPS))MM ((E)MM) context. In various embodiments, the AMF 1421 can store a Coverage Enhancement (CE) mode B Restriction parameter of the UE 1401 in an associated MM context or RM context. The AMF 1421 can also derive the value, when needed, from the UE's usage setting parameter already stored in the UE context (and/or MM/RM context).

Connection Management (CM) can be used to establish and release a signaling connection between the UE 1401 and the AMF 1421 over the N1 interface. The signaling connection is used to enable NAS signaling exchange between the UE 1401 and the CN 1420, and comprises both the signaling connection between the UE and the AN (e.g., RRC connection or UE-N3IWF connection for non-3GPP access) and the N2 connection for the UE 1401 between the AN (e.g., RAN 1410) and the AMF 1421. The UE 1401 can operate in one of two CM states, CM-IDLE mode or CM-CONNECTED mode. When the UE 1401 is operating in the CM-IDLE state/mode, the UE 1401 may have no NAS signaling connection established with the AMF 1421 over the N1 interface, and there can be (R)AN 1410 signaling connection (e.g., N2 and/or N3 connections) for the UE 1401. When the UE 1401 is operating in the CM-CONNECTED state/mode, the UE 1401 can have an established NAS signaling connection with the AMF 1421 over the N1 interface, and there can be a (R)AN 1410 signaling connection (e.g., N2 and/or N3 connections) for the UE 1401. Establishment of an N2 connection between the (R)AN 1410 and the AMF 1421 can cause the UE 1401 to transition from CM-IDLE mode to CM-CONNECTED mode, and the UE 1401 can transition from the CM-CONNECTED mode to the CM-IDLE mode when N2 signaling between the (R)AN 1410 and the AMF 1421 is released.

The SMF 1424 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 1401 and a data network (DN) 1403 identified by a Data Network Name (DNN). PDU sessions can be established upon UE 1401 request, modified upon UE 1401 and 5GC 1420 request, and released upon UE 1401 and 5GC 1420 request using NAS SM signaling exchanged over the N1 reference point between the UE 1401 and the SMF 1424. Upon request from an application server, the 5GC 1420 can trigger a specific application in the UE 1401. In response to receipt of the trigger message, the UE 1401 can pass the trigger message (or relevant parts/information of the trigger message) to one or more identified applications in the UE 1401. The identified application(s) in the UE 1401 can establish a PDU session to a specific DNN. The SMF 1424 can check whether the UE 1401 requests are compliant with user subscription information associated with the UE 1401. In this regard, the SMF 1424 can retrieve and/or request to receive update notifications on SMF 1424 level subscription data from the UDM 1427.

The SMF 1424 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 1424 can be included in the system 1400, which can be between another SMF 1424 in a visited network and the SMF 1424 in the home network in roaming scenarios. Additionally, the SMF 1424 can exhibit the Nsmf service-based interface.

The NEF 1423 can provide means for securely exposing the services and capabilities provided by 3GPP network functions for third party, internal exposure/re-exposure, Application Functions (e.g., AF 1428), edge computing or fog computing systems, etc. In such embodiments, the NEF 1423 can authenticate, authorize, and/or throttle the AFs. NEF 1423 can also translate information exchanged with the AF 1428 and information exchanged with internal network functions. For example, the NEF 1423 can translate between an AF-Service-Identifier and an internal 5GC information. NEF 1423 can also receive information from other network functions (NFs) based on exposed capabilities of other network functions. This information can be stored at the NEF 1423 as structured data, or at a data storage NF using standardized interfaces. The stored information can then be re-exposed by the NEF 1423 to other NFs and AFs, and/or used for other purposes such as analytics. Additionally, the NEF 1423 can exhibit an Nnef service-based interface.

The NRF 1425 can support service discovery functions, receive NF discovery requests from NF instances, and provide the information of the discovered NF instances to the NF instances. NRF 1425 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 1425 can exhibit the Nnrf service-based interface.

The PCF 1426 can provide policy rules to control plane function(s) to enforce them, and can also support unified policy framework to govern network behavior. The PCF 1426 can also implement an FE to access subscription information relevant for policy decisions in a UDR of the UDM 1427. The PCF 1426 can communicate with the AMF 1421 via an N15 reference point between the PCF 1426 and the AMF 1421, which can include a PCF 1426 in a visited network and the AMF 1421 in case of roaming scenarios. The PCF 1426 can communicate with the AF 1428 via an N5 reference point between the PCF 1426 and the AF 1428; and with the SMF 1424 via an N7 reference point between the PCF 1426 and the SMF 1424. The system 1400 and/or CN 1420 can also include an N24 reference point between the PCF 1426 (in the home network) and a PCF 1426 in a visited network. Additionally, the PCF 1426 can exhibit an Npcf service-based interface.

The UDM 1427 can handle subscription-related information to support the network entities' handling of communication sessions, and can store subscription data of UE 1401. For example, subscription data can be communicated between the UDM 1427 and the AMF 1421 via an N8 reference point between the UDM 1427 and the AMF. The UDM 1427 can include two parts, an application Functional Entity (FE) and a Unified Data Repository (UDR) (the FE and UDR are not shown in FIG. 1). The UDR can store subscription data and policy data for the UDM 1427 and the PCF 1426, and/or structured data for exposure and application data (including Packet Flow Descriptions (PFDs) for application detection, application request information for multiple UEs 1401) for the NEF 1423. The Nudr service-based interface can be exhibited by the UDR 221 to allow the UDM 1427, PCF 1426, and NEF 1423 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 1424 via an N10 reference point between the UDM 1427 and the SMF 1424. UDM 1427 can also support SMS management, wherein an SMS-FE implements similar application logic as discussed elsewhere herein. Additionally, the UDM 1427 can exhibit the Nudm service-based interface.

The AF 1428 can provide application influence on traffic routing, provide access to NEF 1423, and interact with the policy framework for policy control. 5GC 1420 and AF 1428 can provide information to each other via NEF 1423, which can be used for edge computing implementations. In such implementations, the network operator and third party services can be hosted close to the UE 1401 access point of attachment to achieve an efficient service delivery through the reduced end-to-end latency and load on the transport network. For edge computing implementations, the 5GC can select a UPF 1402 close to the UE 1401 and execute traffic steering from the UPF 1402 to DN 1403 via the N6 interface. This can be based on the UE subscription data, UE location, and information provided by the AF 1428. In this way, the AF 1428 can influence UPF (re)selection and traffic routing.

Based on operator deployment, when AF 1428 is considered to be a trusted entity, the network operator can permit AF 1428 to interact directly with relevant NFs. Additionally, the AF 1428 can exhibit an Naf service-based interface.

The NSSF 1429 can select a set of network slice instances serving the UE 1401. The NSSF 1429 can also determine allowed Network Slice Selection Assistance Information (NSSAI) and the mapping to the subscribed Single NSSAIs (S-NSSAIs), as appropriate. The NSSF 1429 can also determine the AMF set to be used to serve the UE 1401, or a list of candidate AMF(s) 1421 based on a suitable configuration and possibly by querying the NRF 1425. The selection of a set of network slice instances for the UE 1401 can be triggered by the AMF 1421 with which the UE 1401 is registered by interacting with the NSSF 1429, which can lead to a change of AMF 1421. The NSSF 1429 can interact with the AMF 1421 via an N22 reference point between AMF 1421 and NSSF 1429; and can communicate with another NSSF 1429 in a visited network via an N31 reference point (not shown in FIG. 14). Additionally, the NSSF 1429 can exhibit an Nnssf service-based interface.

As discussed previously, the CN 1420 can include an SMSF, which can be responsible for SMS subscription checking and verification, and relaying SM messages to/from the UE 1401 to/from other entities, such as an SMS-Gateway Mobile services Switching Center (GMSC)/Inter-Working MSC (IWMSC)/SMS-router. The SMSF can also interact with AMF 1421 and UDM 1427 for a notification procedure that the UE 1401 is available for SMS transfer (e.g., set a UE not reachable flag, and notifying UDM 1427 when UE 1401 is available for SMS).

The CN 1420 can also include other elements that are not shown in FIG. 14, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 14 for clarity. In one example, the CN 1420 can include an Nx interface, which is an inter-CN interface between the MME (e.g., a non-5G MME) and the AMF 1421 in order to enable interworking between CN 1420 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 15:
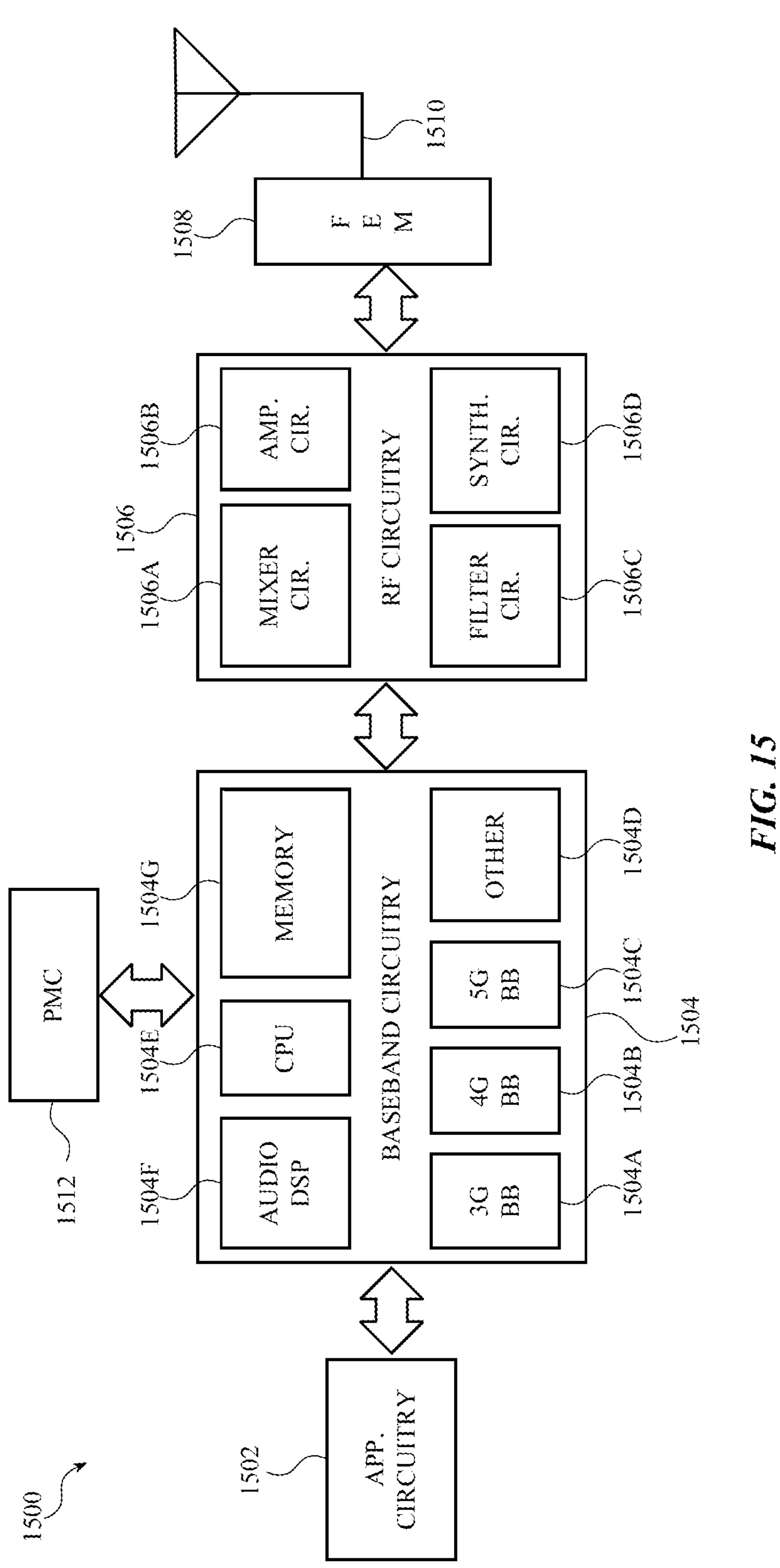
FIG. 15 illustrates example components of a device in accordance with some embodiments.

FIG. 15 illustrates example components of a device 1500 in accordance with some embodiments. In some embodiments, the device 1500 can include application circuitry 1502, baseband circuitry 1504, Radio Frequency (RF) circuitry 1506, front-end module (FEM) circuitry 1508, one or more antennas 1510, and power management circuitry (PMC) 1512 coupled together at least as shown. The components of the illustrated device 1500 can be included in a UE or a RAN node. In some embodiments, the device 1500 can include fewer elements (e.g., a RAN node may not utilize application circuitry 1502, and instead include a processor/controller to process IP data received from a CN such as 5GC 1420 or an Evolved Packet Core (EPC)). In some embodiments, the device 1500 can include additional elements such as, for example, memory/storage, display, camera, sensor, or input/output (1/O) interface. In other embodiments, the components described below can be included in more than one device (e.g., said circuitries can be separately included in more than one device for Cloud-RAN (C-RAN) implementations).

The application circuitry 1502 can include one or more application processors. For example, the application circuitry 1502 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1500. In some embodiments, processors of application circuitry 1502 can process IP data packets received from an EPC.

The baseband circuitry 1504 can include circuitry such as, but not limited to, one or more single-core or multi-core processors. The baseband circuitry 1504 can include one or more baseband processors or control logic to process baseband signals received from a receive signal path of the RF circuitry 1506 and to generate baseband signals for a transmit signal path of the RF circuitry 1506. Baseband processing circuitry 1504 can interface with the application circuitry 1502 for generation and processing of the baseband signals and for controlling operations of the RF circuitry 1506. For example, in some embodiments, the baseband circuitry 1504 can include a third generation (3G) baseband processor 1504A, a fourth generation (4G) baseband processor 1504B, a fifth generation (5G) baseband processor 1504C, or other baseband processor(s) 1504D for other existing generations, generations in development or to be developed in the future (e.g., second generation (2G), sixth generation (6G), etc.). The baseband circuitry 1504 (e.g., one or more of baseband processors 1504A-D) can handle various radio control functions that enable communication with one or more radio networks via the RF circuitry 1506. In other embodiments, some or all of the functionality of baseband processors 1504A-D can be included in modules stored in the memory 1504G and executed via a Central Processing Unit (CPU) 1504E. The radio control functions can include, but are not limited to, signal modulation/demodulation, encoding/decoding, radio frequency shifting, etc. In some embodiments, modulation/demodulation circuitry of the baseband circuitry 1504 can include Fast-Fourier Transform (FFT), precoding, or constellation mapping/demapping functionality. In some embodiments, encoding/decoding circuitry of the baseband circuitry 1504 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 1504 can include one or more audio digital signal processor(s) (DSP) 1504F. The audio DSP(s) 1504F can include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 1504 and the application circuitry 1502 can be implemented together such as, for example, on a system on a chip (SOC).

In some embodiments, the baseband circuitry 1504 can provide for communication compatible with one or more radio technologies. For example, in some embodiments, the baseband circuitry 1504 can support communication with a NG-RAN, an evolved universal terrestrial radio access network (EUTRAN) or other wireless metropolitan area networks (WMAN), a wireless local area network (WLAN), a wireless personal area network (WPAN), etc. Embodiments in which the baseband circuitry 1504 is configured to support radio communications of more than one wireless protocol can be referred to as multi-mode baseband circuitry.

RF circuitry 1506 can enable communication with wireless networks using modulated electromagnetic radiation through a non-solid medium. In various embodiments, the RF circuitry 1506 can include switches, filters, amplifiers, etc. to facilitate the communication with the wireless network. RF circuitry 1506 can include a receive signal path which can include circuitry to down-convert RF signals received from the FEM circuitry 1508 and provide baseband signals to the baseband circuitry 1504. RF circuitry 1506 can also include a transmit signal path which can include circuitry to up-convert baseband signals provided by the baseband circuitry 1504 and provide RF output signals to the FEM circuitry 1508 for transmission.

In some embodiments, the receive signal path of the RF circuitry 1506 can include mixer circuitry 1506*a*, amplifier circuitry 1506*b* and filter circuitry 1506*c*. In some embodiments, the transmit signal path of the RF circuitry 1506 can include filter circuitry 1506*c* and mixer circuitry 1506*a*. RF circuitry 1506 can also include synthesizer circuitry 1506*d* for synthesizing a frequency for use by the mixer circuitry 1506*a* of the receive signal path and the transmit signal path. In some embodiments, the mixer circuitry 1506*a* of the receive signal path can be configured to down-convert RF signals received from the FEM circuitry 1508 based on the synthesized frequency provided by synthesizer circuitry 1506*d*. The amplifier circuitry 1506*b* can be configured to amplify the down-converted signals and the filter circuitry 1506*c* can be a low-pass filter (LPF) or band-pass filter (BPF) configured to remove unwanted signals from the down-converted signals to generate output baseband signals. Output baseband signals can be provided to the baseband circuitry 1504 for further processing. In some embodiments, the output baseband signals can be zero-frequency baseband signals, although this is not a requirement. In some embodiments, mixer circuitry 1506*a* of the receive signal path can comprise passive mixers, although the scope of the embodiments is not limited in this respect.

In some embodiments, the mixer circuitry 1506*a* of the transmit signal path can be configured to up-convert input baseband signals based on the synthesized frequency provided by the synthesizer circuitry 1506*d* to generate RF output signals for the FEM circuitry 1508. The baseband signals can be provided by the baseband circuitry 1504 and can be filtered by filter circuitry 1506*c*.

In some embodiments, the mixer circuitry 1506*a* of the receive signal path and the mixer circuitry 1506*a* of the transmit signal path can include two or more mixers and can be arranged for quadrature downconversion and upconversion, respectively. In some embodiments, the mixer circuitry 1506*a* of the receive signal path and the mixer circuitry 1506*a* of the transmit signal path can include two or more mixers and can be arranged for image rejection (e.g., Hartley image rejection). In some embodiments, the mixer circuitry 1506*a* of the receive signal path and the mixer circuitry 1506*a* can be arranged for direct downconversion and direct upconversion, respectively. In some embodiments, the mixer circuitry 1506*a* of the receive signal path and the mixer circuitry 1506*a* of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 1506 can include analog-to-digital converter (ADC) and digital-to-analog converter (DAC) circuitry and the baseband circuitry 1504 can include a digital baseband interface to communicate with the RF circuitry 1506.

In some dual-mode embodiments, a separate radio IC circuitry can be provided for processing signals for each spectrum, although the scope of the embodiments is not limited in this respect.

In some embodiments, the synthesizer circuitry 1506*d* can be a fractional-N synthesizer or a fractional N/N+1 synthesizer, although the scope of the embodiments is not limited in this respect as other types of frequency synthesizers can be suitable. For example, synthesizer circuitry 1506*d* can be a delta-sigma synthesizer, a frequency multiplier, or a synthesizer comprising a phase-locked loop with a frequency divider.

The synthesizer circuitry 1506*d* can be configured to synthesize an output frequency for use by the mixer circuitry 1506*a* of the RF circuitry 1506 based on a frequency input and a divider control input. In some embodiments, the synthesizer circuitry 1506*d* can be a fractional N/N+1 synthesizer.

In some embodiments, frequency input can be provided by a voltage controlled oscillator (VCO), although that is not a requirement. Divider control input can be provided by either the baseband circuitry 1504 or the applications processor 1502 depending on the desired output frequency. In some embodiments, a divider control input (e.g., N) can be determined from a look-up table based on a channel indicated by the applications processor 1502.

Synthesizer circuitry 1506*d* of the RF circuitry 1506 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506*d* can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1506 can include an IQ/polar converter.

FEM circuitry 1508 can include a receive signal path which can include circuitry configured to operate on RF signals received from one or more antennas 1510, amplify the received signals and provide the amplified versions of the received signals to the RF circuitry 1506 for further processing. FEM circuitry 1508 can also include a transmit signal path which can include circuitry configured to amplify signals for transmission provided by the RF circuitry 1506 for transmission by one or more of the one or more antennas 1510. In various embodiments, the amplification through the transmit or receive signal paths can be done solely in the RF circuitry 1506, solely in the FEM 1508, or in both the RF circuitry 1506 and the FEM 1508.

In some embodiments, the FEM circuitry 1508 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1506). The transmit signal path of the FEM circuitry 1508 can include a power amplifier (PA) to amplify input RF signals (e.g., provided by RF circuitry 1506), and one or more filters to generate RF signals for subsequent transmission (e.g., by one or more of the one or more antennas 1510).

In some embodiments, the PMC 1512 can manage power provided to the baseband circuitry 1504. In particular, the PMC 1512 can control power-source selection, voltage scaling, battery charging, or DC-to-DC conversion. The PMC 1512 can often be included when the device 1500 is capable of being powered by a battery, for example, when the device is included in a UE. The PMC 1512 can increase the power conversion efficiency while providing desirable implementation size and heat dissipation characteristics.

While FIG. 15 shows the PMC 1512 coupled only with the baseband circuitry 1504. However, in other embodiments, the PMC 1512 may be additionally or alternatively coupled with, and perform similar power management operations for, other components such as, but not limited to, application circuitry 1502, RF circuitry 1506, or FEM 1508.

In some embodiments, the PMC 1512 can control, or otherwise be part of, various power saving mechanisms of the device 1500. For example, if the device 1500 is in an RRC_Connected state, where it is still connected to the RAN node as it expects to receive traffic shortly, then it can enter a state known as Discontinuous Reception Mode (DRX) after a period of inactivity. During this state, the device 1500 can power down for brief intervals of time and thus save power.

If there is no data traffic activity for an extended period of time, then the device 1500 can transition off to an RRC_Idle state, where it disconnects from the network and does not perform operations such as channel quality feedback, handover, etc. The device 1500 goes into a very low power state and it performs paging where again it periodically wakes up to listen to the network and then powers down again. The device 1500 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1502 and processors of the baseband circuitry 1504 can be used to execute elements of one or more instances of a protocol stack. For example, processors of the baseband circuitry 1504, alone or in combination, can be used execute Layer 3, Layer 2, or Layer 1 functionality, while processors of the application circuitry 1504 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 16:
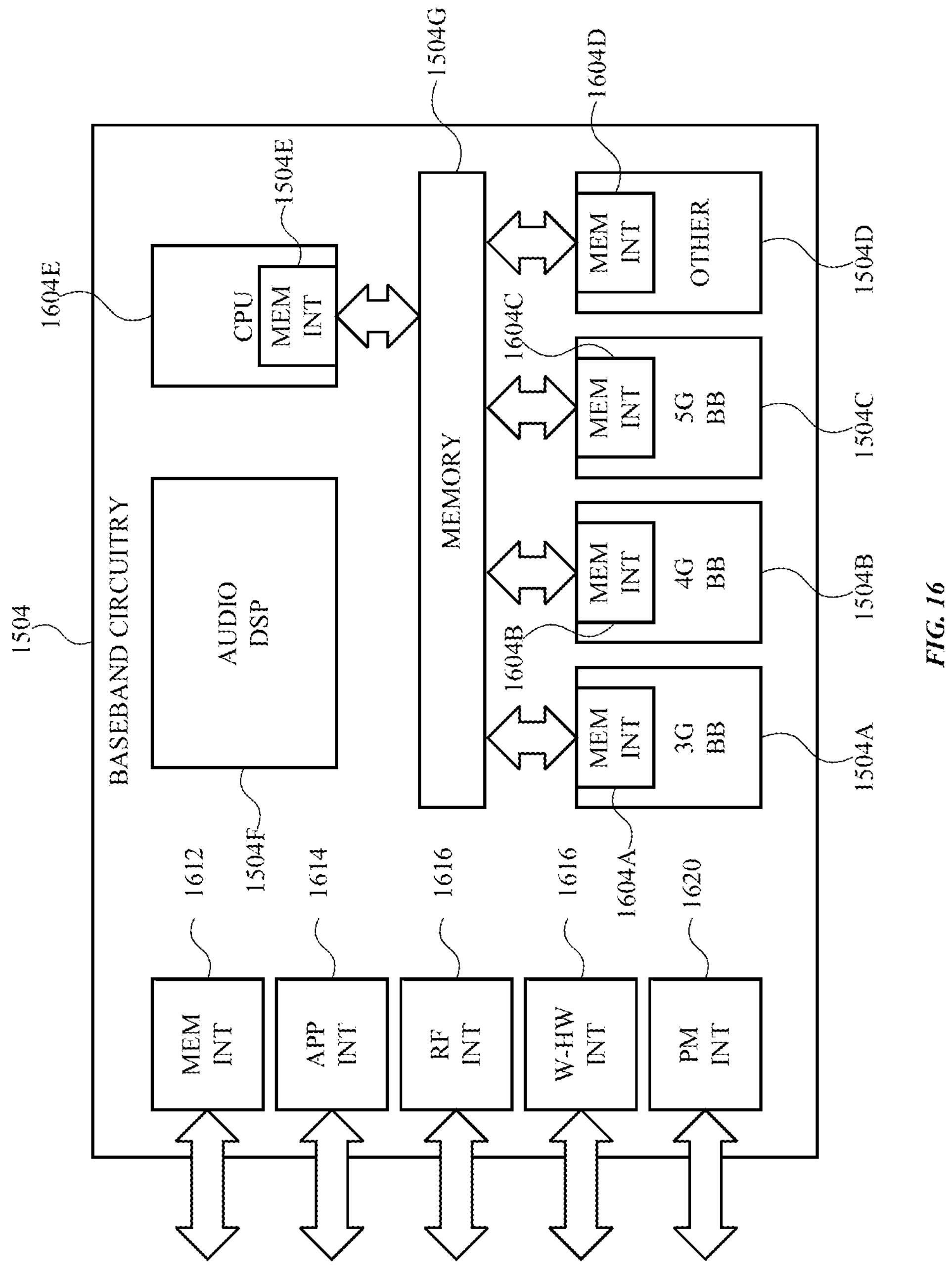
FIG. 16 illustrates example interfaces of baseband circuitry in accordance with some embodiments.

FIG. 16 illustrates example interfaces of baseband circuitry in accordance with some embodiments. As discussed above, the baseband circuitry 1504 of FIG. 2 can comprise processors 1504A-1504E and a memory 1504G utilized by said processors. Each of the processors 1504A-1504E can include a memory interface, 1604A-1604E, respectively, to send/receive data to/from the memory 1504G.

The baseband circuitry 1504 can further include one or more interfaces to communicatively couple to other circuitries/devices, such as a memory interface 1612 (e.g., an interface to send/receive data to/from memory external to the baseband circuitry 1504), an application circuitry interface 1614 (e.g., an interface to send/receive data to/from the application circuitry 1502 of FIG. 2), an RF circuitry interface 1616 (e.g., an interface to send/receive data to/from RF circuitry 1506 of FIG. 2), a wireless hardware connectivity interface 1618 (e.g., an interface to send/receive data to/from Near Field Communication (NFC) components, Bluetooth® components (e.g., Bluetooth® Low Energy), Wi-Fi® components, and other communication components), and a power management interface 1620 (e.g., an interface to send/receive power or control signals to/from the PMC 1512).

In various aspects, embodiments discussed herein can facilitate techniques of inter-cell BM (Beam Management) via L1 (Layer 1) via one or more variations of a first set of techniques and/or a second set of techniques. The first set of techniques discussed herein can facilitate L1 inter-cell BM via SSB (Synchronization Signal Block). The second set of techniques discussed herein can facilitate L1 inter-cell BM via Synchronization CSI (Channel State Information)-RS (Reference Signal).

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a baseband (BB) processor for a user equipment (UE) operating in a non-terrestrial network (NTN) having a satellite as a base station or as a relay to a base station, configured to perform operations comprising determining a first time offset, based on processing a timing offset indication signal comprising the first time offset or an associated parameter, received from a base station, wherein the first time offset is indicative of a time delay in downlink (DL) to uplink (UL) interaction between the UE and the base station; wherein the first time offset is the same or larger than two times of a propagation delay between the UE and the base station; determining a second time offset, based on processing a subsequent timing offset indication signal comprising the second time offset or an associated parameter, received from the base station at a subsequent time instance, wherein the second time offset is indicative of the time delay in DL to uplink UL interaction between the UE and the base station, and wherein the second time offset is the same or larger than two times of the propagation delay between the UE and the base station; and updating the first time offset with the second time offset.

Example 2 is a BB processor, including the subject matter of example 1, wherein the first time offset comprises an initial time offset to be utilized by the UE during an initial access procedure or an updated time offset that updated the initial time offset in one or more subsequent iterations.

Example 3 is a BB processor, including the subject matter of examples 1-2, including or omitting elements, wherein, when the first time offset comprises the initial time offset, the timing offset indication signal comprises a system information signal comprising the initial time offset.

Example 4 is a BB processor, including the subject matter of examples 1-3, including or omitting elements, wherein the second time offset is utilized by the UE after the initial access procedure.

Example 5 is a BB processor, including the subject matter of examples 1-4, including or omitting elements, wherein the subsequent timing offset indication signal comprises a random access response (RAR) message comprising the second time offset.

Example 6 is a BB processor, including the subject matter of examples 1-5, including or omitting elements, wherein the subsequent timing offset indication signal comprises a common radio resource control (RRC) message or a dedicated RRC message comprising the second time offset.

Example 7 is a BB processor, including the subject matter of examples 1-6, including or omitting elements, wherein determining the second time offset to update the first time offset is triggered upon receiving the common RRC message or the dedicated RRC message from the base station.

Example 8 is a BB processor, including the subject matter of examples 1-7, including or omitting elements, wherein the subsequent timing offset indication signal comprises a group common downlink control information (DCI) comprising the second time offset or a dedicated DCI comprising the second time offset or a parameter indicative of the second time offset.

Example 9 is a BB processor, including the subject matter of examples 1-8, including or omitting elements, wherein the group common DCI and/or the dedicated DCI comprises a time offset field comprising the second time offset or the parameter indicative of the second time offset.

Example 10 is a BB processor, including the subject matter of examples 1-9, including or omitting elements, wherein determining the second time offset to update the first time offset is triggered upon receiving the group common DCI or the dedicated DCI.

Example 11 is a BB processor, including the subject matter of examples 1-10, including or omitting elements, wherein the subsequent timing offset indication signal comprises a dedicated time offset media access control (MAC) control element (CE) comprising the second time offset or a timing advance (TA) command MAC CE comprising the second time offset or a timing drift rate MAC CE comprising the second time offset.

Example 12 is a BB processor, including the subject matter of examples 1-11, including or omitting elements, wherein determining the second time offset to update the first time offset is triggered, upon receiving the dedicated time offset MAC CE or the TA command MAC CE or the timing drift rate MAC CE from the base station.

Example 13 is a BB processor, including the subject matter of examples 1-12, including or omitting elements, wherein the subsequent timing offset indication signal comprises a TA command media access control (MAC) control element (CE) and wherein the second time offset is determined based on a timing advance (TA) value comprised in the TA command MAC CE.

Example 14 is a BB processor, including the subject matter of examples 1-13, including or omitting elements, wherein determining the second time offset to update the first time offset is triggered upon receiving the TA MAC CE from the base station.

Example 15 is a BB processor, including the subject matter of examples 1-14, including or omitting elements, wherein the subsequent timing offset indication signal comprises a random access response (RAR) message and wherein the second time offset is determined based on a timing advance (TA) command comprised in the RAR message.

Example 16 is a BB processor, including the subject matter of examples 1-15, including or omitting elements, wherein the subsequent timing offset indication signal comprises a timing drift rate indication signal and wherein the second time offset is determined based on a timing drift rate included in the timing drift rate indication signal.

Example 17 is a BB processor, including the subject matter of examples 1-16, including or omitting elements, wherein determining the second time offset to update the first time offset is triggered, when an autonomously maintained timing advance (TA) of the UE that varies as a function of the timing drift rate exceeds a predefined TA threshold.

Example 18 is a BB processor, including the subject matter of examples 1-17, including or omitting elements, wherein the operations further comprise sending a timing offset update notification signal comprising the second time offset to the base station, upon determining the second time offset.

Example 19 is a baseband (BB) processor for base station (BS) operating in a non-terrestrial network (NTN), wherein the base station comprises a satellite or having a satellite as a relay to a user equipment (UE), the BB processor configured to perform operations comprising sending, to a user equipment (UE), a timing offset indication signal comprising a first time offset or an associated parameter, in order to enable the UE to determine the first time offset, wherein the first time offset is indicative of a time delay in downlink (DL) to uplink (UL) interaction between the UE and the base station, wherein the first time offset is the same or larger than two times of a propagation delay between the UE and the base station; and sending, to the UE, a subsequent timing offset indication signal comprising a second time offset or an associated parameter, at a subsequent time instance, in order to enable the UE to update the first time offset with the second time offset, wherein the second time offset is indicative of the time delay in DL to uplink UL interaction between the UE and the base station, and wherein the second time offset is the same or larger than two times of the propagation delay between the UE and the base station.

Example 20 is a BB processor, including the subject matter of example 19, wherein the operations further comprise determining the second time offset, prior to sending the subsequent timing offset indication signal to the UE.

Example 21 is a BB processor, including the subject matter of examples 19-20, including or omitting elements, wherein the operations further comprise determining the second time offset, based on processing a timing offset update notification signal received from the UE, in response to sending the subsequent timing offset indication signal to the UE.

Example 22 is a BB processor, including the subject matter of examples 19-21, including or omitting elements, wherein the first time offset comprises an initial time offset to be utilized by the UE during an initial access procedure or an updated time offset that updated the initial time offset in one or more subsequent iterations.

Example 23 is a BB processor, including the subject matter of examples 19-22, including or omitting elements, wherein, when the first time offset comprises the initial time offset, the timing offset indication signal comprises a system information signal comprising the initial time offset.

Example 24 is a BB processor, including the subject matter of examples 19-23, including or omitting elements, wherein the second time offset is to be utilized by the UE after the initial access procedure.

Example 25 is a BB processor, including the subject matter of examples 19-24, including or omitting elements, wherein the subsequent timing offset indication signal comprises a random access response (RAR) message comprising the second time offset.

Example 26 is a BB processor, including the subject matter of examples 19-25, including or omitting elements, wherein the subsequent timing offset indication signal comprises a common radio resource control (RRC) message or a dedicated RRC message comprising the second time offset.

Example 27 is a BB processor, including the subject matter of examples 19-26, including or omitting elements, wherein the subsequent timing offset indication signal comprises a group common downlink control information (DCI) or a dedicated DCI comprising the second time offset or a parameter indicative of the second time offset.

Example 28 is a BB processor, including the subject matter of examples 19-27, including or omitting elements, wherein the group common DCI and/or the dedicated DCI comprises a time offset field comprising the second time offset or the parameter indicative of the second time offset.

Example 29 is a BB processor, including the subject matter of examples 19-28, including or omitting elements, wherein the subsequent timing offset indication signal comprises a dedicated time offset media access control (MAC) control element (CE) comprising the second time offset or a timing advance (TA) command MAC CE comprising the second time offset or a timing drift rate MAC CE comprising the second time offset, received from the base station.

Example 30 is a BB processor, including the subject matter of examples 19-29, including or omitting elements, wherein the subsequent timing offset indication signal comprises a timing advance (TA) command media access control (MAC) control element (CE) comprising a TA value.

Example 31 is a BB processor, including the subject matter of examples 19-30, including or omitting elements, wherein the subsequent timing offset indication signal comprises a random access response (RAR) message comprising a timing advance (TA) command.

Example 32 is a BB processor, including the subject matter of examples 19-31, including or omitting elements, wherein the subsequent timing offset indication signal comprises timing drift rate indication signal comprising a timing drift rate.

Example 33 is a BB processor, including the subject matter of examples 19-32, including or omitting elements, the second time offset is determined, upon beam switching between satellites.

Example 34 is a baseband (BB) processor for a user equipment (UE) operating in a non-terrestrial network (NTN) having a satellite as a base station or as a relay to a base station configured to perform operations comprising determining a time offset, wherein the time offset is indicative of a time delay in downlink (DL) to uplink (UL) interaction between the UE and a base station, wherein the time offset is the same or larger than two times of a propagation delay between the UE and the base station; receiving a media access control (MAC) control element (CE) command from the base station; sending, to the base station, a hybrid automatic repeat request (HARQ) acknowledge (ACK) feedback in response to receiving the MAC CE command; and determining a MAC CE activation time at which the MAC CE command is activated, based on the determined time offset, depending on whether the MAC CE command comprises a DL MAC CE command or a UL MAC CE command.

Example 35 is a BB processor, including the subject matter of example 34, wherein, when the MAC CE command comprises the DL MAC CE command, the MAC CE activation time of the DL MAC CE command that forms a DL MAC CE activation time, is determined to be at a time instance corresponding to (X+time offset) after sending the HARQ-ACK feedback, where X is a predefined number.

Example 36 is a BB processor, including the subject matter of examples 34-35, including or omitting elements, wherein X and time offset are measured in milliseconds (ms).

Example 37 is a BB processor, including the subject matter of examples 34-36, including or omitting elements, wherein X is less than or equal to 3 ms.

Example 38 is a BB processor, including the subject matter of examples 34-37, including or omitting elements, wherein the operations further comprise activating the DL MAC CE command at the determined DL MAC CE activation time.

Example 39 is a BB processor, including the subject matter of examples 34-38, including or omitting elements, wherein, when the MAC CE command comprises the UL MAC CE command, the MAC CE activation time of the UL MAC CE command that forms a UL MAC CE activation time, is determined to be at a time instance corresponding to K milliseconds (ms) after sending the HARQ-ACK feedback, where K is a predefined number.

Example 40 is a BB processor, including the subject matter of examples 34-39, including or omitting elements, wherein K is equal to 3 milliseconds (ms).

Example 41 is a BB processor, including the subject matter of examples 34-40, including or omitting elements, wherein the operations further comprise activating the UL MAC CE command at the determined UL MAC CE activation time.

Example 42 is a BB processor, including the subject matter of examples 34-41, including or omitting elements, wherein the time offset is determined based on processing a timing offset indication signal comprising the time offset or an associated parameter, received from the base station.

Example 43 is a baseband (BB) processor for a user equipment (UE) operating in a non-terrestrial network (NTN) having a satellite as a base station or as a relay to a base station, configured to perform operations comprising determining a time offset, wherein the time offset is indicative of a time delay in downlink (DL) to uplink (UL) interaction between the UE and a base station, wherein the time offset is the same or larger than two times of a propagation delay between the UE and the base station; receiving, from the base station, a downlink control information (DCI) that schedules a DL transmission to the UE or a UL transmission from the UE, wherein the DCI identifies a hybrid automatic repeat request (HARQ) process number, and wherein the DCI comprises a single transmission of the DCI when aggregated/blind retransmissions are disabled and the DCI comprises a plurality of aggregated/blind retransmissions of the DCI when aggregated/blind retransmissions are enabled; and processing a subsequent DCI with the same HARQ process number received from the base station, selectively, based on the determined time offset, wherein the subsequent DCI comprises a DCI that is received from the base station after receiving the single transmission of the DCI when aggregated/blind retransmissions are disabled or a DCI that is received from the base station after receiving the plurality of aggregated/blind retransmissions of the DCI when aggregated/blind retransmissions are enabled.

Example 44 is a BB processor, including the subject matter of example 43, wherein the DCI comprises a DL DCI that schedules the DL transmission to the UE and subsequent DCI comprises a subsequent DL DCI that schedules a retransmission of the DL transmission.

Example 45 is a BB processor, including the subject matter of examples 43-44, including or omitting elements, wherein the operations further comprise sending, to the base station, a hybrid automatic repeat request (HARQ) acknowledge (ACK) feedback in response to receiving the DL DCI or the associated DL transmission, prior to receiving the subsequent DL DCI.

Example 46 is a BB processor, including the subject matter of examples 43-45, including or omitting elements, wherein aggregated retransmission or blind retransmission is disabled, and wherein the DL DCI and the HARQ-ACK feedback comprises a single transmission.

Example 47 is a BB processor, including the subject matter of examples 43-46, including or omitting elements, wherein the subsequent DL DCI is processed when the subsequent DL DCI is received at a time period/instance after a time equivalent to the time offset from sending the single transmission of the HARQ-ACK feedback.

Example 48 is a BB processor, including the subject matter of examples 43-47, including or omitting elements, wherein the operations further comprise ignoring the processing of the subsequent DL DCI, when the subsequent DL DCI is received within the time equivalent to the time offset from sending the single transmission of the HARQ-ACK feedback.

Example 49 is a BB processor, including the subject matter of examples 43-48, including or omitting elements, wherein aggregated retransmission or blind retransmission is enabled, and wherein the DL DCI comprises a plurality of aggregated/blind retransmissions of the DL DCI and the HARQ-ACK feedback comprises a respective plurality of HARQ-ACK feedbacks.

Example 50 is a BB processor, including the subject matter of examples 43-49, including or omitting elements, wherein the subsequent DL DCI is processed when the subsequent DL DCI is received at a time period/instance after a time equivalent to the time offset from sending a last HARQ-ACK feedback of the plurality of HARQ-ACK feedbacks.

Example 51 is a BB processor, including the subject matter of examples 43-50, including or omitting elements, wherein the operations further comprise ignoring the processing of the subsequent DL DCI, when the subsequent DL DCI is received within the time equivalent to the time offset from sending the last HARQ-ACK feedback of the plurality of HARQ-ACK feedbacks.

Example 52 is a BB processor, including the subject matter of examples 43-51, including or omitting elements, wherein the DCI comprises a UL DCI that schedules the UL transmission to the UE and subsequent DCI comprises a subsequent UL DCI that schedules a retransmission of the UL transmission.

Example 53 is a BB processor, including the subject matter of examples 43-52, including or omitting elements, the operations further comprising sending, to the base station, a UL transmission in response to receiving the UL DCI, prior to receiving the subsequent UL DCI.

Example 54 is a BB processor, including the subject matter of examples 43-53, including or omitting elements, wherein aggregated retransmission or blind retransmission is disabled, and wherein the UL DCI and the UL transmission comprises a single transmission.

Example 55 is a BB processor, including the subject matter of examples 43-54, including or omitting elements, wherein the subsequent UL DCI is processed when the subsequent UL DCI is received at a time period/instance after a time equivalent to the time offset from sending the single UL transmission.

Example 56 is a BB processor, including the subject matter of examples 43-55, including or omitting elements, the operations further comprising ignoring the processing of the subsequent UL DCI, when the subsequent UL DCI is received within the time equivalent to the time offset from sending the single UL transmission.

Example 57 is a BB processor, including the subject matter of examples 43-56, including or omitting elements, wherein aggregated retransmission or blind retransmission is enabled, and wherein the UL DCI comprises a plurality of aggregated/blind retransmissions of the UL DCI and the UL transmission comprises a respective plurality of UL transmission/retransmissions.

Example 58 is a BB processor, including the subject matter of examples 43-57, including or omitting elements, wherein the subsequent UL DCI is processed when the subsequent UL DCI is received at a time period/instance after a time equivalent to the time offset from sending a last UL transmission of the plurality of UL transmissions.

Example 59 is a BB processor, including the subject matter of examples 43-58, including or omitting elements, the operations further comprising ignoring the processing of the subsequent UL DCI, when the subsequent UL DCI is received within the time equivalent to the time offset from sending the last UL transmission of the plurality of UL transmissions.

Example 60 is a BB processor, including the subject matter of examples 43-59, including or omitting elements, wherein the time offset is determined based on processing a timing offset indication signal comprising the time offset or an associated parameter, received from the base station.

Example 61 is a baseband (BB) processor for a user equipment (UE) operating in a non-terrestrial network (NTN) having a satellite as a base station or as a relay to a base station, configured to perform operations comprising determining a time offset, wherein the time offset is indicative of a time delay in downlink (DL) to uplink (UL) interaction between the UE and a base station, wherein the time offset is the same or larger than two times of a propagation delay between the UE and the base station; sending a beam failure recovery request (BFRQ) to the base station, wherein the BFRQ is indicative of a beam failure; and monitoring to receive a beam failure recovery response (BFRR) from the base station in response to sending the BFRQ, wherein the BFRR is monitored within a BFRR time window after sending the BFRQ and wherein one or more parameters of the BFRR time window are determined based on the determined time offset.

Example 62 is a BB processor, including the subject matter of example 61, wherein the operations further comprise sending a subsequent BFRQ to the base station, when the BFRR is not received within the BFRR time window.

Example 63 is a BB processor, including the subject matter of examples 61-62, including or omitting elements, wherein the BFRR time window comprises a time period corresponding to (N+time offset) slots from sending the BFRQ, where N is a predefined number.

Example 64 is a BB processor, including the subject matter of examples 61-63, including or omitting elements, wherein N is equal to 4.

Example 65 is a BB processor, including the subject matter of examples 61-64, including or omitting elements, wherein the BFRR time window starting time is shifted at least by a time corresponding to the time offset from sending the BFRQ.

Example 66 is a BB processor, including the subject matter of examples 61-65, including or omitting elements, wherein, for primary cell (Pcell) beam failure recovery, the BFRR time window starts after a time corresponding to (Y+time offset) slots after sending a contention free physical random access channel (PRACH) comprising the BFRQ, where Y is a predefined number.

Example 67 is a BB processor, including the subject matter of examples 61-66, including or omitting elements, wherein Y is equal to 4 slots.

Example 68 is a BB processor, including the subject matter of examples 61-67, including or omitting elements, wherein, for secondary cell (Scell) beam failure recovery, the BFRR time window starts after a time corresponding to time offset slots after sending a scheduling request (SR)/media access control (MAC) control element (CE) comprising the BFRQ.

Example 69 is a BB processor, including the subject matter of examples 61-68, including or omitting elements, wherein, when aggregated retransmission or blind retransmission of the BFRQ is supported, the BFRQ comprises a plurality of transmissions of the BFRQ, and wherein the BFRR is monitored within the BFRR time window after a first or a last retransmission of the plurality of retransmissions of the BFRQ.

Example 70 is a BB processor, including the subject matter of examples 61-69, including or omitting elements, wherein the time offset is determined based on processing a timing offset indication signal comprising the time offset or an associated parameter, received from the base station.

Example 71 is a user equipment (UE) comprising a processor configured to perform operations comprising determining a first time offset, based on processing a timing offset indication signal comprising the first time offset or an associated parameter, received from a base station, wherein the first time offset is indicative of a time delay in downlink (DL) to uplink (UL) interaction between the UE and the base station, wherein the first time offset is the same or larger than two times of a propagation delay between the UE and the base station; determining a second time offset, based on processing a subsequent timing offset indication signal comprising the second time offset or an associated parameter, received from the base station at a subsequent time instance, wherein the second time offset is indicative of the time delay in DL to uplink UL interaction between the UE and the base station, and wherein the second time offset is the same or larger than two times of the propagation delay between the UE and the base station; and updating the first time offset with the second time offset.

Example 72 is a UE, including the subject matter of example 71, wherein the first time offset comprises an initial time offset to be utilized by the UE during an initial access procedure or an updated time offset that updated the initial time offset in one or more subsequent iterations.

Example 73 is a UE, including the subject matter of examples 71-72, including or omitting elements, wherein, when the first time offset comprises the initial time offset, the timing offset indication signal comprises a system information signal comprising the initial time offset.

Example 74 is a UE, including the subject matter of examples 71-73, including or omitting elements, wherein the second time offset is utilized by the UE after the initial access procedure.

Example 75 is a UE, including the subject matter of examples 71-74, including or omitting elements, wherein the subsequent timing offset indication signal comprises a random access response (RAR) message comprising the second time offset.

Example 76 is a UE, including the subject matter of examples 71-75, including or omitting elements, wherein the subsequent timing offset indication signal comprises a common radio resource control (RRC) message or a dedicated RRC message comprising the second time offset.

Example 77 is a UE, including the subject matter of examples 71-76, including or omitting elements, wherein determining the second time offset to update the first time offset is triggered upon receiving the common RRC message or the dedicated RRC message from the base station.

Example 78 is a UE, including the subject matter of examples 71-77, including or omitting elements, wherein the subsequent timing offset indication signal comprises a group common downlink control information (DCI) comprising the second time offset or a dedicated DCI comprising the second time offset or a parameter indicative of the second time offset.

Example 79 is a UE, including the subject matter of examples 71-78, including or omitting elements, wherein the group common DCI and/or the dedicated DCI comprises a time offset field comprising the second time offset or the parameter indicative of the second time offset.

Example 80 is a UE, including the subject matter of examples 71-79, including or omitting elements, wherein determining the second time offset to update the first time offset is triggered upon receiving the group common DCI or the dedicated DCI.

Example 81 is a UE, including the subject matter of examples 71-80, including or omitting elements, wherein the subsequent timing offset indication signal comprises a dedicated time offset media access control (MAC) control element (CE) comprising the second time offset or a timing advance (TA) command MAC CE comprising the second time offset or a timing drift rate MAC CE comprising the second time offset.

Example 82 is a UE, including the subject matter of examples 71-81, including or omitting elements, wherein determining the second time offset to update the first time offset is triggered, upon receiving the dedicated time offset MAC CE or the TA command MAC CE or the timing drift rate MAC CE from the base station.

Example 83 is a UE, including the subject matter of examples 71-82, including or omitting elements, wherein the subsequent timing offset indication signal comprises a TA command media access control (MAC) control element (CE) and wherein the second time offset is determined based on a timing advance (TA) value comprised in the TA command MAC CE.

Example 84 is a UE, including the subject matter of examples 71-83, including or omitting elements, wherein determining the second time offset to update the first time offset is triggered upon receiving the TA MAC CE from the base station.

Example 85 is a UE, including the subject matter of examples 71-84, including or omitting elements, wherein the subsequent timing offset indication signal comprises a random access response (RAR) message and wherein the second time offset is determined based on a timing advance (TA) command comprised in the RAR message.

Example 86 is a UE, including the subject matter of examples 71-85, including or omitting elements, wherein the subsequent timing offset indication signal comprises a timing drift rate indication signal and wherein the second time offset is determined based on a timing drift rate included in the timing drift rate indication signal.

Example 87 is a UE, including the subject matter of examples 71-86, including or omitting elements, wherein determining the second time offset to update the first time offset is triggered, when an autonomously maintained timing advance (TA) of the UE that varies as a function of the timing drift rate exceeds a predefined TA threshold.

Example 88 is a UE, including the subject matter of examples 71-87, including or omitting elements, wherein the operations further comprise sending a timing offset update notification signal comprising the second time offset to the base station, upon determining the second time offset.

Example 89 is a base station (BS) operating in a non-terrestrial network (NTN), wherein the base station comprises a satellite or having a satellite as a relay to a user equipment, the base station comprising a processor configured to perform operations comprising sending, to a user equipment (UE), a timing offset indication signal comprising a first time offset or an associated parameter, in order to enable the UE to determine the first time offset, wherein the first time offset is indicative of a time delay in downlink (DL) to uplink (UL) interaction between the UE and the base station, wherein the first time offset is the same or larger than two times of a propagation delay between the UE and the base station; and sending, to the UE, a subsequent timing offset indication signal comprising a second time offset or an associated parameter, at a subsequent time instance, in order to enable the UE to update the first time offset with the second time offset, wherein the second time offset is indicative of the time delay in DL to uplink UL interaction between the UE and the base station, and wherein the second time offset is the same or larger than two times of the propagation delay between the UE and the base station.

Example 90 is a BS, including the subject matter of example 89, wherein the operations further comprise determining the second time offset, prior to sending the subsequent timing offset indication signal to the UE.

Example 91 is a BS, including the subject matter of examples 89-90, including or omitting elements, wherein the operations further comprise determining the second time offset, based on processing a timing offset update notification signal received from the UE, in response to sending the subsequent timing offset indication signal to the UE.

Example 92 is a BS, including the subject matter of examples 89-91, including or omitting elements, wherein the first time offset comprises an initial time offset to be utilized by the UE during an initial access procedure or an updated time offset that updated the initial time offset in one or more subsequent iterations.

Example 93 is a BS, including the subject matter of examples 89-92, including or omitting elements, wherein, when the first time offset comprises the initial time offset, the timing offset indication signal comprises a system information signal comprising the initial time offset.

Example 94 is a BS, including the subject matter of examples 89-93, including or omitting elements, wherein the second time offset is to be utilized by the UE after the initial access procedure.

Example 95 is a BS, including the subject matter of examples 89-94, including or omitting elements, wherein the subsequent timing offset indication signal comprises a random access response (RAR) message comprising the second time offset.

Example 96 is a BS, including the subject matter of examples 89-95, including or omitting elements, wherein the subsequent timing offset indication signal comprises a common radio resource control (RRC) message or a dedicated RRC message comprising the second time offset.

Example 97 is a BS, including the subject matter of examples 89-96, including or omitting elements, wherein the subsequent timing offset indication signal comprises a group common downlink control information (DCI) or a dedicated DCI comprising the second time offset or a parameter indicative of the second time offset.

Example 98 is a BS, including the subject matter of examples 89-97, including or omitting elements, wherein the group common DCI and/or the dedicated DCI comprises a time offset field comprising the second time offset or the parameter indicative of the second time offset.

Example 99 is a BS, including the subject matter of examples 89-98, including or omitting elements, wherein the subsequent timing offset indication signal comprises a dedicated time offset media access control (MAC) control element (CE) comprising the second time offset or a timing advance (TA) command MAC CE comprising the second time offset or a timing drift rate MAC CE comprising the second time offset, received from the base station.

Example 100 is a BS, including the subject matter of examples 89-99, including or omitting elements, wherein the subsequent timing offset indication signal comprises a timing advance (TA) command media access control (MAC) control element (CE) comprising a TA value.

Example 101 is a BS, including the subject matter of examples 89-100, including or omitting elements, wherein the subsequent timing offset indication signal comprises a random access response (RAR) message comprising a timing advance (TA) command.

Example 102 is a BS, including the subject matter of examples 89-101, including or omitting elements, wherein the subsequent timing offset indication signal comprises timing drift rate indication signal comprising a timing drift rate.

Example 103 is a BS, including the subject matter of examples 89-102, including or omitting elements, the second time offset is determined, upon beam switching between satellites.

Example 104 is a user equipment (UE) operating in a non-terrestrial network (NTN) having a satellite as a base station or as a relay to a base station, configured comprising a processor configured to perform operations comprising determining a time offset, wherein the time offset is indicative of a time delay in downlink (DL) to uplink (UL) interaction between the UE and a base station, wherein the time offset is the same or larger than two times of a propagation delay between the UE and the base station; receiving a media access control (MAC) control element (CE) command from the base station; sending, to the base station, a hybrid automatic repeat request (HARQ) acknowledge (ACK) feedback in response to receiving the MAC CE command; and determining a MAC CE activation time at which the MAC CE command is activated, based on the determined time offset, depending on whether the MAC CE command comprises a DL MAC CE command or a UL MAC CE command.

Example 105 is a UE, including the subject matter of example 104, wherein, when the MAC CE command comprises the DL MAC CE command, the MAC CE activation time of the DL MAC CE command that forms a DL MAC CE activation time, is determined to be at a time instance corresponding to (X+time offset) after sending the HARQ-ACK feedback, where X is a predefined number.

Example 106 is a UE, including the subject matter of examples 104-105, including or omitting elements, wherein X and time offset are measured in milliseconds (ms).

Example 107 is a UE, including the subject matter of examples 104-106, including or omitting elements, wherein X is less than or equal to 3 ms.

Example 108 is a UE, including the subject matter of examples 104-107, including or omitting elements, wherein the operations further comprise activating the DL MAC CE command at the determined DL MAC CE activation time.

Example 109 is a UE, including the subject matter of examples 104-108, including or omitting elements, wherein, when the MAC CE command comprises the UL MAC CE command, the MAC CE activation time of the UL MAC CE command that forms a UL MAC CE activation time, is determined to be at a time instance corresponding to K milliseconds (ms) after sending the HARQ-ACK feedback, where K is a predefined number.

Example 110 is a UE, including the subject matter of examples 104-109, including or omitting elements, wherein K is equal to 3 milliseconds (ms).

Example 111 is a UE, including the subject matter of examples 104-110, including or omitting elements, wherein the operations further comprise activating the UL MAC CE command at the determined UL MAC CE activation time.

Example 112 is a UE, including the subject matter of examples 104-111, including or omitting elements, wherein the time offset is determined based on processing a timing offset indication signal comprising the time offset or an associated parameter, received from the base station.

Example 113 is a user equipment (UE) operating in a non-terrestrial network (NTN) having a satellite as a base station or as a relay to a base station, comprising a processor configured to perform operations comprising determining a time offset, wherein the time offset is indicative of a time delay in downlink (DL) to uplink (UL) interaction between the UE and a base station; receiving, from the base station, a downlink control information (DCI) that schedules a DL transmission to the UE or a UL transmission from the UE, wherein the DCI identifies a hybrid automatic repeat request (HARQ) process number, and wherein the DCI comprises a single transmission of the DCI when aggregated/blind retransmissions are disabled and the DCI comprises a plurality of aggregated/blind retransmissions of the DCI when aggregated/blind retransmissions are enabled; and processing a subsequent DCI with the same HARQ process number received from the base station, selectively, based on the determined time offset, wherein the subsequent DCI comprises a DCI that is received from the base station after receiving the single transmission of the DCI when aggregated/blind retransmissions are disabled or a DCI that is received from the base station after receiving the plurality of aggregated/blind retransmissions of the DCI when aggregated/blind retransmissions are enabled.

Example 114 is a UE, including the subject matter of example 113, wherein the DCI comprises a DL DCI that schedules the DL transmission to the UE and subsequent DCI comprises a subsequent DL DCI that schedules a retransmission of the DL transmission.

Example 115 is a UE, including the subject matter of examples 113-114, including or omitting elements, wherein the operations further comprise sending, to the base station, a hybrid automatic repeat request (HARQ) acknowledge (ACK) feedback in response to receiving the DL DCI or the associated DL transmission, prior to receiving the subsequent DL DCI.

Example 116 is a UE, including the subject matter of examples 113-115, including or omitting elements, wherein aggregated retransmission or blind retransmission is disabled, and wherein the DL DCI and the HARQ-ACK feedback comprises a single transmission.

Example 117 is a UE, including the subject matter of examples 113-116, including or omitting elements, wherein the subsequent DL DCI is processed when the subsequent DL DCI is received at a time period/instance after a time equivalent to the time offset from sending the single transmission of the HARQ-ACK feedback.

Example 118 is a UE, including the subject matter of examples 113-117, including or omitting elements, wherein the operations further comprise ignoring the processing of the subsequent DL DCI, when the subsequent DL DCI is received within the time equivalent to the time offset from sending the single transmission of the HARQ-ACK feedback.

Example 119 is a UE, including the subject matter of examples 113-118, including or omitting elements, wherein aggregated retransmission or blind retransmission is enabled, and wherein the DL DCI comprises a plurality of aggregated/blind retransmissions of the DL DCI and the HARQ-ACK feedback comprises a respective plurality of HARQ-ACK feedbacks.

Example 120 is a UE, including the subject matter of examples 113-119, including or omitting elements, wherein the subsequent DL DCI is processed when the subsequent DL DCI is received at a time period/instance after a time equivalent to the time offset from sending a last HARQ-ACK feedback of the plurality of HARQ-ACK feedbacks.

Example 121 is a UE, including the subject matter of examples 113-120, including or omitting elements, wherein the operations further comprise ignoring the processing of the subsequent DL DCI, when the subsequent DL DCI is received within the time equivalent to the time offset from sending the last HARQ-ACK feedback of the plurality of HARQ-ACK feedbacks.

Example 122 is a UE, including the subject matter of examples 113-121, including or omitting elements, wherein the DCI comprises a UL DCI that schedules the UL transmission to the UE and subsequent DCI comprises a subsequent UL DCI that schedules a retransmission of the UL transmission.

Example 123 is a UE, including the subject matter of examples 113-122, including or omitting elements, the operations further comprising sending, to the base station, a UL transmission in response to receiving the UL DCI, prior to receiving the subsequent UL DCI.

Example 124 is a UE, including the subject matter of examples 113-123, including or omitting elements, wherein aggregated retransmission or blind retransmission is disabled, and wherein the UL DCI and the UL transmission comprises a single transmission.

Example 125 is a UE, including the subject matter of examples 113-124, including or omitting elements, wherein the subsequent UL DCI is processed when the subsequent UL DCI is received at a time period/instance after a time equivalent to the time offset from sending the single UL transmission.

Example 126 is a UE, including the subject matter of examples 113-125, including or omitting elements, the operations further comprising ignoring the processing of the subsequent UL DCI, when the subsequent UL DCI is received within the time equivalent to the time offset from sending the single UL transmission.

Example 127 is a UE, including the subject matter of examples 113-126, including or omitting elements, wherein aggregated retransmission or blind retransmission is enabled, and wherein the UL DCI comprises a plurality of aggregated/blind retransmissions of the UL DCI and the UL transmission comprises a respective plurality of UL transmission/retransmissions.

Example 128 is a UE, including the subject matter of examples 113-127, including or omitting elements, wherein the subsequent UL DCI is processed when the subsequent UL DCI is received at a time period/instance after a time equivalent to the time offset from sending a last UL transmission of the plurality of UL transmissions.

Example 129 is a UE, including the subject matter of examples 113-128, including or omitting elements, the operations further comprising ignoring the processing of the subsequent UL DCI, when the subsequent UL DCI is received within the time equivalent to the time offset from sending the last UL transmission of the plurality of UL transmissions.

Example 130 is a UE, including the subject matter of examples 113-129, including or omitting elements, wherein the time offset is determined based on processing a timing offset indication signal comprising the time offset or an associated parameter, received from the base station.

Example 131 is a user equipment (UE) operating in a non-terrestrial network (NTN) having a satellite as a base station or as a relay to a base station, comprising a processor configured to perform operations comprising determining a time offset, wherein the time offset is indicative of a time delay in downlink (DL) to uplink (UL) interaction between the UE and a base station, wherein the time offset is the same or larger than two times of a propagation delay between the UE and the base station; sending a beam failure recovery request (BFRQ) to the base station, wherein the BFRQ is indicative of a beam failure; and monitoring to receive a beam failure recovery response (BFRR) from the base station in response to sending the BFRQ, wherein the BFRR is monitored within a BFRR time window after sending the BFRQ and wherein one or more parameters of the BFRR time window are determined based on the determined time offset.

Example 132 is a UE, including the subject matter of example 131, wherein the operations further comprise sending a subsequent BFRQ to the base station, when the BFRR is not received within the BFRR time window.

Example 133 is a UE, including the subject matter of examples 131-132, including or omitting elements, wherein the BFRR time window comprises a time period corresponding to (N+time offset) slots from sending the BFRQ, where N is a predefined number.

Example 134 is a UE, including the subject matter of examples 131-133, including or omitting elements, wherein N is equal to 4.

Example 135 is a UE, including the subject matter of examples 131-134, including or omitting elements, wherein the BFRR time window starting time is shifted at least by a time corresponding to the time offset from sending the BFRQ.

Example 136 is a UE, including the subject matter of examples 131-135, including or omitting elements, wherein, for primary cell (Pcell) beam failure recovery, the BFRR time window starts after a time corresponding to (Y+time offset) slots after sending a contention free physical random access channel (PRACH) comprising the BFRQ, where Y is a predefined number.

Example 137 is a UE, including the subject matter of examples 131-136, including or omitting elements, wherein Y is equal to 4 slots.

Example 138 is a UE, including the subject matter of examples 131-137, including or omitting elements, wherein, for secondary cell (Scell) beam failure recovery, the BFRR time window starts after a time corresponding to time offset slots after sending a scheduling request (SR)/media access control (MAC) control element (CE) comprising the BFRQ.

Example 139 is a UE, including the subject matter of examples 131-138, including or omitting elements, wherein, when aggregated retransmission or blind retransmission of the BFRQ is supported, the BFRQ comprises a plurality of transmissions of the BFRQ, and wherein the BFRR is monitored within the BFRR time window after a first or a last retransmission of the plurality of retransmissions of the BFRQ.

Example 140 is a UE, including the subject matter of examples 131-139, including or omitting elements, wherein the time offset is determined based on processing a timing offset indication signal comprising the time offset or an associated parameter, received from the base station.

Example 141 is a method for a user equipment (UE) operating in a non-terrestrial network (NTN) having a satellite as a base station or as a relay to a base station, the method comprising determining a first time offset, based on processing a timing offset indication signal comprising the first time offset or an associated parameter, received from a base station, wherein the first time offset is indicative of a time delay in downlink (DL) to uplink (UL) interaction between the UE and the base station, wherein the first time offset is the same or larger than two times of a propagation delay between the UE and the base station; determining a second time offset, based on processing a subsequent timing offset indication signal comprising the second time offset or an associated parameter, received from the base station at a subsequent time instance, wherein the second time offset is indicative of the time delay in DL to uplink UL interaction between the UE and the base station, and wherein the second time offset is the same or larger than two times of the propagation delay between the UE and the base station; and updating the first time offset with the second time offset.

Example 142 is a method, including the subject matter of example 141, wherein the first time offset comprises an initial time offset to be utilized by the UE during an initial access procedure or an updated time offset that updated the initial time offset in one or more subsequent iterations.

Example 143 is a method, including the subject matter of examples 141-142, including or omitting elements, wherein, when the first time offset comprises the initial time offset, the timing offset indication signal comprises a system information signal comprising the initial time offset.

Example 144 is a method, including the subject matter of examples 141-143, including or omitting elements, wherein the second time offset is utilized by the UE after the initial access procedure.

Example 145 is a method, including the subject matter of examples 141-144, including or omitting elements, wherein the subsequent timing offset indication signal comprises a random access response (RAR) message comprising the second time offset.

Example 146 is a method, including the subject matter of examples 141-145, including or omitting elements, wherein the subsequent timing offset indication signal comprises a common radio resource control (RRC) message or a dedicated RRC message comprising the second time offset.

Example 147 is a method, including the subject matter of examples 141-146, including or omitting elements, wherein determining the second time offset to update the first time offset is triggered upon receiving the common RRC message or the dedicated RRC message from the base station.

Example 148 is a method, including the subject matter of examples 141-147, including or omitting elements, wherein the subsequent timing offset indication signal comprises a group common downlink control information (DCI) comprising the second time offset or a dedicated DCI comprising the second time offset or a parameter indicative of the second time offset.

Example 149 is a method, including the subject matter of examples 141-148, including or omitting elements, wherein the group common DCI and/or the dedicated DCI comprises a time offset field comprising the second time offset or the parameter indicative of the second time offset.

Example 150 is a method, including the subject matter of examples 141-149, including or omitting elements, wherein determining the second time offset to update the first time offset is triggered upon receiving the group common DCI or the dedicated DCI.

Example 151 is a method, including the subject matter of examples 141-150, including or omitting elements, wherein the subsequent timing offset indication signal comprises a dedicated time offset media access control (MAC) control element (CE) comprising the second time offset or a timing advance (TA) command MAC CE comprising the second time offset or a timing drift rate MAC CE comprising the second time offset.

Example 152 is a method, including the subject matter of examples 141-151, including or omitting elements, wherein determining the second time offset to update the first time offset is triggered, upon receiving the dedicated time offset MAC CE or the TA command MAC CE or the timing drift rate MAC CE from the base station.

Example 153 is a method, including the subject matter of examples 141-152, including or omitting elements, wherein the subsequent timing offset indication signal comprises a TA command media access control (MAC) control element (CE) and wherein the second time offset is determined based on a timing advance (TA) value comprised in the TA command MAC CE.

Example 154 is a method, including the subject matter of examples 141-153, including or omitting elements, wherein determining the second time offset to update the first time offset is triggered upon receiving the TA MAC CE from the base station.

Example 155 is a method, including the subject matter of examples 141-154, including or omitting elements, wherein the subsequent timing offset indication signal comprises a random access response (RAR) message and wherein the second time offset is determined based on a timing advance (TA) command comprised in the RAR message.

Example 156 is a method, including the subject matter of examples 141-155, including or omitting elements, wherein the subsequent timing offset indication signal comprises a timing drift rate indication signal and wherein the second time offset is determined based on a timing drift rate included in the timing drift rate indication signal.

Example 157 is a method, including the subject matter of examples 141-156, including or omitting elements, wherein determining the second time offset to update the first time offset is triggered, when an autonomously maintained timing advance (TA) of the UE that varies as a function of the timing drift rate exceeds a predefined TA threshold.

Example 158 is a method, including the subject matter of examples 141-157, including or omitting elements, wherein the operations further comprise sending a timing offset update notification signal comprising the second time offset to the base station, upon determining the second time offset.

Example 159 is a method for a base station (BS) operating in a non-terrestrial network (NTN), wherein the base station comprises a satellite or having a satellite as a relay to a user equipment, the method comprising sending, to a user equipment (UE), a timing offset indication signal comprising a first time offset or an associated parameter, in order to enable the UE to determine the first time offset, wherein the first time offset is indicative of a time delay in downlink (DL) to uplink (UL) interaction between the UE and the base station, wherein the first time offset is the same or larger than two times of a propagation delay between the UE and the base station; and sending, to the UE, a subsequent timing offset indication signal comprising a second time offset or an associated parameter, at a subsequent time instance, in order to enable the UE to update the first time offset with the second time offset, wherein the second time offset is indicative of the time delay in DL to uplink UL interaction between the UE and the base station, and wherein the second time offset is the same or larger than two times of the propagation delay between the UE and the base station.

Example 160 is a method, including the subject matter of example 159, wherein the operations further comprise determining the second time offset, prior to sending the subsequent timing offset indication signal to the UE.

Example 161 is a method, including the subject matter of examples 159-160, including or omitting elements, wherein the operations further comprise determining the second time offset, based on processing a timing offset update notification signal received from the UE, in response to sending the subsequent timing offset indication signal to the UE.

Example 162 is a method, including the subject matter of examples 159-161, including or omitting elements, wherein the first time offset comprises an initial time offset to be utilized by the UE during an initial access procedure or an updated time offset that updated the initial time offset in one or more subsequent iterations.

Example 163 is a method, including the subject matter of examples 159-162, including or omitting elements, wherein, when the first time offset comprises the initial time offset, the timing offset indication signal comprises a system information signal comprising the initial time offset.

Example 164 is a method, including the subject matter of examples 159-163, including or omitting elements, wherein the second time offset is to be utilized by the UE after the initial access procedure.

Example 165 is a method, including the subject matter of examples 159-162, including or omitting elements, wherein the subsequent timing offset indication signal comprises a random access response (RAR) message comprising the second time offset.

Example 166 is a method, including the subject matter of examples 159-165, including or omitting elements, wherein the subsequent timing offset indication signal comprises a common radio resource control (RRC) message or a dedicated RRC message comprising the second time offset.

Example 167 is a method, including the subject matter of examples 159-166, including or omitting elements, wherein the subsequent timing offset indication signal comprises a group common downlink control information (DCI) or a dedicated DCI comprising the second time offset or a parameter indicative of the second time offset.

Example 168 is a method, including the subject matter of examples 159-167, including or omitting elements, wherein the group common DCI and/or the dedicated DCI comprises a time offset field comprising the second time offset or the parameter indicative of the second time offset.

Example 169 is a method, including the subject matter of examples 159-168, including or omitting elements, wherein the subsequent timing offset indication signal comprises a dedicated time offset media access control (MAC) control element (CE) comprising the second time offset or a timing advance (TA) command MAC CE comprising the second time offset or a timing drift rate MAC CE comprising the second time offset, received from the base station.

Example 170 is a method, including the subject matter of examples 159-169, including or omitting elements, wherein the subsequent timing offset indication signal comprises a timing advance (TA) command media access control (MAC) control element (CE) comprising a TA value.

Example 171 is a method, including the subject matter of examples 159-170, including or omitting elements, wherein the subsequent timing offset indication signal comprises a random access response (RAR) message comprising a timing advance (TA) command.

Example 172 is a method, including the subject matter of examples 159-171, including or omitting elements, wherein the subsequent timing offset indication signal comprises timing drift rate indication signal comprising a timing drift rate.

Example 173 is a method, including the subject matter of examples 159-172, including or omitting elements, the second time offset is determined, upon beam switching between satellites.

Example 174 is a method for a user equipment (UE) operating in a non-terrestrial network (NTN) having a satellite as a base station or as a relay to a base station, the method comprising determining a time offset, wherein the time offset is indicative of a time delay in downlink (DL) to uplink (UL) interaction between the UE and a base station, wherein the time offset is the same or larger than two times of a propagation delay between the UE and the base station; receiving a media access control (MAC) control element (CE) command from the base station; sending, to the base station, a hybrid automatic repeat request (HARQ) acknowledge (ACK) feedback in response to receiving the MAC CE command; and determining a MAC CE activation time at which the MAC CE command is activated, based on the determined time offset, depending on whether the MAC CE command comprises a DL MAC CE command or a UL MAC CE command.

Example 175 is a method, including the subject matter of example 104, wherein, when the MAC CE command comprises the DL MAC CE command, the MAC CE activation time of the DL MAC CE command that forms a DL MAC CE activation time, is determined to be at a time instance corresponding to (X+time offset) after sending the HARQ-ACK feedback, where X is a predefined number.

Example 176 is a method, including the subject matter of examples 104-175, including or omitting elements, wherein X and time offset are measured in milliseconds (ms).

Example 177 is a method, including the subject matter of examples 174-176, including or omitting elements, wherein X is less than or equal to 3 ms.

Example 178 is a method, including the subject matter of examples 174-177, including or omitting elements, wherein the operations further comprise activating the DL MAC CE command at the determined DL MAC CE activation time.

Example 179 is a method, including the subject matter of examples 174-178, including or omitting elements, wherein, when the MAC CE command comprises the UL MAC CE command, the MAC CE activation time of the UL MAC CE command that forms a UL MAC CE activation time, is determined to be at a time instance corresponding to K milliseconds (ms) after sending the HARQ-ACK feedback, where K is a predefined number.

Example 180 is a method, including the subject matter of examples 174-179, including or omitting elements, wherein K is equal to 3 milliseconds (ms).

Example 181 is a method, including the subject matter of examples 174-180, including or omitting elements, wherein the operations further comprise activating the UL MAC CE command at the determined UL MAC CE activation time.

Example 182 is a method, including the subject matter of examples 174-181, including or omitting elements, wherein the time offset is determined based on processing a timing offset indication signal comprising the time offset or an associated parameter, received from the base station.

Example 183 is a method for a user equipment (UE) operating in a non-terrestrial network (NTN) having a satellite as a base station or as a relay to a base station, the method comprising determining a time offset, wherein the time offset is indicative of a time delay in downlink (DL) to uplink (UL) interaction between the UE and a base station; receiving, from the base station, a downlink control information (DCI) that schedules a DL transmission to the UE or a UL transmission from the UE, wherein the DCI identifies a hybrid automatic repeat request (HARQ) process number, and wherein the DCI comprises a single transmission of the DCI when aggregated/blind retransmissions are disabled and the DCI comprises a plurality of aggregated/blind retransmissions of the DCI when aggregated/blind retransmissions are enabled; and processing a subsequent DCI with the same HARQ process number received from the base station, selectively, based on the determined time offset, wherein the subsequent DCI comprises a DCI that is received from the base station after receiving the single transmission of the DCI when aggregated/blind retransmissions are disabled or a DCI that is received from the base station after receiving the plurality of aggregated/blind retransmissions of the DCI when aggregated/blind retransmissions are enabled.

Example 184 is a method, including the subject matter of example 183, wherein the DCI comprises a DL DCI that schedules the DL transmission to the UE and subsequent DCI comprises a subsequent DL DCI that schedules a retransmission of the DL transmission.

Example 185 is a method, including the subject matter of examples 183-184, including or omitting elements, wherein the operations further comprise sending, to the base station, a hybrid automatic repeat request (HARQ) acknowledge (ACK) feedback in response to receiving the DL DCI or the associated DL transmission, prior to receiving the subsequent DL DCI.

Example 186 is a method, including the subject matter of examples 183-185, including or omitting elements, wherein aggregated retransmission or blind retransmission is disabled, and wherein the DL DCI and the HARQ-ACK feedback comprises a single transmission.

Example 187 is a method, including the subject matter of examples 183-186, including or omitting elements, wherein the subsequent DL DCI is processed when the subsequent DL DCI is received at a time period/instance after a time equivalent to the time offset from sending the single transmission of the HARQ-ACK feedback.

Example 188 is a method, including the subject matter of examples 183-187, including or omitting elements, wherein the operations further comprise ignoring the processing of the subsequent DL DCI, when the subsequent DL DCI is received within the time equivalent to the time offset from sending the single transmission of the HARQ-ACK feedback.

Example 189 is a method, including the subject matter of examples 188, including or omitting elements, wherein aggregated retransmission or blind retransmission is enabled, and wherein the DL DCI comprises a plurality of aggregated/blind retransmissions of the DL DCI and the HARQ-ACK feedback comprises a respective plurality of HARQ-ACK feedbacks.

Example 190 is a method, including the subject matter of examples 183-189, including or omitting elements, wherein the subsequent DL DCI is processed when the subsequent DL DCI is received at a time period/instance after a time equivalent to the time offset from sending a last HARQ-ACK feedback of the plurality of HARQ-ACK feedbacks.

Example 191 is a method, including the subject matter of examples 183-190, including or omitting elements, wherein the operations further comprise ignoring the processing of the subsequent DL DCI, when the subsequent DL DCI is received within the time equivalent to the time offset from sending the last HARQ-ACK feedback of the plurality of HARQ-ACK feedbacks.

Example 192 is a method, including the subject matter of examples 183-191, including or omitting elements, wherein the DCI comprises a UL DCI that schedules the UL transmission to the UE and subsequent DCI comprises a subsequent UL DCI that schedules a retransmission of the UL transmission.

Example 193 is a method, including the subject matter of examples 183-192, including or omitting elements, the operations further comprising sending, to the base station, a UL transmission in response to receiving the UL DCI, prior to receiving the subsequent UL DCI.

Example 194 is a method, including the subject matter of examples 183-193, including or omitting elements, wherein aggregated retransmission or blind retransmission is disabled, and wherein the UL DCI and the UL transmission comprises a single transmission.

Example 195 is a method, including the subject matter of examples 183-194, including or omitting elements, wherein the subsequent UL DCI is processed when the subsequent UL DCI is received at a time period/instance after a time equivalent to the time offset from sending the single UL transmission.

Example 196 is a method, including the subject matter of examples 183-195, including or omitting elements, the operations further comprising ignoring the processing of the subsequent UL DCI, when the subsequent UL DCI is received within the time equivalent to the time offset from sending the single UL transmission.

Example 197 is a method, including the subject matter of examples 183-196, including or omitting elements, wherein aggregated retransmission or blind retransmission is enabled, and wherein the UL DCI comprises a plurality of aggregated/blind retransmissions of the UL DCI and the UL transmission comprises a respective plurality of UL transmission/retransmissions.

Example 198 is a method, including the subject matter of examples 183-197, including or omitting elements, wherein the subsequent UL DCI is processed when the subsequent UL DCI is received at a time period/instance after a time equivalent to the time offset from sending a last UL transmission of the plurality of UL transmissions.

Example 199 is a method, including the subject matter of examples 183-198, including or omitting elements, the operations further comprising ignoring the processing of the subsequent UL DCI, when the subsequent UL DCI is received within the time equivalent to the time offset from sending the last UL transmission of the plurality of UL transmissions.

Example 200 is a method, including the subject matter of examples 183-199, including or omitting elements, wherein the time offset is determined based on processing a timing offset indication signal comprising the time offset or an associated parameter, received from the base station.

Example 201 is a method for a user equipment (UE) operating in a non-terrestrial network (NTN) having a satellite as a base station or as a relay to a base station, the method comprising determining a time offset, wherein the time offset is indicative of a time delay in downlink (DL) to uplink (UL) interaction between the UE and a base station, wherein the time offset is the same or larger than two times of a propagation delay between the UE and the base station, wherein the time offset is the same or larger than two times of a propagation delay between the UE and the base station; sending a beam failure recovery request (BFRQ) to the base station, wherein the BFRQ is indicative of a beam failure; and monitoring to receive a beam failure recovery response (BFRR) from the base station in response to sending the BFRQ, wherein the BFRR is monitored within a BFRR time window after sending the BFRQ and wherein one or more parameters of the BFRR time window are determined based on the determined time offset.

Example 202 is a UE, including the subject matter of example 201, wherein the operations further comprise sending a subsequent BFRQ to the base station, when the BFRR is not received within the BFRR time window.

Example 203 is a UE, including the subject matter of examples 201-202, including or omitting elements, wherein the BFRR time window comprises a time period corresponding to (N+time offset) slots from sending the BFRQ, where N is a predefined number.

Example 204 is a UE, including the subject matter of examples 201-203, including or omitting elements, wherein N is equal to 4.

Example 205 is a UE, including the subject matter of examples 201-204, including or omitting elements, wherein the BFRR time window starting time is shifted at least by a time corresponding to the time offset from sending the BFRQ.

Example 206 is a UE, including the subject matter of examples 201-205, including or omitting elements, wherein, for primary cell (Pcell) beam failure recovery, the BFRR time window starts after a time corresponding to (Y+time offset) slots after sending a contention free physical random access channel (PRACH) comprising the BFRQ, where Y is a predefined number.

Example 207 is a UE, including the subject matter of examples 201-206, including or omitting elements, wherein Y is equal to 4 slots.

Example 208 is a UE, including the subject matter of examples 201-207, including or omitting elements, wherein, for secondary cell (Scell) beam failure recovery, the BFRR time window starts after a time corresponding to time offset slots after sending a scheduling request (SR)/media access control (MAC) control element (CE) comprising the BFRQ.

Example 209 is a UE, including the subject matter of examples 201-208, including or omitting elements, wherein, when aggregated retransmission or blind retransmission of the BFRQ is supported, the BFRQ comprises a plurality of transmissions of the BFRQ, and wherein the BFRR is monitored within the BFRR time window after a first or a last retransmission of the plurality of retransmissions of the BFRQ.

Example 210 is a UE, including the subject matter of examples 201-209, including or omitting elements, wherein the time offset is determined based on processing a timing offset indication signal comprising the time offset or an associated parameter, received from the base station.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

What is claimed is:

1. A baseband (BB) processor for a user equipment (UE), the BB processor configured to perform operations comprising:

receiving, from a base station in a non-terrestrial network (NTN), a timing offset indication signal comprising a time offset;

receiving, from the base station in the NTN, a timing drift rate indication signal comprising a timing drift rate;

determining an updated time offset based on the time offset and the timing drift rate, wherein the updated time offset comprises a timing advance (TA) value autonomously maintained at the UE; and providing, to the base station in the NTN, a timing offset update notification signal comprising the updated time offset.

2. The BB processor of claim 1, wherein determining to update the time offset with the updated time offset is triggered in response to the TA value autonomously maintained at the UE exceeding a predefined TA threshold.

3. The BB processor of claim 1, wherein the updated time offset is indicative of a time delay between a downlink (DL) transmission and an uplink (UL) transmission for communication between the UE and the base station, and wherein the updated time offset is greater than or equal to two times a propagation delay between the UE and the base station.

4. The BB processor of claim 1, wherein the time offset is indicated as a number of slots.

5. The BB processor of claim 1, wherein the timing drift rate comprises a common drift rate.

6. The BB processor of claim 1, wherein determining the updated time offset is further based on a time gap between a reception of the timing drift rate indication signal and a previously received timing drift rate indication signal.

7. A baseband (BB) processor for a base station operating in a non-terrestrial network (NTN), wherein the base station comprises a satellite or communicates with the satellite as a relay to a user equipment (UE), the BB processor configured to perform operations comprising:

sending, to the UE, a timing offset indication signal comprising a time offset; and sending, to the UE, a timing drift rate indication signal comprising a timing drift rate for calculating an updated time offset, wherein the updated time offset comprises a timing advance (TA) value autonomously maintained at the UE; and receiving, from the UE, a timing offset update notification signal comprising the updated time offset.

8. The BB processor of claim 7, wherein the updated time offset is indicative of a time delay between a downlink (DL) transmission and an uplink (UL) transmission for communication between the UE and the base station, and wherein the updated time offset is greater than or equal to two times a propagation delay between the UE and the base station.

9. The BB processor of claim 7, wherein the time offset is indicated as a number of slots.

10. The BB processor of claim 7, wherein the operations further comprise receiving the timing offset update notification signal when the updated time offset exceeds a TA threshold at the UE.

11. The BB processor of claim 7, wherein the timing drift rate comprises a common drift rate.

12. A method for a user equipment (UE), comprising:

receiving, from a base station in a non-terrestrial network (NTN), a timing offset indication signal comprising a time offset;

receiving, from the base station in the NTN, a timing drift indication signal comprising a timing drift rate;

determining an updated time offset based on the time offset and the timing drift rate, wherein the updated time offset comprises a timing advance (TA) value autonomously maintained at the UE; and transmitting, to the base station in the NTN, a timing offset update notification signal comprising the updated time offset.

13. The method of claim 12, wherein the timing drift rate comprises a common drift rate.

14. The method of claim 12, wherein determining the updated time offset is further based on a time gap between a reception of the timing drift rate indication signal and a previously received timing drift rate indication signal.

15. The method of claim 12, further comprising transmitting the timing offset update notification signal when the updated time offset exceeds a TA threshold at the UE.

* * * * *